United States Patent [19]
Morino et al.

[11] Patent Number: 5,117,079
[45] Date of Patent: May 26, 1992

[54] HIGH-FREQUENCY HEATING APPARATUS FOR AUTOMATICALLY PROCESSING AND HEATING COOKING MATERIALS

[75] Inventors: Taisuke Morino, Suita; Mami Tanaka, Yao; Fuminori Kaneko, Matsubara; Takeyuki Ozaki, Nara; Shuichi Akiyama, Matsubara, all of Japan

[73] Assignee: Sharp Kabushiki Kaisha, Osaka, Japan

[21] Appl. No.: 363,961

[22] Filed: Jun. 9, 1989

[30] Foreign Application Priority Data

| Jun. 14, 1988 | [JP] | Japan | 63-78982[U] |
| Jun. 15, 1988 | [JP] | Japan | 63-79919[U] |
| Jun. 15, 1988 | [JP] | Japan | 63-147529 |
| Jun. 15, 1988 | [JP] | Japan | 63-148925 |
| Jun. 16, 1988 | [JP] | Japan | 63-79721[U] |
| Jun. 29, 1988 | [JP] | Japan | 63-161383 |
| Jul. 1, 1988 | [JP] | Japan | 63-165220 |
| Jul. 1, 1988 | [JP] | Japan | 63-165221 |
| Jul. 15, 1988 | [JP] | Japan | 63-94310[U] |

[51] Int. Cl.$^5$ .............................. H05B 6/78
[52] U.S. Cl. .................. 219/10.55 F; 219/10.55 E; 219/10.55 B; 99/348; 99/DIG. 14
[58] Field of Search ............... 219/10.55 F, 10.55 E, 219/10.55 R, 10.55 B, 10.55 A; 99/451, DIG. 14, 348, 443 R

[56] References Cited

U.S. PATENT DOCUMENTS

| Re. 30,248 | 4/1980 | Fritts | 219/10.55 B |
| 3,927,291 | 12/1975 | Peterson | 219/10.55 R |
| 4,190,756 | 2/1980 | Foerstner | 219/10.55 B |
| 4,283,614 | 8/1981 | Tanaka et al. | 219/10.55 R |
| 4,363,957 | 12/1982 | Tachikawa et al. | 219/10.55 B |
| 4,599,503 | 7/1986 | Ueda | 219/10.55 B |
| 4,663,506 | 5/1987 | Bowen et al. | 219/10.55 E |
| 4,751,357 | 6/1988 | Boulard | 219/10.55 F |
| 4,773,317 | 9/1988 | Wickboldt, Jr. | 219/10.55 E |
| 4,845,327 | 7/1989 | Iwabuchi et al. | 219/10.55 F |
| 4,885,446 | 12/1989 | Liu | 219/10.55 F |

FOREIGN PATENT DOCUMENTS

| 0157473 | 10/1985 | European Pat. Off. . |
| 3514506 | 10/1986 | Fed. Rep. of Germany . |
| 2122060 | 1/1984 | United Kingdom . |
| 2199161 | 6/1988 | United Kingdom . |

OTHER PUBLICATIONS

Copy of European Search Report.
Copy of Annex to European Search Report.

Primary Examiner—Philip H. Leung

[57] ABSTRACT

A high-frequency heating apparatus includes a heating vessel for accommodating an article to be heated, which is detachably loaded in a heating chamber, a stirring mechanism provided in the heating vessel, a guide mechanism for guiding the heating vessel so as to horizontally displace the heating vessel into a heating chamber from an opening formed on a side face of the heating chamber, a rotational drive mechanism for driving the stirring mechanism so as to rotate the stirring mechanism and a coupling mechanism for transmitting a driving force from the rotational drive mechanism to the stirring mechanism. The stirring mechanism includes a transmission gear mounted on a lower end of a stirring shaft extending through a bottom wall of the heating vessel, and the coupling mechanism includes a gear mounted on an upper end of a central shaft in the heating chamber and engageable with the transmission gear.

7 Claims, 41 Drawing Sheets

Fig. 7a
Fig. 7b
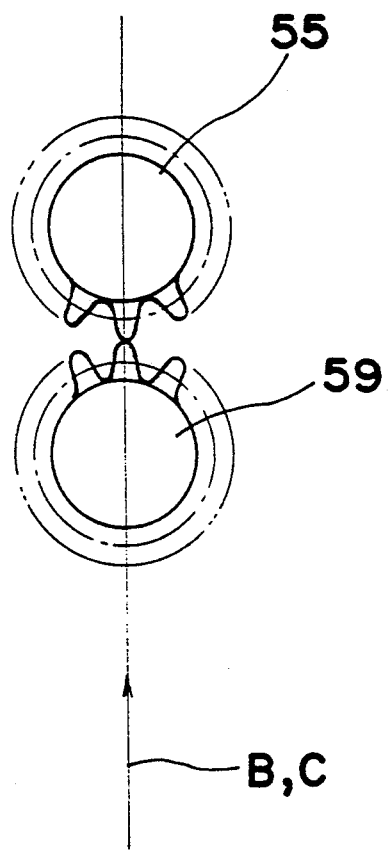
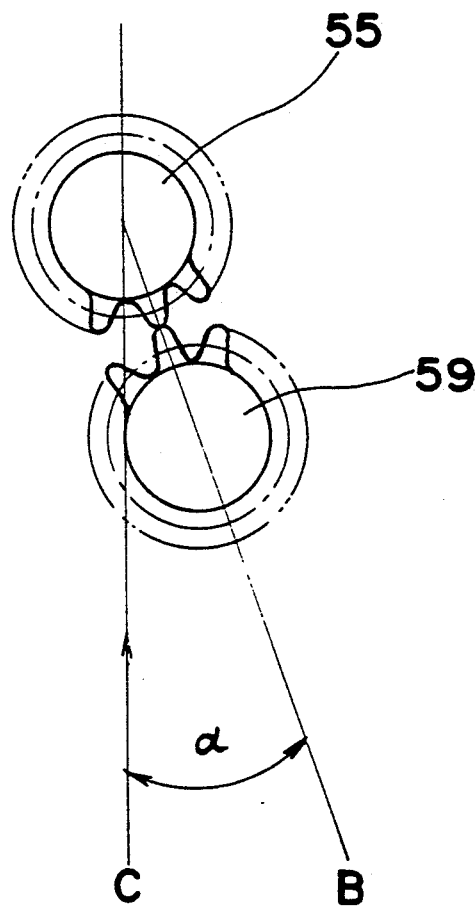

Fig. 40

| Kneading (P1) | Primary fermentation (P2) | Secondary fermentation (P3) | Baking (P4) | Temp. holding (P5) |

| (P1') | Door opened (p) | (P1") | (P2) | (P3) | (P4) | (P5) |

| (P1) | (P2') | (p) | (P2") | (P3) | (P4) | (P5) |

| (P1) | (P2) | (P3') | (p) | (P3") | (P4) | (P5) |

$T3 = T + p - \alpha$
$P3' + P3" = P3 - \alpha$
$(\alpha < p)$

Fig. 44

| (P1) | (P2) | (P3) | (P4') | (p) | (P4") | (P5) |

$T4 = T + p + \beta$
$P4' + P4" = P4 + \beta$

K3"

HIGH-FREQUENCY HEATING APPARATUS FOR AUTOMATICALLY PROCESSING AND HEATING COOKING MATERIALS

BACKGROUND OF THE INVENTION

The present invention generally relates to heating apparatuses and more particularly, to a high-frequency heating apparatus such as an electronic range, an oven range, etc. in which cooking materials of, for example, bread is inserted in a heating vessel loaded in a heating chamber such that processing of the cooking materials from kneading to baking is performed automatically.

An oven range is already commercially available in which processing of cooking materials of bread from kneading to baking is automatically performed in a heating vessel loaded in a heating chamber so as to bake bread. In the known oven range, an annular ring is provided on a bottom of the heating vessel and a mating annular ring engageable with the annular ring of the heating vessel is provided on a bottom wall of the heating chamber in order to position the heating vessel on the bottom wall of the heating chamber. By inserting the heating vessel from above and rotating the heating vessel, the annular ring is brought into engagement with the mating annular ring.

Meanwhile, in the known oven range, a downwardly oriented saw-toothed gear (face gear) is formed at the center of the annular ring on the bottom of the heating vessel and an upwardly oriented mating saw-toothed gear (face gear) engageable with the face gear of the heating vessel is formed at the center of the mating annular ring on the bottom wall of the heating chamber such that power for kneading cooking materials of bread is transmitted through vertical engagement between the face gear and the mating face gear.

However, in the case where a bread is baked by the known oven range, the following problems (1) to (3) arise.

(1) At the time of unloading of the heating vessel from the heating chamber, the heating vessel is required to be displaced upwardly. Thus, if the baked bread is projected out of an upper edge of the heating vessel at this time, an upper portion of the bread will be brought into contact with a top wall of the heating chamber at the time of unloading of the heating vessel from the heating chamber. Hence, in order to obviate such a phenomenon, space in the heating vessel is required to have a large horizontal area. As a result, the obtained bread is flat and small in height.

(2) If misalignment between the face gear and the mating face gear occurs, slip is produced between tooth surfaces of the face gear and those of the mating face gear, thereby resulting in production of noises.

(3) In order to eliminate the above problem (2), fit between the annular ring and the mating annular ring should be made tight. As a result, a large force is required for loading and unloading the heating vessel. Thus, in some cases, a user may inadvertently strike his hand against the wall of the heating chamber, thus resulting in scorch of the hand.

Meanwhile, a high-frequency heating apparatus is known in which a heating vessel incorporating a stirring blade for kneading cooking materials and a turntable for rotating an article to be heated in order to eliminate nonuniform heating of the article are selectively loaded in a heating chamber. It has conventionally been a general practice that in order to eliminate nonuniform heating of the article, the article is placed on the turntable so as to be heated while rotating the turntable. Furthermore, a high-frequency heating apparatus has recently been proposed in which a heating vessel incorporating a stirring blade is loaded in a heating chamber. In this conventional high-frequency heating apparatus, cooking materials of bread, for example, flour, water, sugar, butter, yeast, etc. are kneaded by the stirring blade, fermented and then, baked so as to make bread. One example of such a high-frequency heating apparatus is described with reference to FIGS. 1 and 2. Microwave is introduced from a magnetron 1, through a waveguide 2, into a heating chamber 3. A cylindrical transmission shaft 5 formed integrally with a driven pulley 4 and a drive shaft 6 inserted into the transmission shaft 5 are rotatably mounted on a bottom portion of the heating chamber 3 so as to be projected into the heating chamber 3. Rotation of a high-speed motor 7 is transmitted to the transmission shaft 5 via a belt 9 trained over a motor pulley 8 and the driven pulley 4, while the drive shaft 6 is directly coupled with a low-speed motor 10. A heating vessel 13 and a turntable 14 are selectively loaded in the heating chamber 3 as shown in FIGS. 1 and 2, respectively. A coupling shaft 11 is rotatably mounted on a bottom portion of the heating vessel 13 and a stirring blade 12 is coupled with the coupling shaft 11.

When the heating vessel 13 has been loaded in the heating chamber 3 as shown in FIG. 1, the coupling shaft 11 is brought into engagement with the transmission shaft 5 so as to be coupled with the transmission shaft 5 such that the stirring blade 12 is rotated at a speed of tens to hundreds of revolutions per minute by the high-speed motor 7. Meanwhile, as shown in FIG. 2, the turntable 14 is mounted on an upper portion of the drive shaft 6 so as to be rotated at a speed of several revolutions per minute by the low-speed motor 10.

Thus, the stirring blade 12 and the turntable 14 are, respectively, driven by the different motors 7 and 10 on the following ground. Namely, in the case where dough is made, the stirring blade 12 for kneading materials of bread is required to be rotated at a speed of tens to hundreds of revolutions per minute as described above. Supposing that the turntable 14 is rotated at the above mentioned high speed, an article to be heated on the turntable 14 is scattered and such a great risk may be incurred that a vessel containing the article is broken.

Meanwhile, in recent years, there is a demand for a compact and inexpensive high-frequency heating apparatus which can be operated with ease. However, the conventional high-frequency heating apparatus employs the separate motors 7 and 10 for driving the stirring blade 12 and the turntable 14 and therefore, becomes large in size and expensive, so that the above described demand cannot be satisfied.

A high-frequency heating apparatus is used for selectively heating a dielectric member by dielectric heating of high frequency and is generally used as an electronic range in households. In recent years, the electronic range is very popular as a cooking apparatus for heating various foods in addition to thawing and reheating of frozen foods.

Generally, in the case where bread is made, cooking materials of bread such as flour, butter, sugar, salt, yeast, water, etc. are put into a heating vessel incorporating a stirring blade for kneading the cooking material of bread, kneaded and then, fermented at temperatures of 30° C. to 40° C. Thereafter, heating and baking of the cooking materials of bread are performed at high temperatures. As a result, a long period of about 2 to 4 hours is required for making the bread.

In the case where the electronic oven has such a function that a cooking completion time can be preset such that the bread is baked at the time when the user has waked up, a still longer period is required for completing cooking of the bread after start of cooking of the bread. In cooking of the bread for such a long time, if a door of the electronic oven is kept open through improper operations of the user or mischief of children during heating or during a waiting time after presetting of the cooking completion time, heating may be held in a state of interruption. Meanwhile, even if the door is closed, heating will be held in a state of interruption unless an operation of starting heating is performed.

Meanwhile, even if the user restarts heating after closing the door by noticing that the door is open, fermentation, for example, progresses in the case where the door has been kept open for a long time during a fermentation process, fermentation of the cooking materials is performed excessively. On the other hand, in the case where the door has been kept open for a long time during a baking process, temperature of the bread, which was once raised, drops, such inconveniences are incurred that the bread is baked insufficiently or quality of the finished bread is extremely inferior.

Furthermore, a high-frequency heating apparatus is known in which the heating vessel is made of a heating material for absorbing microwave. In the case where a bread is baked in the conventional high-frequency heating apparatus, cooking materials of bread are initially kneaded in the heating vessel so as to make dough. Subsequently, the dough is fermented in the heating vessel and then, the heating vessel containing the dough is heated by microwave so as to bake a bread.

However, in the conventional high-frequency heating apparatus, since microwave suddenly heats the heating vessel made of the heating material for absorbing microwave, the temperature of the heating vessel is raised sharply. Hence, the surface of the dough, which is held in contact with the heating vessel, is heated to a high temperature, while the temperature of an interior of the dough is not raised so much. Therefore, since there is a large difference in temperature between the surface and interior of the dough, there is such a drawback that the surface of the dough is scorched before the interior of the dough is heated sufficiently.

Meanwhile, a timing belt mechanism shown in FIG. 3 or 4 is used as a power transmission mechanism of a known high-frequency heating apparatus. The timing belt mechanism includes two rotary members spaced a predetermined distance from each other, i.e. a driving pulley 20 and a driven pulley 21, and a timing belt 22. The timing belt 22 is trained over the pulleys 20 and 21 so as to transmit power. Furthermore, an idler pulley 23 acting as an auxiliary rotary member is provided either outside (FIG. 3) or inside (FIG. 4) an intermediate portion of the timing belt 22 in a running direction of the timing belt 22 and depresses the timing belt 22 so as to strain the timing belt 22. The idler roller 23 is rotatably supported by a shaft 24 mounted on a base member (not shown).

In the case where the idler pulley 23 is disposed outside the timing belt 22 as shown in FIG. 3, an angle of winding of the timing belt 22 over the driving pulley 20 can be made larger than that of the arrangement of FIG. 4 in which the idler pulley 23 is disposed inside the timing belt 22, so that efficiency of power transmission can be advantageously improved more than in the arrangement of FIG. 4.

In such arrangements of the timing belt mechanism, not only abnormal noises are produced through contact of the timing belt 22 with the pulleys 20 and 21 and disengagement of the timing belt 22 from the pulleys 20 and 21 at the time of engagement of the timing belt 22 with the pulleys 20 and 21 but the strained timing belt 22 is vibrated through variations of load applied to the timing belt 22 so as to produce vibratory noises. Therefore, the known high-frequency heating apparatus employing such timing belt mechanism has such a drawback that such noises as the abnormal noises and vibratory noises referred to above are produced.

SUMMARY OF THE INVENTION

Accordingly, a first object of the present invention is to provide a high-frequency heating apparatus in which a heating vessel can be easily loaded in a heating chamber and power transmission to a stirring mechanism of the heating vessel can be performed smoothly, with substantial elimination of the disadvantages inherent in conventional high-frequency heating apparatuses.

A second object of the present invention is to provide a high-frequency heating apparatus of a type enabling selective loading of a heating vessel and a turntable, which is made compact in size and can be produced at low cost.

A third object of the present invention is to provide a high-frequency heating apparatus which can be easily restarted after interruption of heating.

A fourth object of the present invention is to provide a high-frequency heating apparatus in which the temperature of a heating vessel is raised gradually so as to reduce the temperature difference between a surface and an interior of dough such that the surface of the dough is prevented from being scorched before the interior of the dough is sufficiently heated.

A fifth object of the present invention is to provide a high-frequency heating apparatus provided with a power transmission mechanism which can be operated silently through reduction of noises in the power transmission mechanism.

In order to accomplish the first object of the present invention, a high-frequency heating apparatus embodying the present invention comprises: a heating vessel for accommodating an article to be heated, which is detachably loaded in a heating chamber; a stirring mechanism which is provided in said heating vessel; a guide mechanism which guides said heating vessel so as to horizontally displace said heating vessel into said heating chamber from an opening formed on a side face of said heating chamber; a rotational drive mechanism for driving said stirring mechanism so as to rotate said stirring mechanism; and a coupling mechanism for transmitting a driving force from said rotational drive mechanism to said stirring mechanism; said stirring mechanism including a transmission gear which is mounted on a lower end of a stirring shaft extending through a bottom wall of said heating vessel; said coupling mechanism including a gear which is mounted on an upper end of a central shaft in said heating chamber and is engageable with said transmission gear.

BRIEF DESCRIPTION OF THE DRAWINGS

These objects and features of the present invention will become apparent from the following description taken in conjunction with the preferred embodiments thereof with reference to the accompanying drawings, in which:

FIGS. 7a and 7b are views showing direction of displacement of the heating vessel of FIG. 6;

FIGS. 40 to 44 are diagrams showing cooking processes in a second modification of the apparatus of FIG. 30;

Before the description of the present invention proceeds, it is to be noted that like parts are designated by like reference numerals throughout several views of the accompanying drawings.

DETAILED DESCRIPTION OF THE PREFERRED EMBODIMENTS OF THE INVENTION

Figure 1:
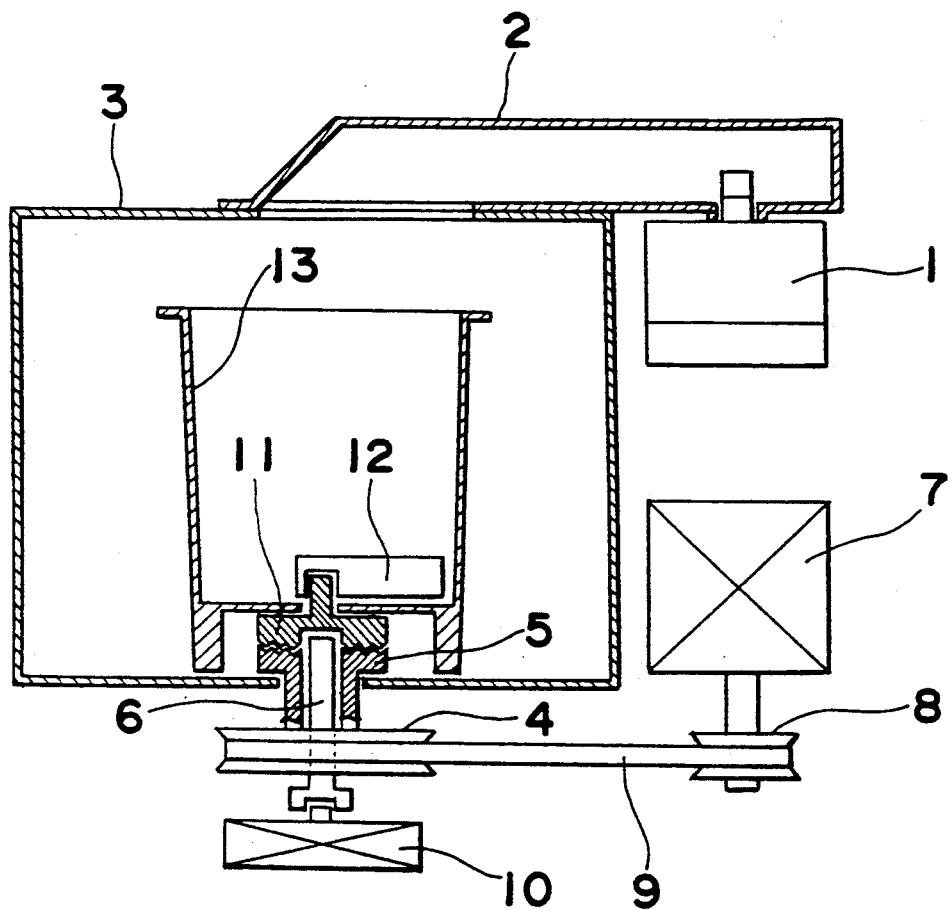
FIG. 1 is a schematic sectional view of a prior art high-frequency heating apparatus in which a heating vessel is loaded (already referred to)
Figure 2:
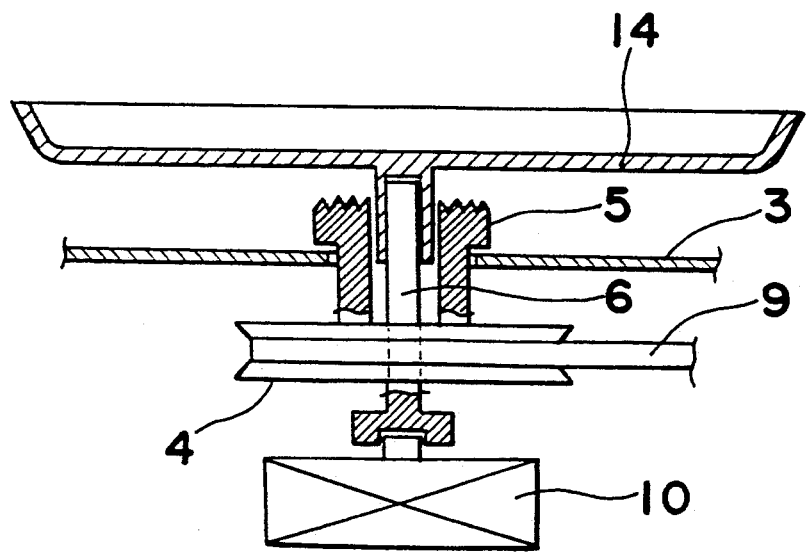
FIG. 2 is a schematic fragmentary sectional view of the prior art apparatus of FIG. 1 in which a turntable is loaded (already referred to)
Figure 3:
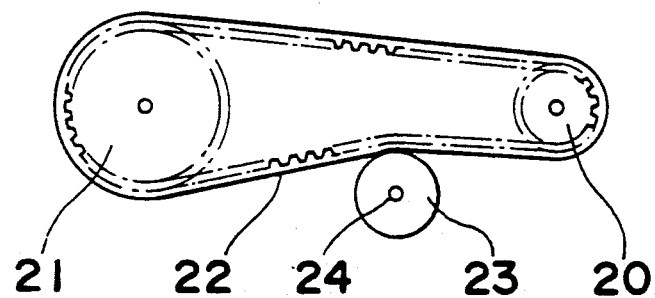
FIGS. 3 and 4 are views showing arrangements of prior art timing belt mechanisms, respectively (already referred to)
Figure 4:
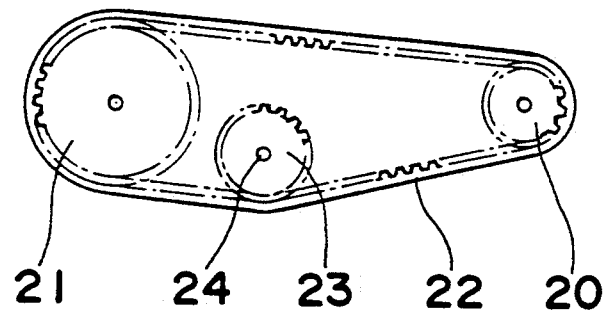

Referring now to the drawings, there is shown in FIGS. 5 to 18, a high-frequency heating apparatus K1 according to a first embodiment of the present invention. The apparatus K1 is an electronic oven or an oven range and enables loading of a heating vessel for making bread. The apparatus K1 includes a rectangular apparatus housing 31 and a heating chamber 33. The heating chamber 33 has an opening 32 (FIG. 18) formed on a side face of the apparatus housing 31 such that an article to be heated is taken into or out of the heating chamber 33. The apparatus K1 further includes a door 34 for closing the opening 32, a heating means 37 for heating the article in the heating chamber 33, a tray or turntable 39 for placing thereon the article, a rotational support member 41 for rotating the turntable 39 about a central shaft 40 supported rotatably by a bottom wall 38 of the heating chamber 33, a rotational drive mechanism 42 for driving the rotational support member 41 for its rotation and a coupling mechanism 43 for transmitting the driving force from the rotational drive mechanism 42 to the rotational support member 41. The heating unit 37 includes magnetron 35 and a waveguide 36. The turntable 39 is detachably placed on the bottom wall 38 of the heating chamber 33.

Furthermore, the apparatus K1 includes a heating vessel 44 for accommodating the article, a stirring mechanism 45 provided in the heating vessel 44, a guide mechanism 46 for guiding the heating vessel 44 so as to horizontally displace the heating vessel 44 into the heating chamber 33 from the opening 32 and a locking mechanism 47 for locking the heating vessel 44 in position in a state of coupling between the stirring mechanism 45 and the coupling mechanism 43. The heating vessel 44 is detachably loaded in the heating chamber 33.

Figure 5:
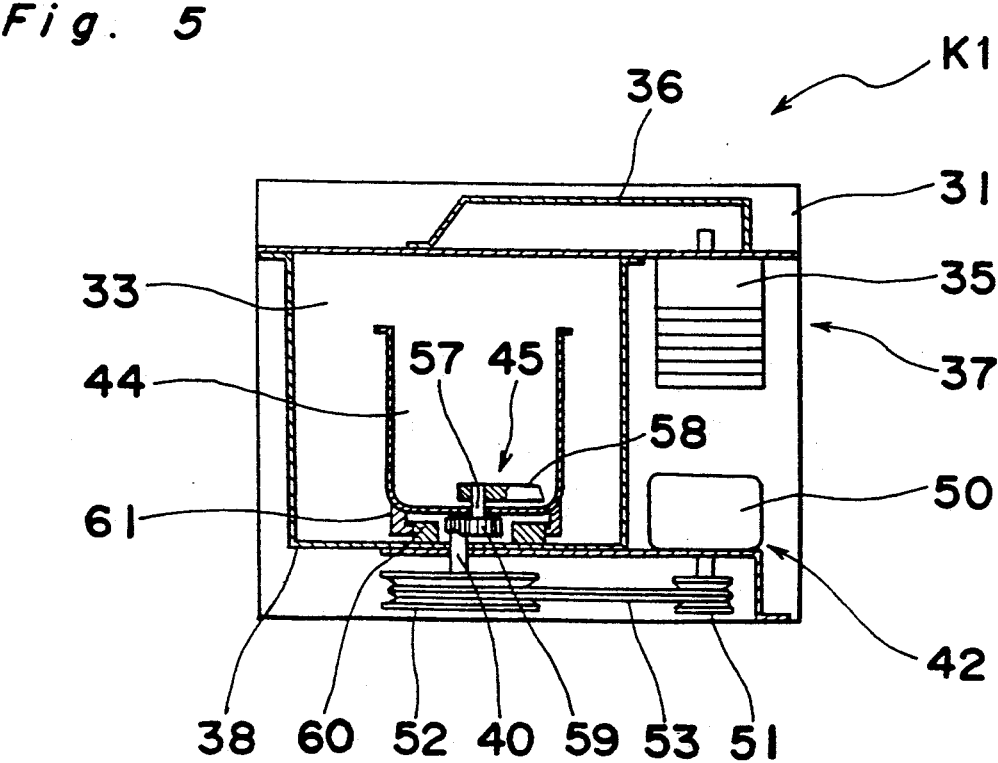
FIG. 5 is a sectional view of a high-frequency heating apparatus according to a first embodiment of the present invention.
Figure 6:
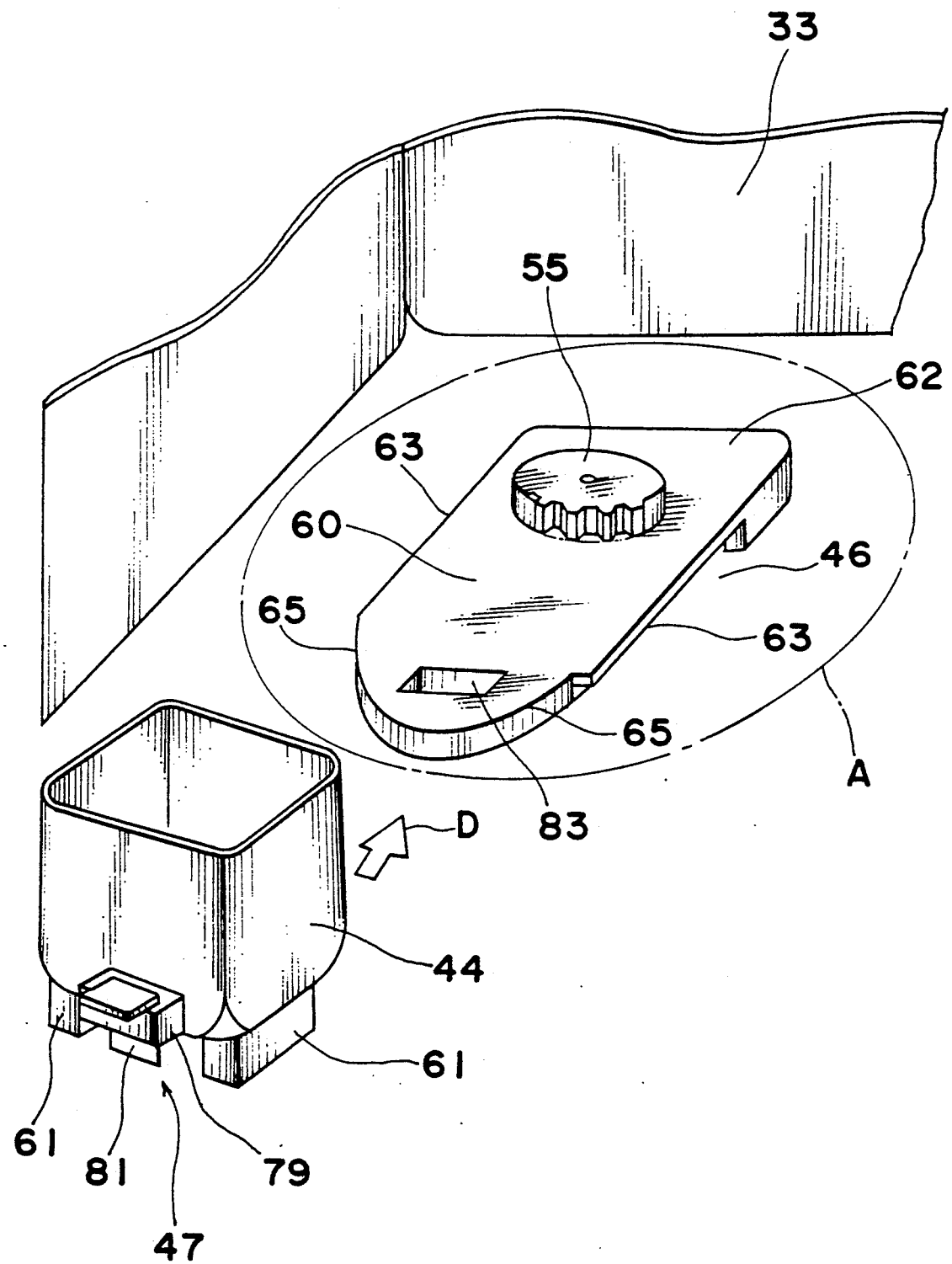
FIG. 6 is a perspective view of a heating vessel and a guide mechanism employed in the apparatus of FIG. 5.
Figure 8:
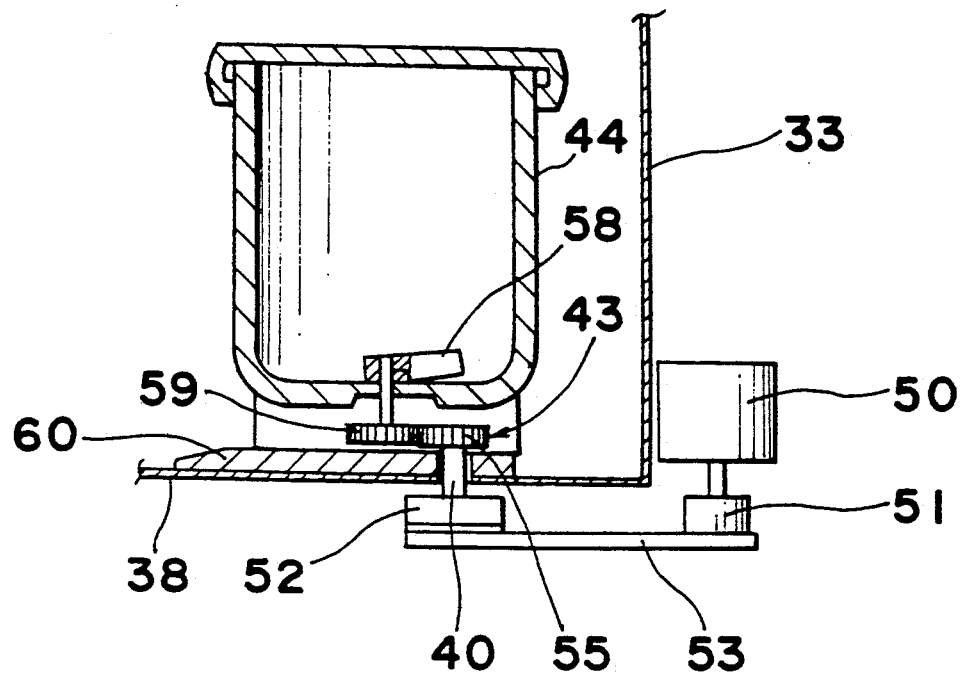
FIG. 8 is a sectional view showing coupling between a stirring mechanism of the heating vessel and a rotational drive mechanism in the apparatus of FIG. 5.
Figure 9:
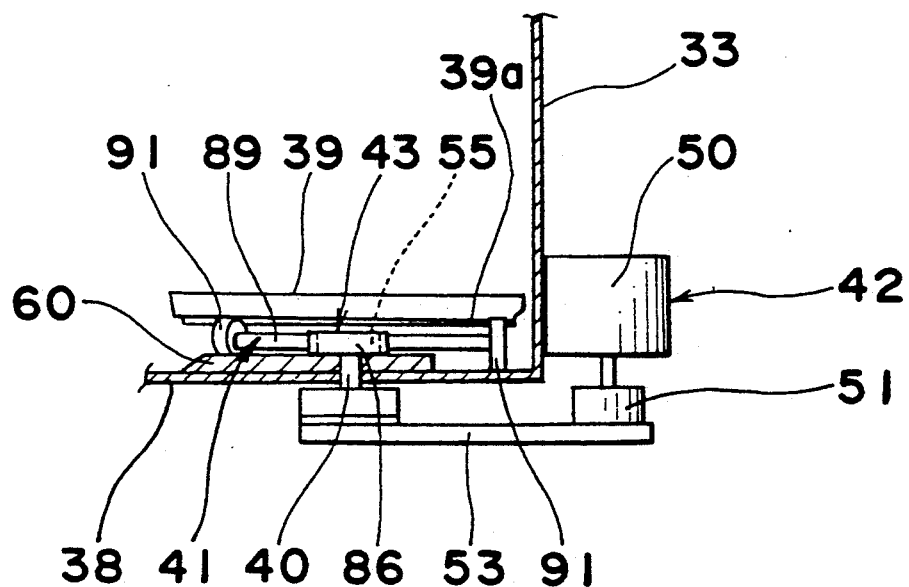
FIG. 9 is a sectional view showing coupling between a turntable and the rotational drive mechanism of FIG. 8.

The rotational drive mechanism 42 serves to rotate not only the turntable 39 but the stirring mechanism 45. As shown in FIG. 5, the rotational drive mechanism 42 includes an electric motor 50 mounted in the apparatus housing 31, a driving pulley 51 secured to an output shaft of the electric motor 50, a driven pulley 52 mounted on a lower end of the central shaft 40 and a belt 53 trained over the pulleys 51 and 52. The coupling mechanism 43 includes a gear 55 mounted on an upper end of the central shaft 40 in the heating chamber 33 such that the gear 55 is engaged with not only the rotational support member 41 and a transmission gear 59 provided at a lower end of the stirring mechanism 45. The heating vessel 44 has a boxlike shape open at its upper face. Materials of bread are put into the heating vessel 44 and is kneaded through its stirring by the stirring mechanism 45 so as to be baked subsequently. The stirring mechanism 45 includes a stirring shaft 57 vertically extending through a bottom wall of the heating vessel 44, a stirring blade 58 mounted on an upper end of the stirring shaft 57 and the transmission gear 59 securely fitted around a lower end of the stirring shaft 57.

Figure 14:
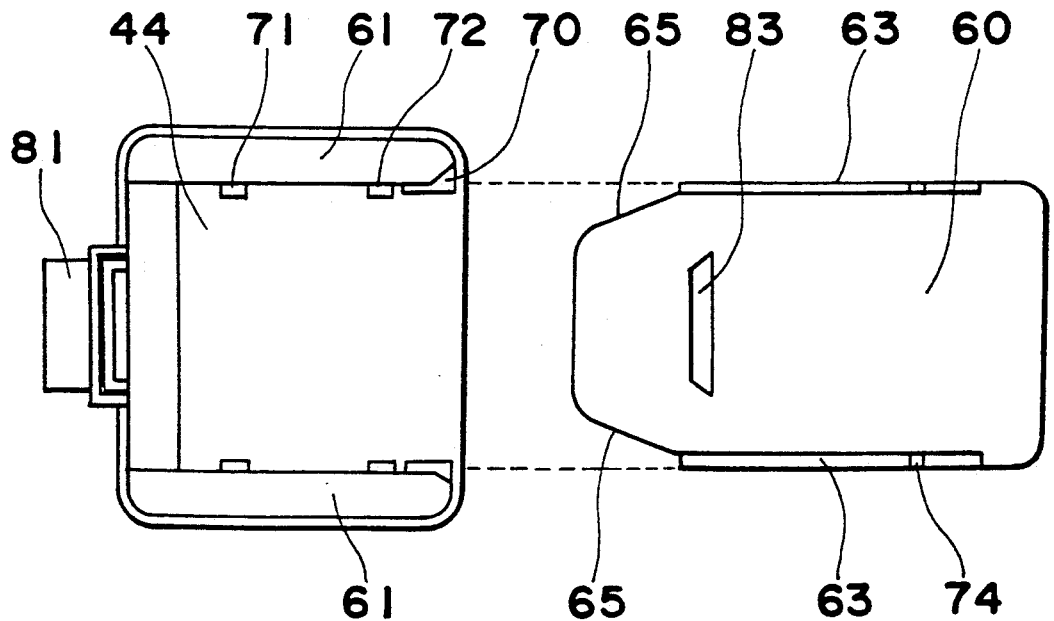
FIGS. 14 and 15 are a bottom view and a side elevational view of the guide mechanism of FIG. 6 and the locking mechanism of FIG. 13, respectively.
Figure 15:
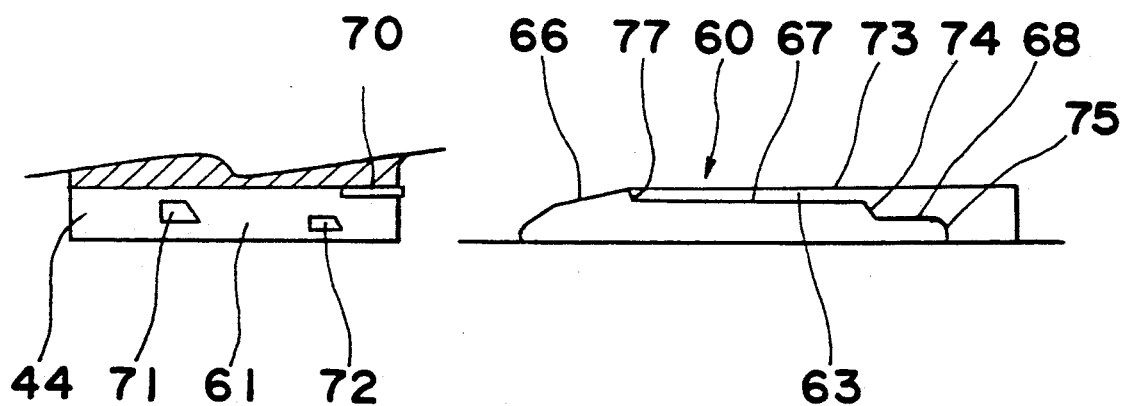

A direction of a line connecting a center of the transmission gear 59 of the stirring mechanism 45 and a center of the gear 55 of the coupling mechanism 43 and a direction of displacement of the heating vessel 44 are made different from each other so as to form an angle $\alpha$ of 0° to 90° as will be described later. The guide mechanism 46 includes a guide base 60 mounted, below the gear 55, on the bottom wall 38 of the heating chamber 33 and a pair of legs 61 extending downwardly from a bottom face of the heating vessel 44. As shown in FIGS. 14 and 15, the guide base 60 includes a support portion 62 having a shape of a rectangular parallelepiped and a pair of lugs 63 extending laterally and outwardly from opposite sides of the support portion 62. In order to facilitate insertion of the guide base 60 in between the legs 61, a pair of oblique cutout faces 65 are formed at opposite sides of a front end of the guide base 60 and an inclined face 66 is formed on an upper face of the front end of the guide base 60 as shown in FIG. 15. The lug 63 has a first and second step portions 67 and 68 formed stepwise so as to have a function of locking the heating vessel 44.

Meanwhile, first, second and third ribs 70, 71 and 72 are formed on an inner side face of each of the legs 61 so as to be guided by each of the lugs 63. The first rib 70 projects from a rear upper end portion of the inner side face of the leg 61 so as to be slid along an upper face 73 of the lug 63. The second rib 71 projects at a substantially central portion of the inner side face of the leg 31 so as to be slid along a lower face of the first step portion 67 of the lug 63 and is so disposed as to be brought into contact with an intermediate oblique face 74 between the first and second step portions 67 and 68. The third rib 72 is disposed, between the first and second ribs 70 and 71 and adjacent to the first rib 70, at a lower portion of the inner side face of the leg 61. The third rib 72 is slid along the second step portion 68 of the lug 63 so as to be brought into contact with a stopper 75 formed at a rear end of the lug 63. A chamfered face 77 is formed at a front end of the first step portion 67 so as to allow the second rib 71 to be slid below the first step portion 67. An end face of each of the first, second and third ribs 70, 71 and 72 is slidable along each of the side faces of the support portion 62. Thus, the heating vessel 44 is positioned vertically and laterally.

Figure 11:
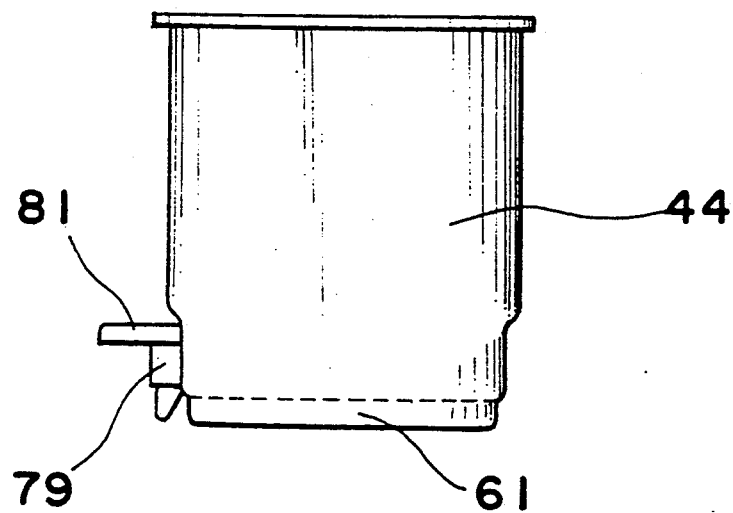
FIG. 11 is a side elevational view of the heating vessel of FIG. 6.
Figure 12:
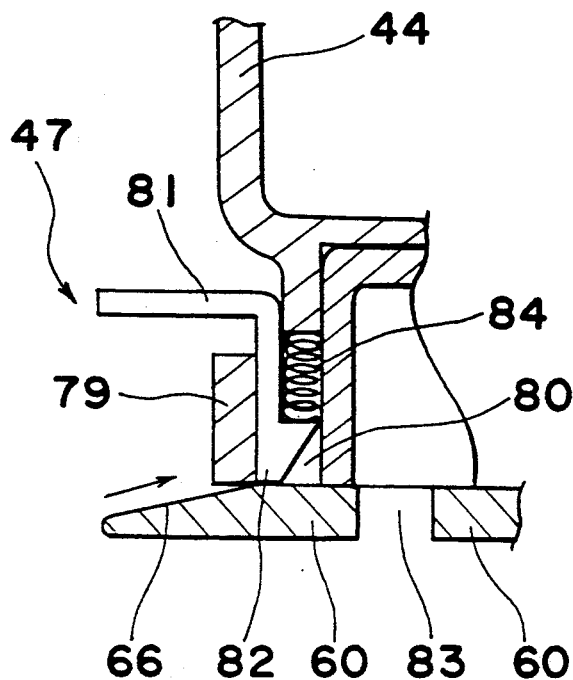
FIGS. 12 and 13 are sectional views showing unlocking and locking states of a locking mechanism employed in the apparatus of FIG. 5, respectively.
Figure 13:
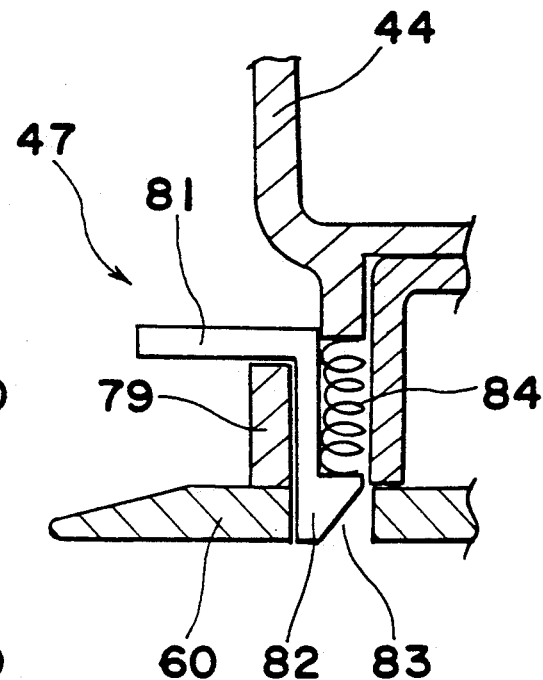

As shown in FIGS. 11, 12 and 13, the locking mechanism 47 includes a holder 79 formed at a lower end of a front face of the heating vessel 44 and a substantially L-shaped locking lever 81 supported by the holder 79. The locking lever 81 is inserted into a vertical central hole 50 of the holder 79 so as to be moved vertically. The locking mechanism 47 further includes a locking opening 83 formed at a central portion of the support portion 62 of the guide base 60 and a coiled spring 84 for urging the locking lever 81 downwardly. The locking opening 83 is detachably engaged with a wedge 82 formed at a lower end of the locking lever 81. The coiled spring 84 is inserted between an upper face of the wedge 82 of the locking lever 81 and a wall face of the heating vessel 44 above the holder 79. Furthermore, the locking mechanism 47 includes the first, second and third ribs 70, 71 and 72 and the first and second step portions 67 and 68 of the guide mechanism 46.

Figure 10:
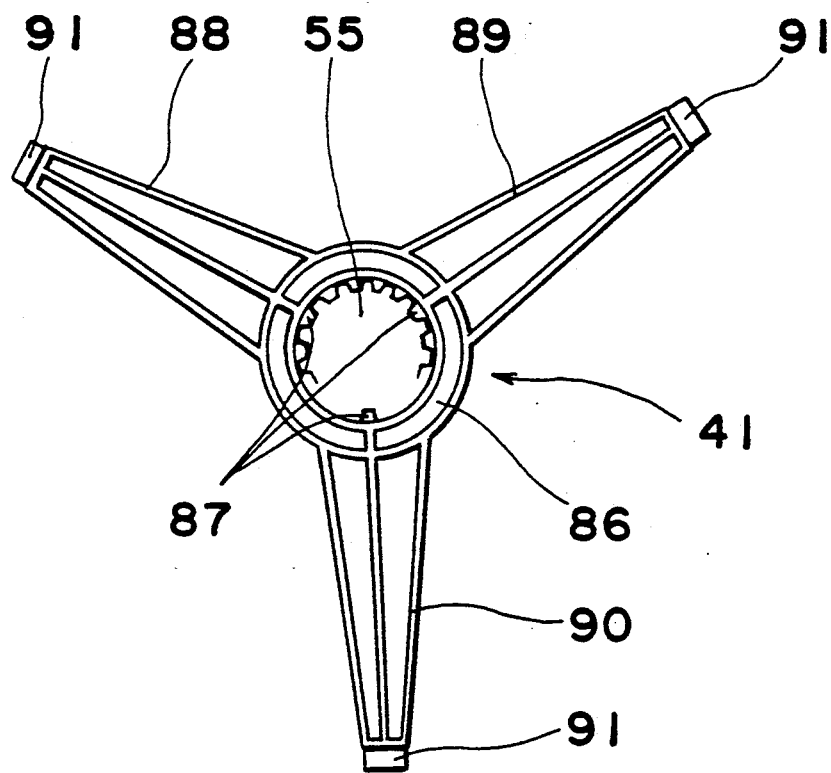
FIG. 10 is a top plan view showing engagement between a rotational support member of the turntable and a coupling gear in the apparatus of FIG. 5.

As shown in FIG. 10, the rotational support member 41 has a ring 86 formed at its central portion. Claws 87 are formed on an inner wall of the ring 86 so as to be brought into engagement with the gear 55 by vertically displacing the ring 86 relative to the gear 55. Three support levers 88, 89 and 90 are radially projected from an outer peripheral surface of the ring 86. A support roller 91 is rotatably supported at a distal end of each of the support levers 88 to 90. The support roller 91 not only rolls on the bottom wall 38 of the heating chamber 33 but is brought into contact with a bottom face 39a of the turntable 39 so as to transmit a rotational force to the turntable 39. A locus of the support roller 91 is illustrated by the one-dot chain line A in FIG. 6.

By the above described arrangement of the apparatus K1, high frequency generated by the magnetron 35 is supplied, through the waveguide 36, to the heating chamber 33 so as to heat food in the heating chamber 33 or the heating vessel 44. When the heating vessel 44 is used, materials of food are inserted into the heating vessel 44 and the heating vessel 44 is thrusted so as to be slid on the bottom wall 38 of the heating chamber 33 in the direction of the arrow D in FIG. 6. Thus, since the legs 61 are displaced along the oblique cutout faces 65 of the front end of the guide base 60, the lugs 63 are fitted in between the legs 61 such that vertical and lateral displacement of the heating vessel 44 relative to the guide base 60 is prevented by the first, second and third ribs 40, 41 and 42. When the heating vessel 44 has been thrusted fully, the third rib 42 of the leg 61 strikes the stopper 75 of the guide base 60 and thus, the heating vessel 44 is stopped. At this time, the gear 59 and the transmission gear 55 are brought into engagement with each other and the locking lever 81, which is slidably mounted on the heating vessel 44 so as to be slid vertically, is inserted into the locking opening 83 of the guide base 60. As a result, the heating vessel 44 is prevented from being thrusted further forwardly through rotation of the gears 55 and 59.

FIGS. 7a and 7b illustrate engagement between the transmission gear 59 and the gear 55. If a direction B of a line connecting centers of the gears 55 and 59 is made coincident with a direction C of displacement of the heating vessel 44 as shown in FIG. 7a, further thrust of the heating vessel 44 cannot be performed in the case where tooth edges of the gears 55 and 59 are butted against each other. However, such an inconvenience can be obviated if positional relations of the gears 55 and 59 are set such that the directions B and C form the angle α as shown in FIG. 7b. Namely, if the heating vessel 44 is further thrusted when tooth edges of the gears 55 and 59 are butted against each other, a turning moment is applied to the gears 55 and 59, engagement between the gears 55 and 59 becomes smoother. Meanwhile, the angle α ranges from 0° to 90° and desirably assumes a value closer to 90°.

Hereinbelow, operation of the locking mechanism 47 is described. When the legs 61 of the heating vessel 44 are slid on the bottom wall 38, the first rib 70 initially slides onto the guide base 60 and then, the third rib 72 passes through the intermediate oblique face 74 so as to be stopped by the stopper 75. Simultaneously, the second rib 71 passes through the chamfered face 77 so as to be stopped by the intermediate oblique face 74. At this time, vertical and lateral play of the heating vessel 44 relative to the guide base 60 is eliminated by the first, second and third ribs 70, 71 and 72.

Figure 16:
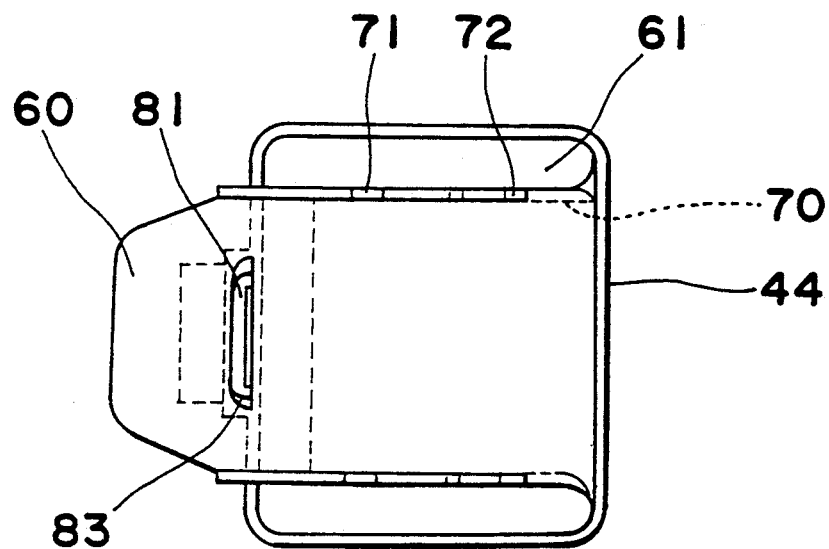
FIGS. 16 and 17 are a bottom view and a side elevational view showing the locking state of the locking mechanism of FIG. 13, respectively.
Figure 17:
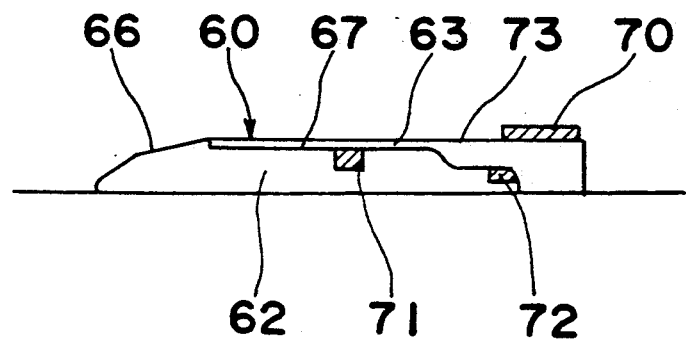
Figure 18:
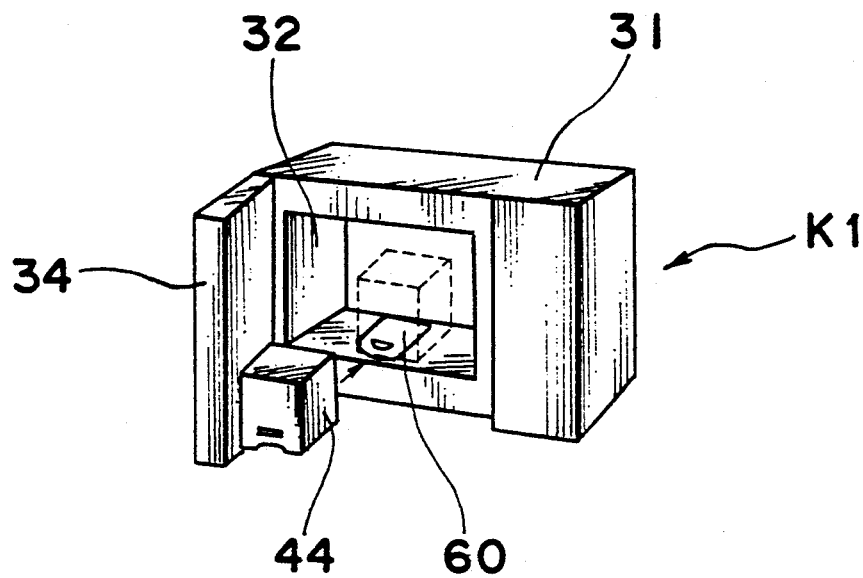
FIG. 18 is a perspective view of the apparatus of FIG. 5.

On the other hand, as shown in FIGS. 12 and 13, the locking lever 81 rides onto the inclined face 66 of the guide base 60. Thus, at the same time when the third rib 72 is stopped by the stopper 75, the locking lever 81 is inserted into the locking opening 83 by an urging force of the coiled spring 84. This state is shown in FIGS. 16 and 17. In FIG. 17, vertical and lateral play of the heating vessel 44 relative to the guide base 60 is eliminated by the first, second and third ribs 70, 71 and 72. Meanwhile, longitudinal play of the heating vessel 44 relative to the guide base 60 is eliminated by the first rib 70 and the locking lever 81 such that the heating vessel is locked to the guide base.

Therefore, in the present invention, since the heating vessel 44 is slidably loaded in the heating chamber 33, the heating vessel 44 can have a considerably large size relative to capacity of the heating chamber 33. Furthermore, by employing the oblique cutout faces 65, the inclined face 66 and the coiled spring 84, the heating vessel 44 can be smoothly inserted into the heating chamber 33 and secured to the heating chamber 33.

Meanwhile, conventionally, in order to transmit a rotational force to the turntable 39, it has been so arranged that the rotational support member 41 is placed on the coupling mechanism (coupling) such that the turntable 39 is placed on the rotational support member 41. However, this known arrangement of the coupling mechanism does not have a sufficient number of engaged portions for rotating the stirring mechanism 45 of the present invention.

In the present invention, the known coupling mechanism is replaced by the gear. Thus, by the single coupling mechanism 43, both a gear method in which the transmission gear 59 for rotating the stirring blade 58 of the heating vessel 44 for making bread, etc. is rotated and a coupling method in which the rotational support member 41 for rotating the turntable 39 is rotated can be employed. Namely, in power transmission to the stirring mechanism 45 at the time of loading of the heating vessel 44, rotation of the electric motor 50 is transmitted to the belt 53 through the driving belt 53 so as to drive the driven pulley 52. Rotation of the driven pulley 52 is transmitted via the central shaft 40 from the gear 55 to the transmission gear 59 so as to rotate the stirring blade 58 coupled with the transmission gear 59.

Meanwhile, in the case where the turntable 39 is placed on the guide base 60, the route of rotational transmission from the electric motor 50 to the gear 55 is identical with that of the above case but the claws 87 of the rotational support member 41 for rotating the turntable 39 are brought into engagement with the gear 55 from above. Therefore, the rotational support member 41 is rotated through engagement between the claws 87 and the gear 55 and thus, the turntable 39 placed on the rotational support member 41 is rotated by the support rollers 91 of the rotational support member 41. It is advantageous for operation of the apparatus K1 that the number of the claws 87 is set to a quotient obtained by dividing the number of teeth of the gear 55 by an integer.

Meanwhile, the present invention is not limited to the above described embodiment and can be modified or changed variously. For example, an electric heater (not shown) can also be employed as a heating source. In order to promote generation of heat, a film made of material which generates heat upon absorption of microwave, for example, silicon carbide is formed on the surface of the heating vessel 44.

Figure 19:
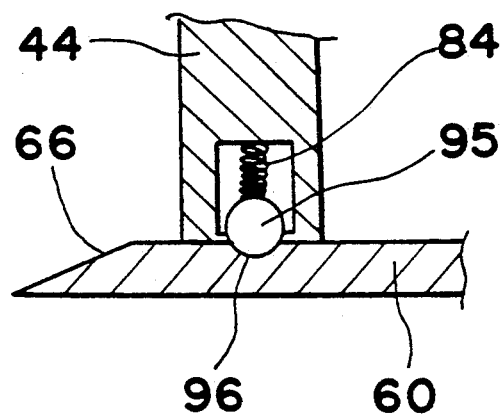
FIG. 19 is a sectional view showing a modification of the locking mechanism of FIG. 13.

Furthermore, as shown in FIG. 19, the locking lever 81 of the locking mechanism 47 can be replaced by a detent mechanism in which a ball 95 is urged towards the guide base 60 by the coiled spring 84 so as to be detachably engaged with a recess 96 formed on the guide base 60.

Figure 20:
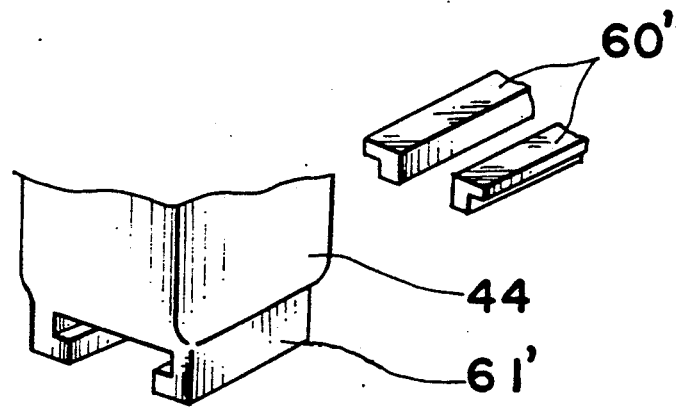
FIG. 20 is a perspective view showing a modification of the guide mechanism of FIG. 6.

Moreover, as shown in FIG. 20, the guide mechanism 46 can be replaced by an arrangement in which L-shaped legs 61' are brought into engagement with a pair of L-shaped guide bases 60'.

As is clear from the foregoing description, in accordance with the first embodiment of the present invention, when materials of food are inserted into the heating chamber so as to be not only stirred but heated or only heated, the heating vessel can be easily loaded in the heating chamber by merely slidably thrusting along the guide mechanism provided on the bottom wall of the heating chamber.

Meanwhile, the line connecting the centers of the gear of the coupling mechanism and the transmission gear does not coincide with the sliding direction of the heating vessel so as to form a proper angle with the sliding direction of the heating vessel. Thus, even if tooth edges of the gear of the transmission gear and the transmission gear are butted against each other at the time of engagement therebetween, the heating vessel can be further thrusted so as to apply a rotational force to the gear of the coupling mechanism and the transmission gear such that the gear of the coupling mechanism and the transmission gear are brought into normal engagement with each other.

Furthermore, since the heating vessel is locked to the guide base by the locking mechanism, the gear of the coupling mechanism and the transmission gear are not disengaged from each other and thus, reliable power transmission from the gear of the coupling mechanism to the transmission gear can be secured.

Moreover, since the coupling mechanism employs the gear, both the gear method in which the transmission gear for rotating the stirring blade of the heating vessel for making bread, etc. is rotated and the coupling method in which the rotational support member for rotating the turntable is rotated can be employed by the single coupling mechanism. As a result, the coupling mechanism can be simplified in structure through a reduction in the number of components of the coupling mechanism.

Referring to FIGS. 21 to 27a and 27b, there is shown a high-frequency heating apparatus K2 according to a second embodiment of the present invention. In the apparatus K2, a shaft 115 is secured to the driven pulley 52 and is rotatably supported by the bottom wall 38 so as to be projected into the heating chamber 33 from the bottom wall 38. A coupling shaft 116 is provided on the heating vessel 44 so as to be mounted on an upper portion of the shaft 115 such that the stirring blade 58 is secured to the coupling shaft 116. Furthermore, a detection device 130 is provided and includes a detection rod 117, a coiled spring 118 for urging the detection rod 117 upwardly and a detection mechanism 131 for deciding, based on the vertical position of the detection rod 117, whether the heating vessel 44 or the turntable 39 has been loaded in the heating chamber 33. The detection rod 117 is vertically retractably projected from the bottom wall 38 into the heating chamber 33.

A rotational speed changeover device 132 is provided so as to change over rotational speed of the electric motor 50 in response to detection signals of the detection device 130. Since the electric motor 50 is a high-speed motor suitable for driving the stirring blade 58 of the heating vessel 44, the rotational speed changeover device 132 may be operated only for driving the turntable 39 so as to decelerate the electric motor 50 such that a predetermined rotational speed for the turntable 39 is obtained. The rotational speed changeover device 132 may be based on any one of known methods such as voltage control, phase control, frequency control, intermittent control, etc. In order to perform feedback control of the electric motor 50 by a rotational speed control device 133 so as to set the electric motor 50 to the rotational speed changed over by the rotational speed changeover device 132, a rotational speed detecting device 119 for detecting rotational speed of the electric motor 50 is provided.

Figure 21:
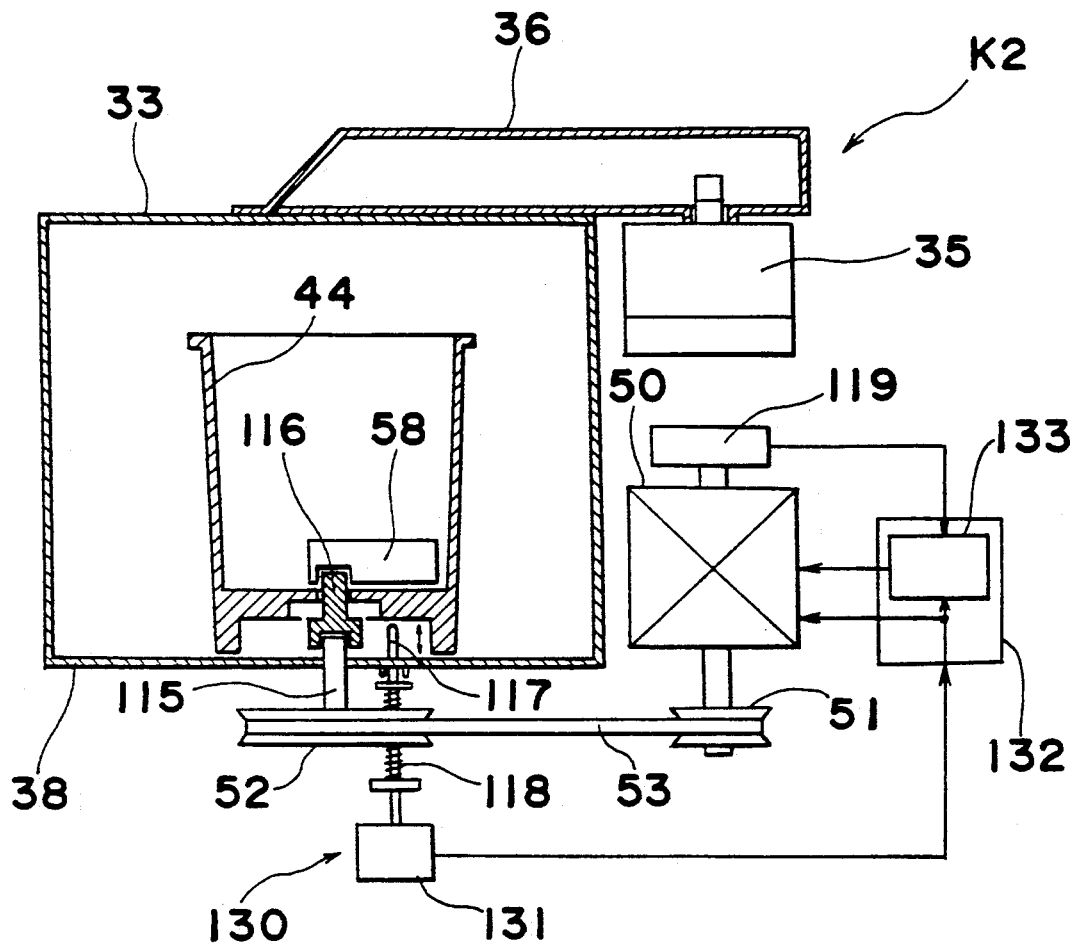
FIG. 21 is a schematic sectional view of a high-frequency heating apparatus according to a second embodiment of the present invention, in which a heating vessel is loaded.

Hereinbelow, the operation of the apparatus K2 is described with reference to FIGS. 23 to 27a and 27b. Initially, in the case where the heating vessel 44 has been loaded in the heating chamber 33 as shown in FIG. 21, the coupling shaft 116 is mounted on the upper portion of the shaft 115 so as to be coupled with the shaft 115. At this time, the detection rod 117 is depressed downwardly to a lower position against an urging force of the coiled spring 118 and thus, the detection mechanism 131 detects, based on the lower position of the detection rod 117, that the heating vessel 44 has been loaded in the heating chamber 33. In response to this detection signal of the detection device 130, the rotational speed changeover device 132 changes over the rotational speed of the electric motor 50. Namely, in this case, since the stirring blade 58 corresponding to a rated rotational speed of the electric motor 50 is driven for its rotation, electric power is supplied to the electric motor 50 without any control so as to drive the electric motor 50 at the rated rotational speed such that the rotational speed of the electric motor 50 is reduced to a predetermined rotational speed for the stirring blade 58 at a ratio of the diameter of the driving pulley 51 to the diameter of the driven pulley 52.

Figure 22:
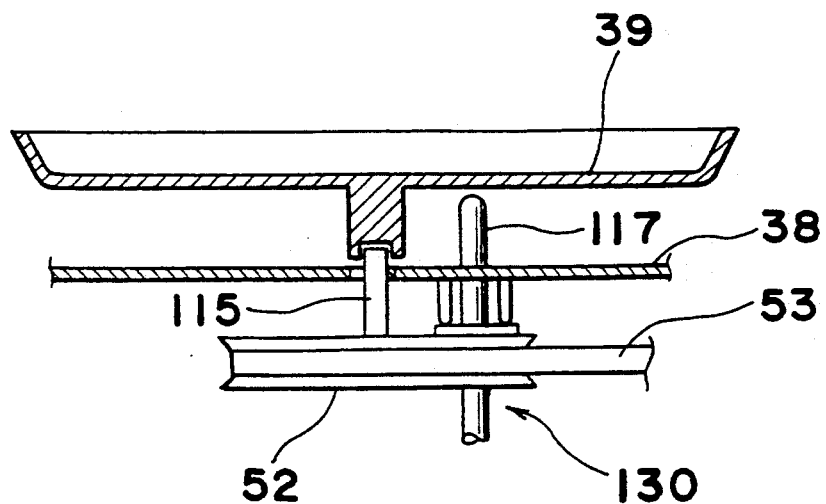
FIG. 22 is a schematic fragmentary sectional view of the apparatus of FIG. 21, in which a turntable is loaded.

Meanwhile, in the case where the turntable 39 has been loaded in the heating chamber 33 as shown in FIG. 22, a bottom face of the turntable 39 is disposed above the detection rod 117, so that the detection rod 117 is not depressed by the turntable 39 and thus, the detection device 130 detects that the turntable 39 has been loaded in the heating chamber 33. As a result, the rotational speed of the electric motor 50 is changed over to 10% of that for the heating vessel 44. At this time, the relation between the number of revolutions and the torque of the electric motor 50 is expressed by the characteristic curve (1) of FIG. 24. Assuming that torque applied to the electric motor 50 has a value To shown by the line (4), the line (4) intersects with the curve (1) at points a and b. The number Na of revolutions at the point a exhibits the rotational speed corresponding to the turntable 39, while the number Nb of revolutions at the point b exhibits the rotational speed corresponding to the heating vessel 44. Therefore, if the electric motor 50 is operated at the point b, the number Nb of revolutions at the point b is the rated number of revolutions of the electric motor 50 and thus, the electric motor 50 is rotated stably. On the other hand, if the electric motor 50 is operated at the point a, torque applied to the electric motor 50 upon rotation of the turntable 39 is not constant and therefore, quite unstably varies, for example, to a value To' shown by the line (5). In response to the variations, either the number of revolutions is increased along the characteristic curve (1) to the value Nb such that the electric motor 50 is driven at the point b or rotation of the electric motor 50 is stopped at the point h.

Figure 25:
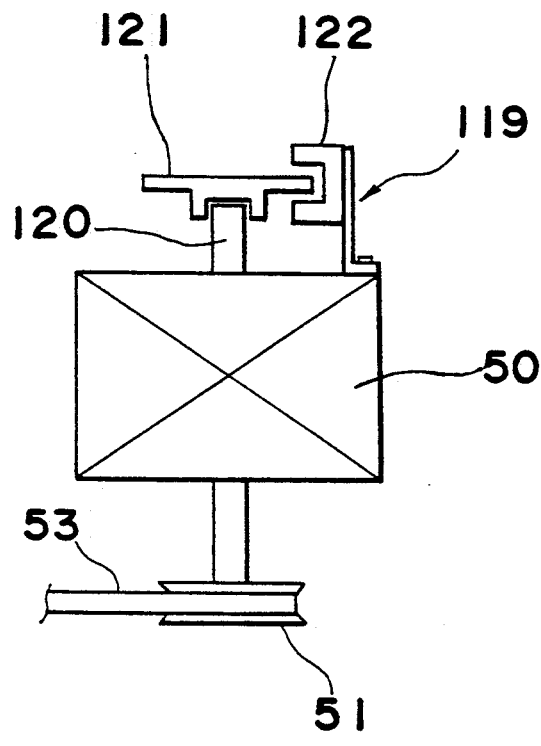
FIG. 25 is a front elevational view of a rotational speed detecting device employed in the apparatus of FIG. 21.
Figure 26A:
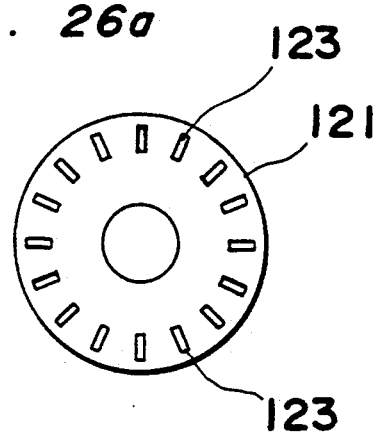
FIGS. 26a and 26b are a top plan view and a front elevational view of a disc of the rotational speed detecting device of FIG. 25, respectively.
Figure 26B:
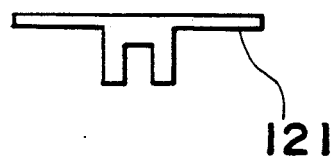
Figure 27A:
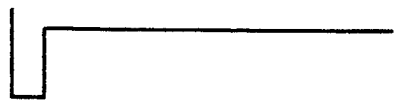
FIGS. 27a and 27b are waveform charts of an input signal and an output signal of the rotational speed detecting means of FIG. 25, respectively.
Figure 27B:
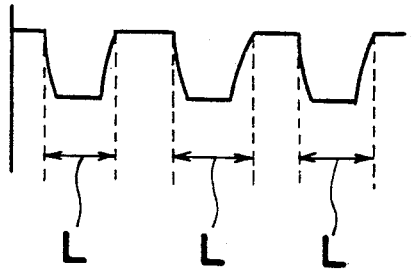

Thus, the rotational speed of the electric motor 50 is detected by the rotational speed detecting device 119 so as to be subjected to feedback control by the rotational speed control device 133 based on a value detected by the rotational speed detecting device 119. As shown in FIGS. 25, 26a and 26b, the rotational speed detecting device 119 includes a disc 121 mounted coaxially on the output shaft 120 of the electric motor 50 and a U-shaped photo interrupter 122. The photo interrupter 122 interpose a part of the disc 121 between leg portions of the photo interrupter 122. As shown in FIG. 26a, a plurality of slits 123 are formed along a peripheral edge of the disc 121 at an identical interval. Accordingly, if a signal having a wave form of FIG. 27a is inputted to the photo interrupter 122, an output signal of the photo interrupter 122 includes pulses having a waveform of FIG. 27b in response to rotation of the disc 121 rotating together with the electric motor 50. In the waveform of FIG. 27b, portions L correspond to the slits 123. As the rotational speed of the electric motor 50 is increased, the period of the waveform of the pulses is shortened. On the contrary, as the rotational speed of the electric motor 50 is reduced, the period of the waveform of the pulses is increased. Therefore, by reading the number of the output pulses of the photo interrupter 122 by an LSI (not shown), the rotational speed of the electric motor 50 is detected.

Figure 23:
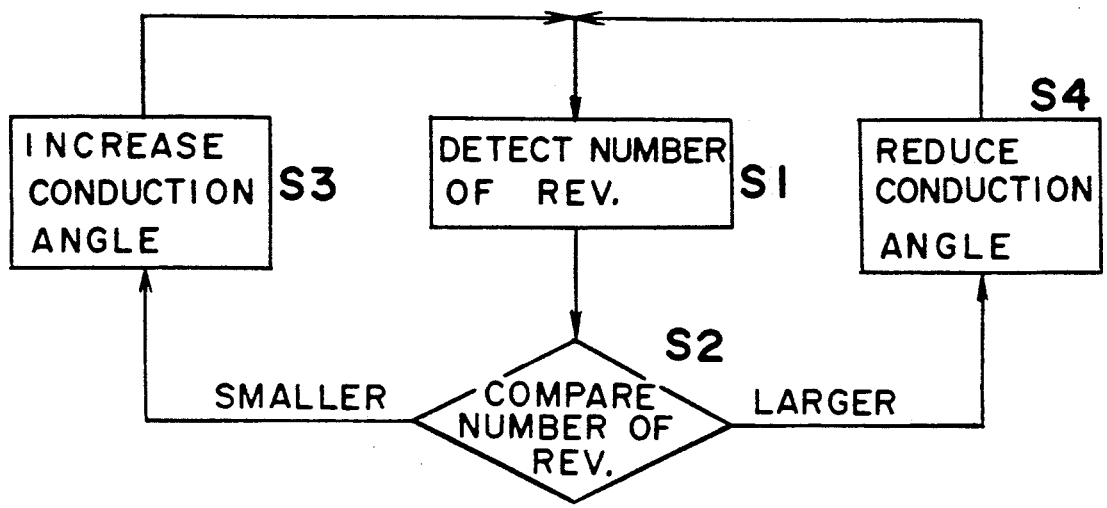
FIG. 23 is a flow chart showing processing sequence of a rotational speed control device employed in the apparatus of FIG. 21.
Figure 24:
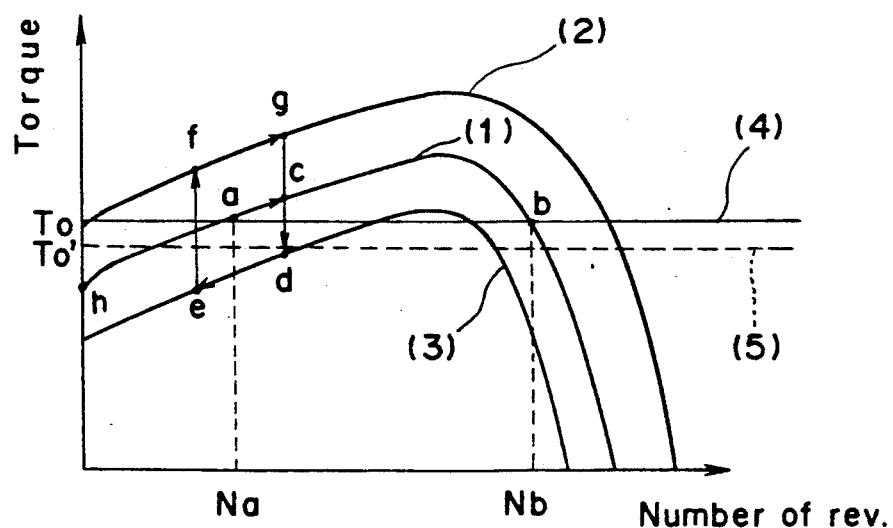
FIG. 24 is a graph showing characteristics of relation between the number of revolutions and torque of a motor in rotational speed control of the rotational speed control device of FIG. 23.

Phase control of the rotational speed control device 133 is described with reference to a flow chart of FIG. 23 and FIG. 24, hereinbelow. At step S1, the number of revolutions per minute, i.e. the rotational speed of the electric motor 50 is detected by the rotational speed detecting device 119. Then, at step S2, this detected rotational speed is compared with a predetermined rotational speed. If this detected rotational speed is identical with the predetermined rotational speed, the electric motor 50 is operated at, for example, the point a of the characteristic curve (1) of FIG. 24 and torque of the electric motor 50 coincides, at the point a, with torque applied to the electric motor 50. However, if torque applied to the electric motor 50 becomes smaller than the value To so as to assume the value To', the point of operation of the electric motor 50 is displaced from the point a to the point c along the characteristic curve (1), so that the rotational speed detecting device 119 detects at step S2 that the rotational speed of the electric motor 50 has been increased excessively. Thus, at step S4, feedback control is performed by the rotational speed control device 133 such that the conduction angle is reduced, so that the point of operation of the electric motor 50 is set to the point d of the characteristic curve (3).

Since the torque To' applied to the electric motor 50 becomes larger than the torque of the electric motor 50 at the point d, the rotational speed of the electric motor 50 drops so as to proceed towards the point e along the characteristic curve (3). When the rotational speed of the electric motor 50 has dropped to the point e, the rotational speed detecting device 119 detects at step S2 that the rotational speed of the electric motor 50 has dropped excessively. Hence, at step S3, feedback control is performed by the rotational speed control device 133 such that the conduction angle is increased. Thus, the point of operation of the electric motor 50 proceeds towards the point f of the characteristic curve (2). Since the torque of the electric motor 50 at the point f is larger than the torque To' applied to the electric motor 50, the rotational speed of the electric motor 50 is increased towards the point g along the characteristic curve (2). Subsequently, the above described operations are repeated in a loop of the points d, e, f and g. As a result, the rotational speed of the electric motor 50 is so controlled as to assume the value Na for the turntable 39.

Figure 28:
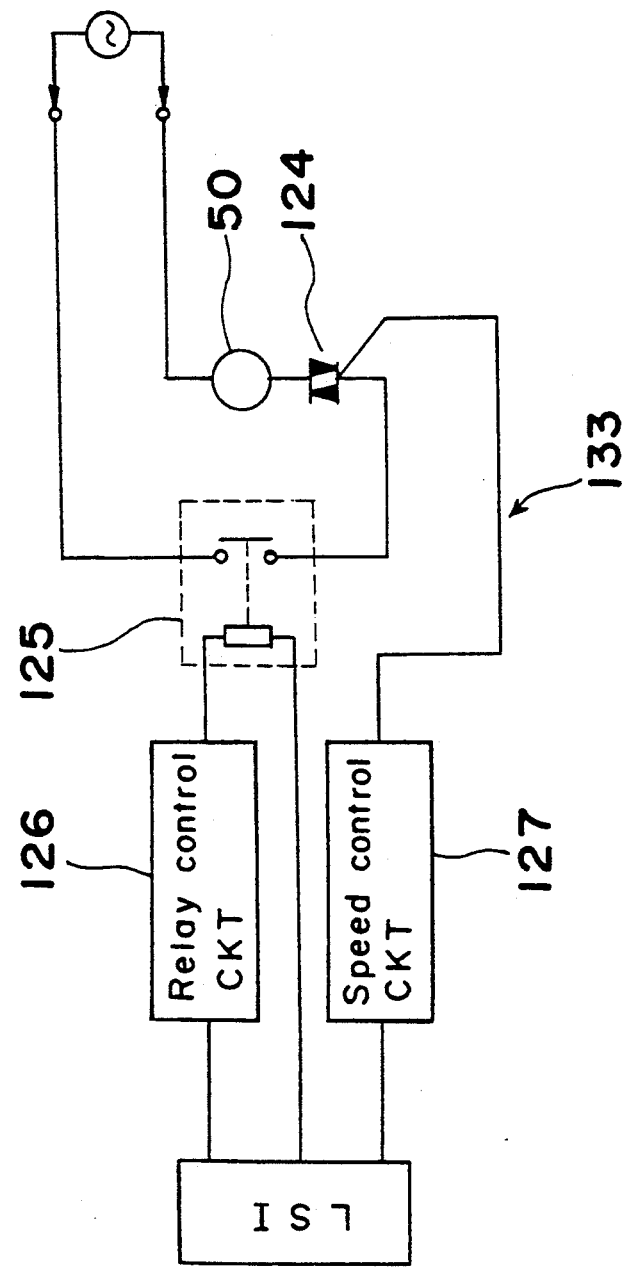
FIG. 28 is a block diagram of a control circuit of a rotational speed control device employed in the apparatus of FIG. 21.

Then, control of abnormal rotation of the electric motor 50 is described with reference to FIGS. 28 and 29. In the case where a triac 124 controls the operation of the electric motor 50 and is short-circuited as shown in FIG. 28, the electric motor 50 is caused to be rotated at the rated rotational speed at all times. Thus, a loop of steps S1, S2 and S4 is repeated. However, by setting a minimum conduction angle as shown in FIG. 29 so as to compare the conduction angle with the minimum conduction angle at step S6, abnormal rotation of the electric motor 50 is detected and thus, the power supply to the electric motor 50 is shut off by turning off a relay 125 of FIG. 28.

Figure 29:
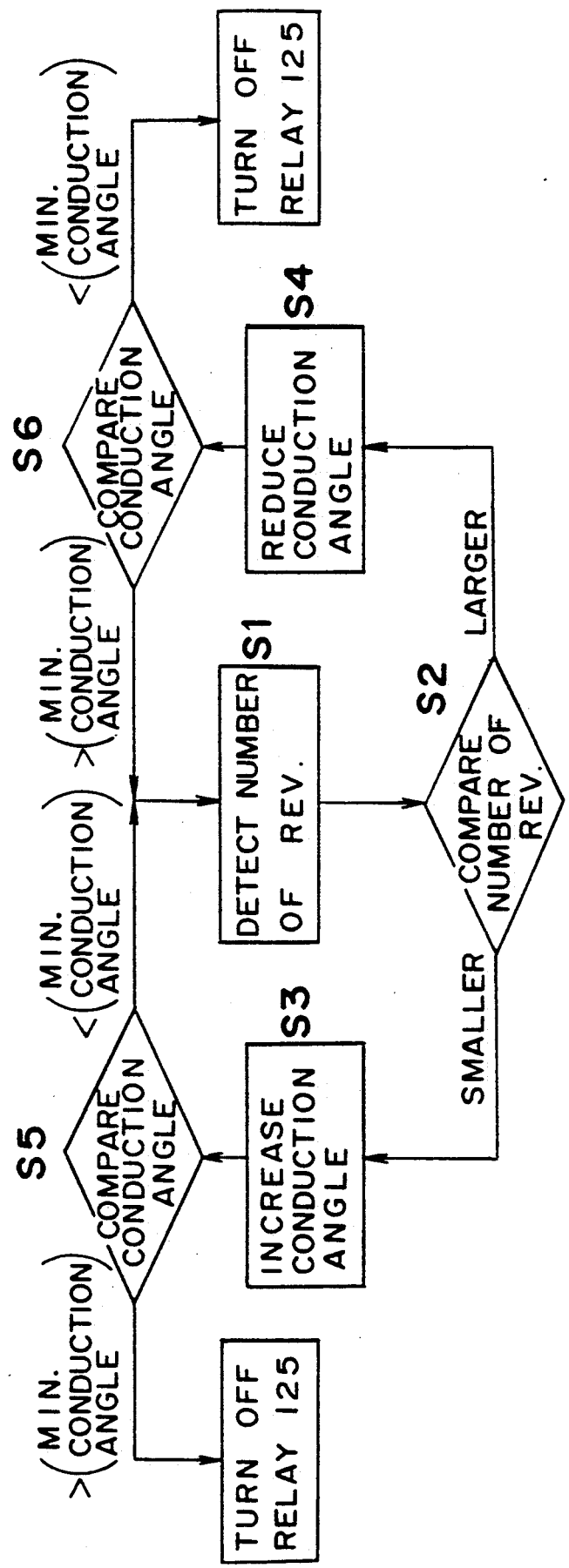
FIG. 29 is a flow chart showing processing sequence of an abnormal rotation detecting means employed in the apparatus of FIG. 21.

On the other hand, when the triac 124 has been set in an open state, it is decided at step S5 of FIG. 29 that the electric motor 50 has been stopped. Meanwhile, when the photo interrupter 122 of the rotational speed detecting device 119 functions abnormally, a decision is made in the same manner as in the case where the relay 125 is held in the OFF state and the triac 124 is in an open state.

Meanwhile, the rotational speed detecting device 119 is not restricted to the above described optical unit but can be replaced by a known member such as an encoder.

As is clear from the foregoing, in the high-frequency heating apparatus K2 according to the second embodiment of the present invention, both the heating vessel and the turntable having different rotational speeds can be driven by the single motor through changeover of rotational speed of the motor. Therefore, the apparatus K2 can be remarkably simplified in structure through reduction of the number of components and can be not only made considerably compact but produced at low cost. Furthermore, in the case of abnormal rotation of the motor, the motor is stopped so as to eliminate danger to the operator.

Meanwhile, in the apparatus K2, since the motor has a rated rotational speed corresponding to the rotational speed for the stirring blade of the heating vessel such that rotation of the motor is subjected to feedback control during the drive of the turntable having a rotational speed lower than the rotational speed of the stirring blade by detecting the rotational speed of the motor, low-speed rotation of the high-speed motor can be performed quite stably, so that the two members having different rotational speeds can be driven smoothly by the motor.

Figure 32:
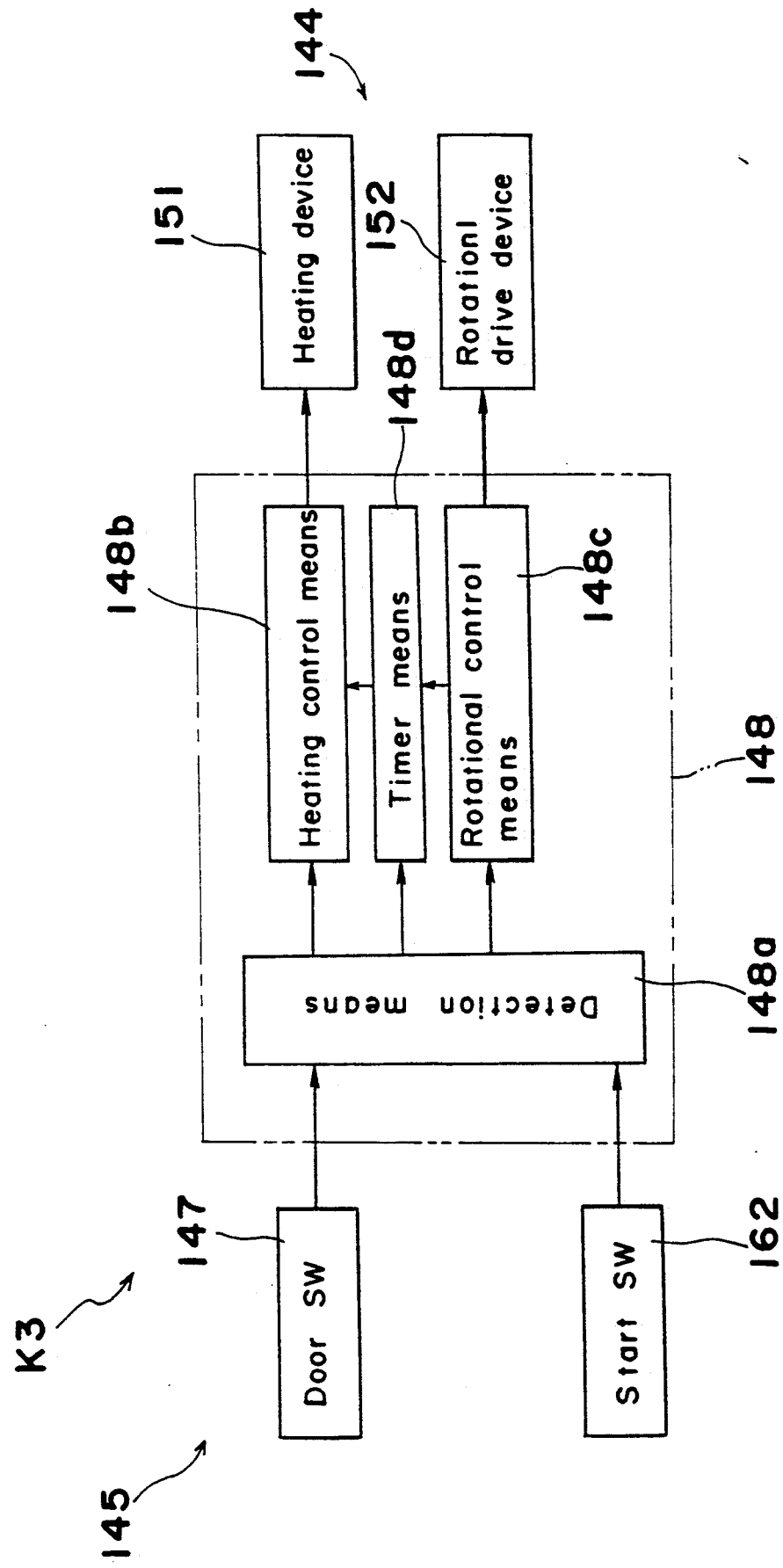
FIG. 32 is a block diagram of a control device of the apparatus of FIG. 30.
Figure 33:
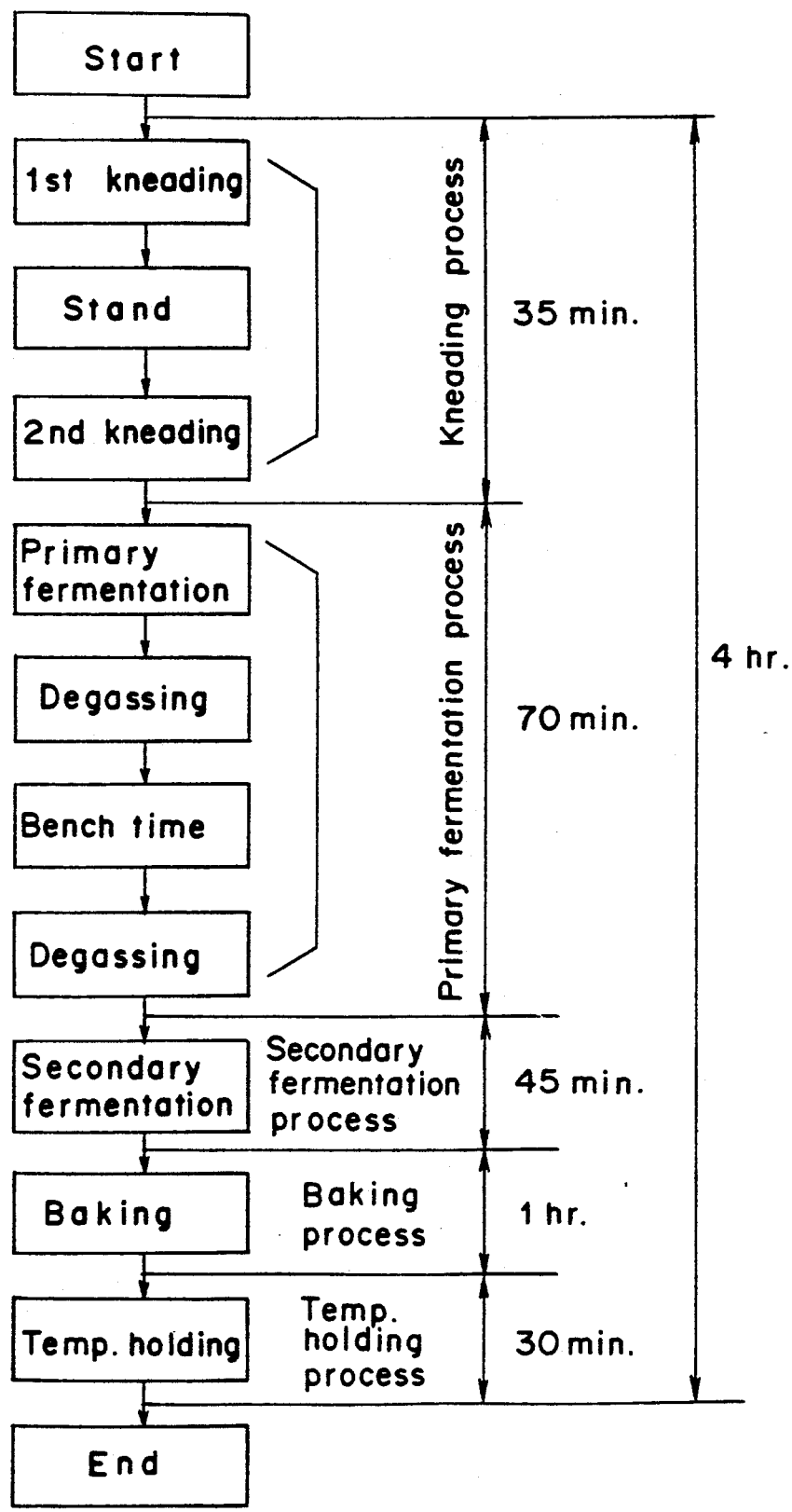
FIG. 33 is a flow chart showing sequence of cooking of bread in the apparatus of FIG. 30.
Figure 34:
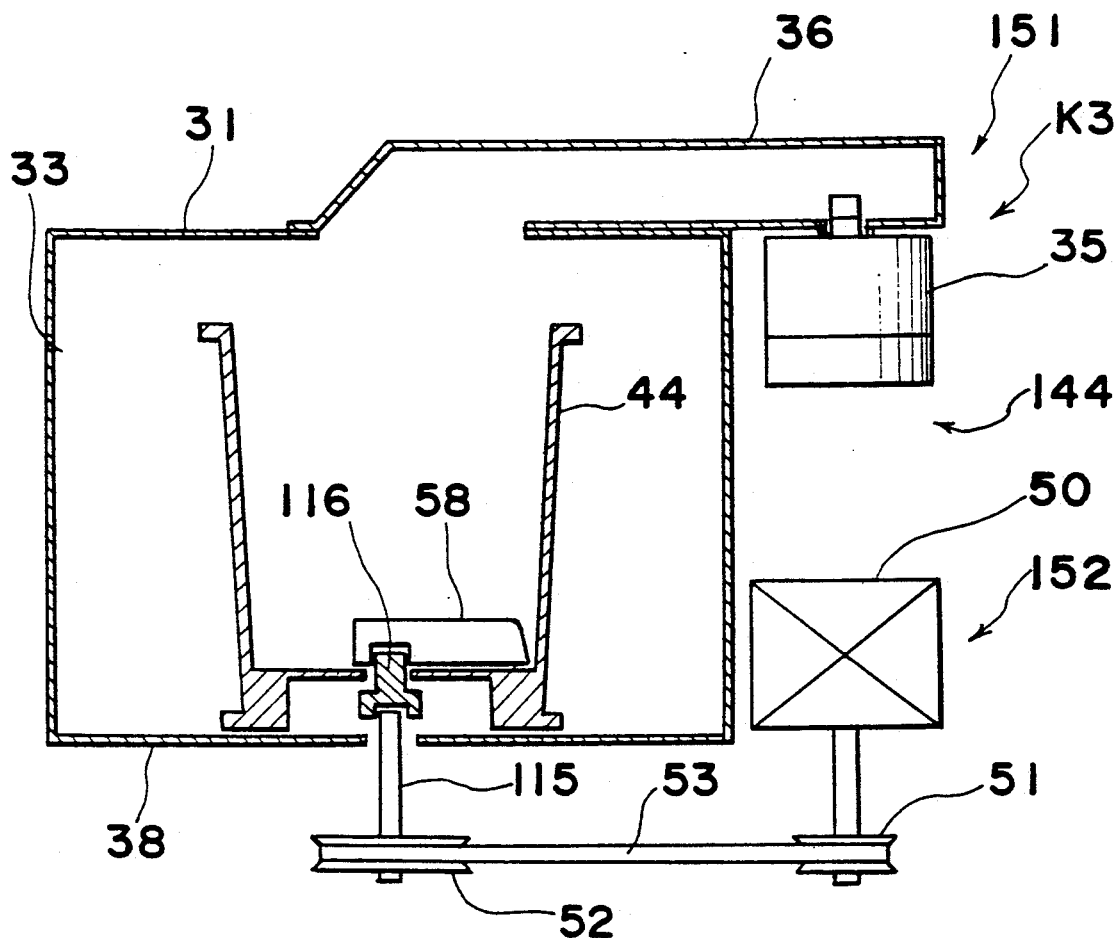
FIG. 34 is a sectional view of the apparatus of FIG. 30, in which a heating vessel is loaded.

Referring further to FIGS. 30 to 35, there is shown a high-frequency heating apparatus K3 according to a third embodiment of the present invention. As shown in FIGS. 32 and 34, the apparatus K3 includes a drive unit 144 for heating and driving the heating vessel 44 detachably loaded in the heating chamber 33 and a control unit 145 for controlling the drive unit 144.

The control unit 145 includes a door switch 147 for detecting opening and closing of the door 34 of the heating chamber 33 and a control circuit 148. The control circuit 148 is arranged to stop the drive unit 144 during actuation of the drive unit 144 in response to a signal of the door switch 147 indicative of opening of the door 34 and automatically restarting the drive unit 144 subsequently in response to a signal of the door switch 147 indicative of closing of the door 34.

The heating vessel 44 is used for making bread by performing therein all the cooking processes including kneading, fermentation, baking and temperature holding. A film which generates heat upon absorption of microwave is formed on an outer periphery of the heating vessel 44.

The drive unit 144 is constituted by a heating device 151 for heating an article in the heating vessel 44 by heating the heating vessel 44 and a rotational drive device 152 for rotating the stirring blade 58 in the heating vessel 44.

As shown in FIG. 34, the heating device 151 includes the magnetron 35 and the waveguide 36. Meanwhile, the rotational drive device 152 includes the electric motor 50 mounted on the apparatus housing 31, the driving pulley 51 secured to the output shaft of the electric motor 50, the shaft 115 rotatably supported by the bottom wall 38 of the heating chamber 33, the driven pulley 52 mounted on the lower end of the shaft 115, the belt 53 trained over the pulleys 51 and 52 and the coupling shaft 116 for coupling the shaft 115 with the stirring blade 58.

Figure 35:
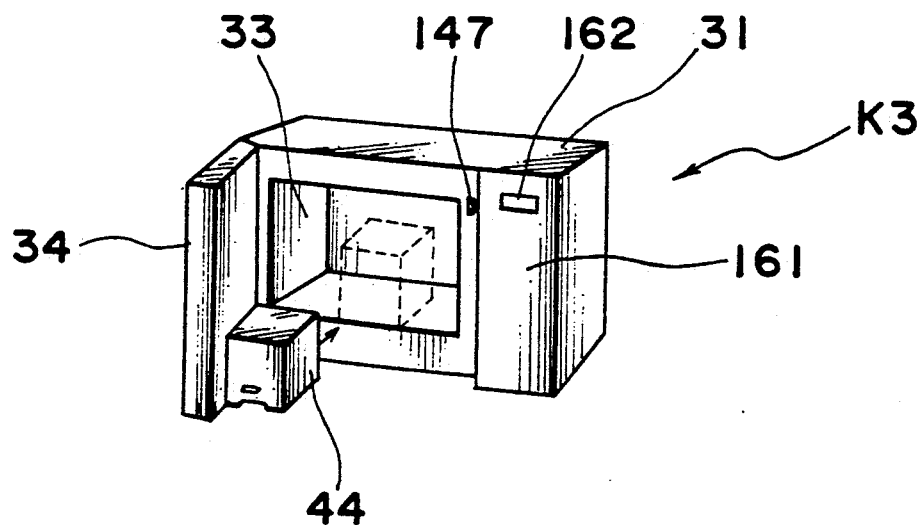
FIG. 35 is a perspective view of the apparatus of FIG. 30.
Figure 36:
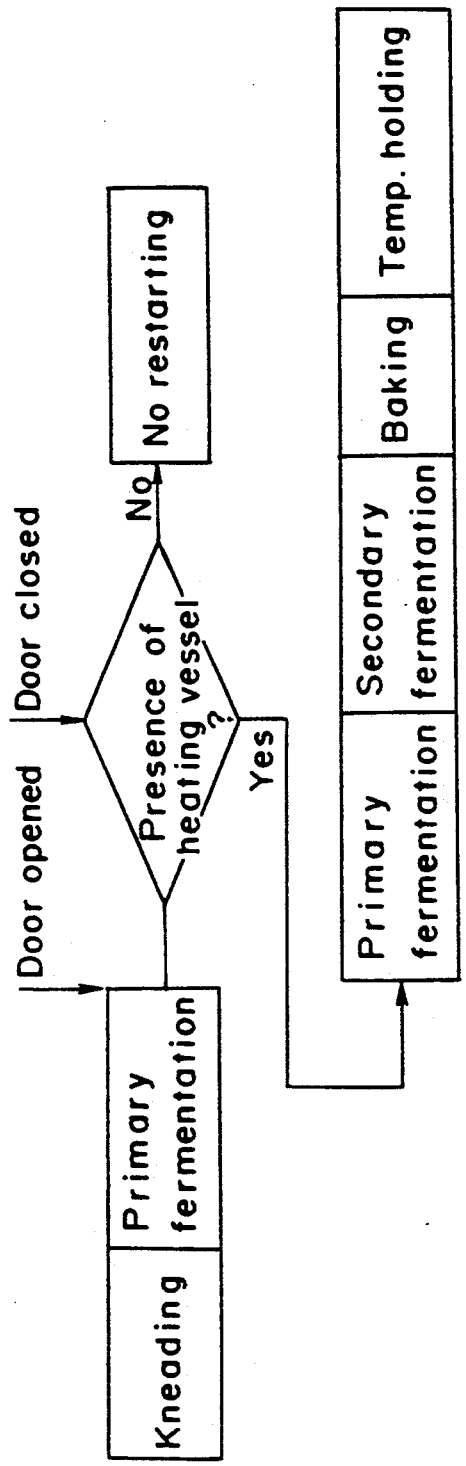
FIG. 36 is a diagram similar to FIG. 31, particularly showing a first modification of the apparatus of FIG. 30.
Figure 37:
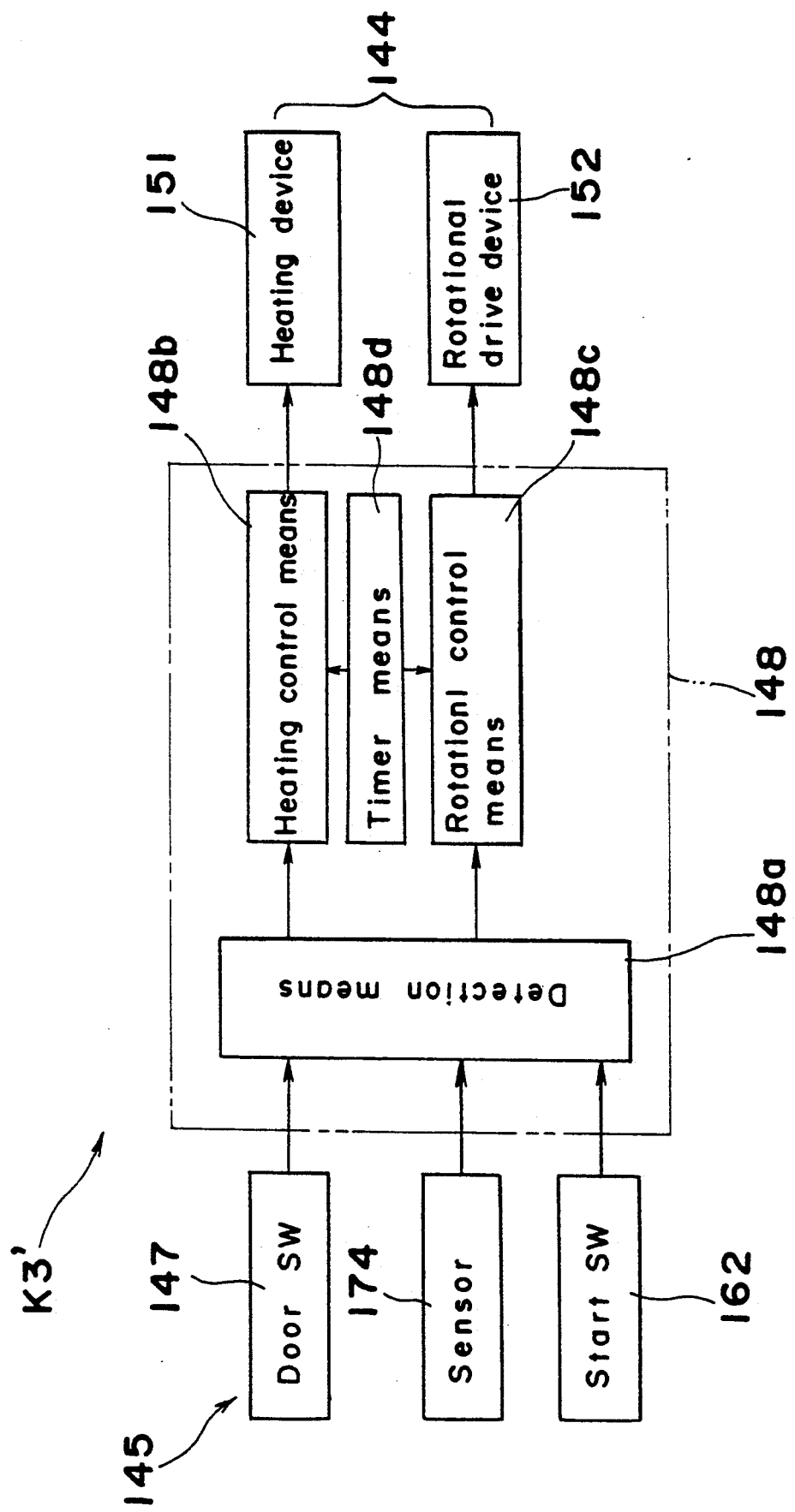
FIG. 37 is a block diagram of a control device of the apparatus of FIG. 36.

As shown in FIG. 35, the door 34 is provided for opening and closing the front opening of the heating chamber 33 and the door switch 147 is provided on a front wall of the apparatus housing 31. Meanwhile, an operating panel 161 provided on the front wall of the apparatus housing 31 includes a start switch 162.

Figure 38:
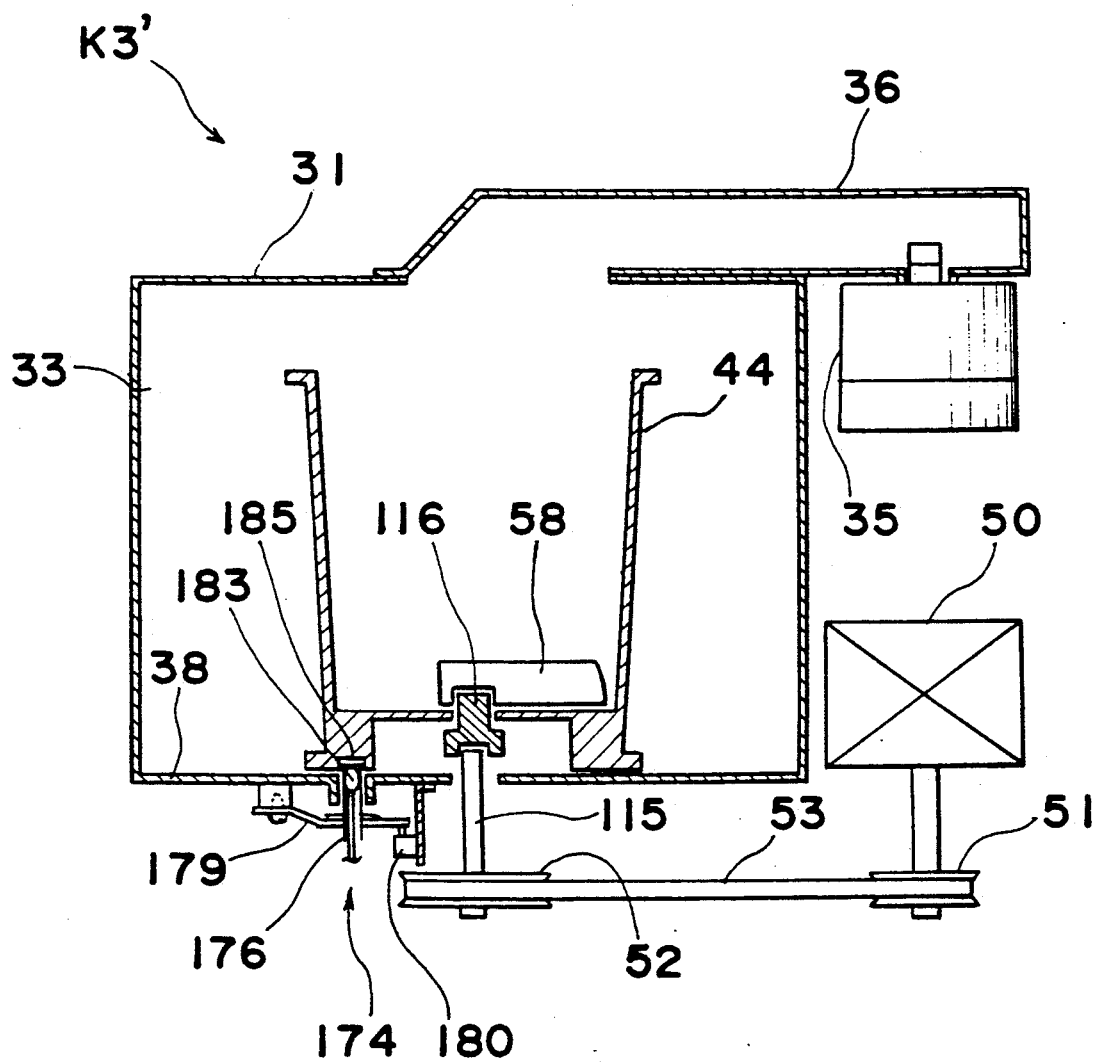
FIG. 38 is a sectional view of the apparatus of FIG. 36.

The control circuit 148 is formed by a general one-chip microcomputer and incorporates a RAM, a ROM, an ALU, etc. As shown in FIG. 32, the control circuit 148 includes a detection device 148a for detecting ON and OFF states of the door switch 147 and the start switch 162, a heating control device 148b for controlling the heating device 151 on the basis of result of detection of the detection means 148a, a rotational control means 148c for controlling the rotational drive device 152 on the basis of result of detection of the detection device 148a and a timer 148d for controlling the heating control device 148b and the rotational control device 148c on the basis of the detection result from the detection device 148a. During heating employing the heating vessel 44, the heating control device 148b and the rotational control device 148c have functions of outputting an operational stop signal in response to the signal of the door switch 147 indicative of opening of the door 34 and outputting an operational signal in response to the subsequent signal of the door switch 147 indicative of closing of the door 34. Meanwhile, a decision as to whether or not heating is performed by using the heating vessel 44 can be made either by an ON signal of a selection switch (not shown) for selecting cooking of bread, which is provided on the operating panel 161, or by a detection switch for detecting the heating vessel 44, which is provided on the bottom wall 38 of the heating chamber 33 as shown in FIG. 38.

The heating control device 148b outputs a pulse width modulation signal to an inverter circuit (not shown) for driving the magnetron 35 so as to change output of the inverter circuit such that the heating temperature of the heating vessel 44 is changed. The timer device 148d stores remaining periods of the cooking processes at the time of interruption of heating employing the heating vessel 44 so as to control the heating control device 148b or the rotational control means 148c for the remaining periods at the time of restarting.

Figures 30, 31:
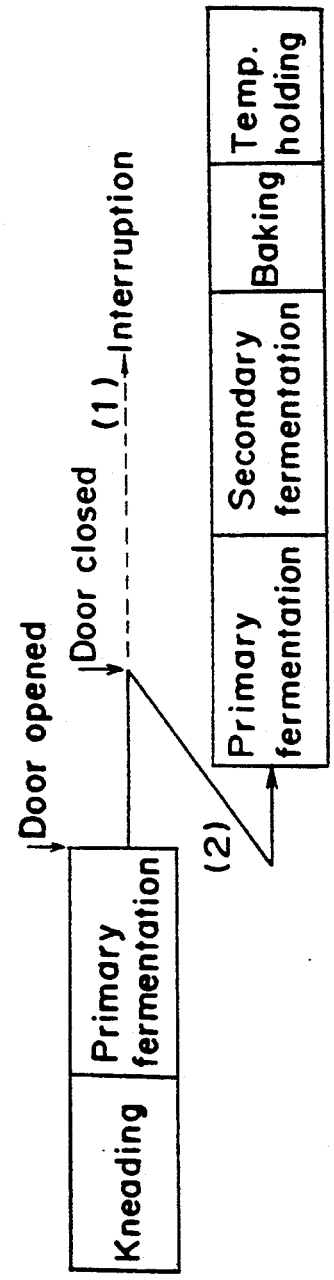
FIG. 30 is a diagram showing cooking processes of bread in a high-frequency heating apparatus according to a third embodiment of the present invention, in which a door is kept closed during heating.
FIG. 31 is a diagram showing cooking processes of the apparatus of FIG. 30, in which the door was opened during heating.

Operation of the apparatus K3 is described, hereinbelow. FIG. 30 shows a case in which the door 34 was not opened during heating, while FIG. 31 shows a case in which the door 34 was opened during heating. In FIG. 31, in the case where the door 34 was opened during primary fermentation and was closed again, heating is held in a state of interruption as shown by the broken line (1) in known apparatuses incapable of performing automatic start unless the start switch 162 is depressed. However, in the apparatus K3 having a function of performing an automatic start, heating is continued as shown by the solid line (2) of FIG. 31 even if the start switch 162 is not depressed, so that defective operation of the apparatus K3 due to improper operation or children's mischief can be obviated.

Hereinbelow, a first modification K3' of the apparatus K3 is described with reference to FIGS. 36 to 39. The control unit 145 includes the door switch 147 for detecting opening and closing of the door 34 of the heating chamber 33, a sensor 174 for detecting presence and absence of the heating vessel 44 and the control circuit 148. The control circuit 148 is arranged to stop the drive unit 144 during actuation of the drive unit 144 in response to the signal of the door switch 147 indicative of opening of the door 34 and output, only at the time of subsequent output of both the signal of the door switch 147 indicative of closing of the door 34 and a signal of the sensor 174 indicative of presence of the heating vessel 44, a signal for automatically restarting the drive unit 144. Namely, the control circuit 148 is set such that heating is not restarted when the heating vessel 44 is not loaded in the heating chamber 33 in the case where the door 34 has been closed after interruption of cooking of bread.

Figure 39:
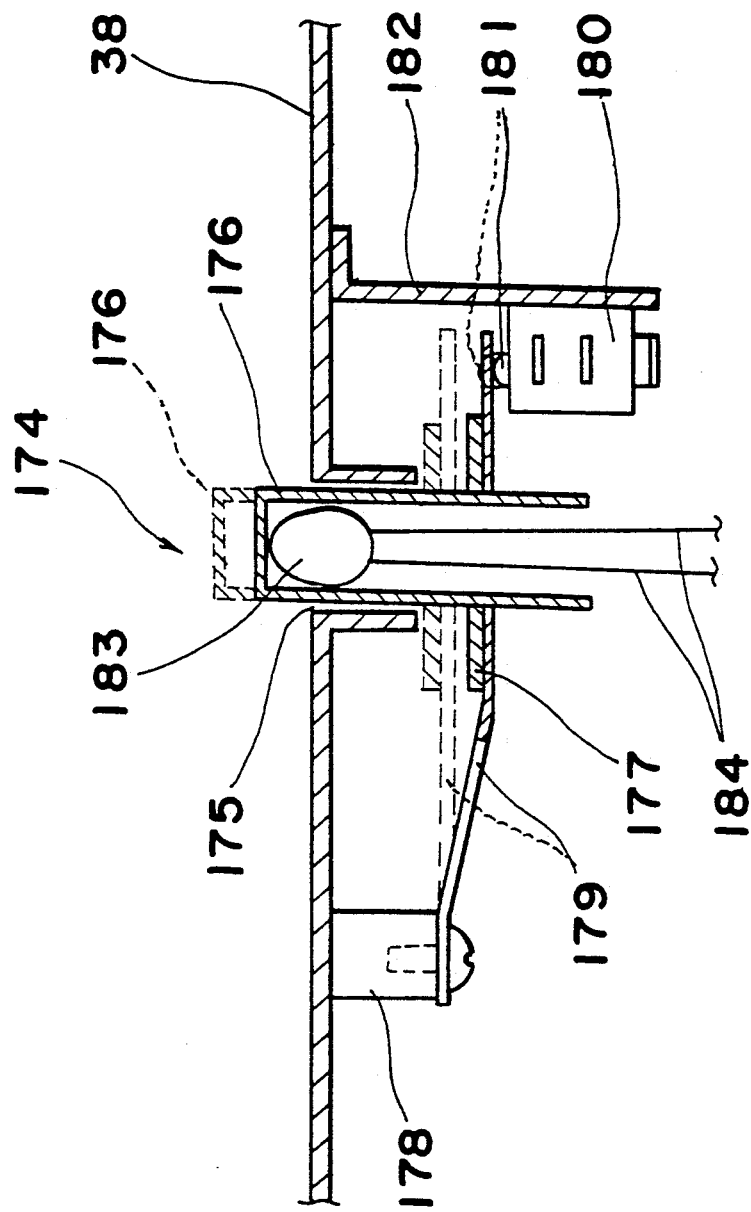
FIG. 39 is an enlarged fragmentary view of FIG. 38.

As shown in FIGS. 38 and 39, the sensor 174 includes a tube 176, an elastic plate 179 and a detection switch 180 having a contact 181. The tube 176 is retractably fitted into a hole 175 of the bottom wall 38 of the heating chamber 33. The elastic plate 179 supports a flange 177 formed around an outer periphery of the tube 176 and one end of the elastic plate 179 is attached to a boss 178 secured to a lower face of the bottom wall 38. The detection switch 180 is attached to a bracket 182 fixed to the lower face of the bottom wall 38 and is turned on by downward movement of the elastic plate 179 through contact of the elastic plate 179 with the contact 181. A temperature detecting element 183 having lead wires 184 is inserted into the tube 176. Meanwhile, an opening 185 is formed on a lower face of the heating vessel 44 so as to receive an upper end portion of the tube 176. At the time of loading of the heating vessel 44, the tube 176 is depressed downwardly by the heating vessel 44 and thus, the elastic plate 179 is brought into contact with the contact 181 so as to turn on the detection switch 180.

The apparatus K3' is operated as follows. Namely, if the heating vessel 44 is loaded in the heating chamber 33 when the door 34 has been closed again after opening of the door 34, the drive unit 144 is restarted. On the contrary, if the heating vessel 44 is not loaded in the heating chamber 33 at this time, the drive unit 144 is not restarted. A decision as to whether or not the heating vessel 44 is loaded in the heating chamber 33 is made based on the vertical position of the tube 176 of the sensor 174. When the heating vessel 44 has been loaded in the heating chamber 33, the upper end portion of the tube 176 is fitted into the opening 185 of the heating vessel 44 so as to be depressed downwardly. Therefore, the elastic plate 179 is also depressed downwardly and thus, is brought into contact with the contact 181 so as to turn on the detection switch 180 such that an ON signal of the detection switch 180 is fed to the control circuit 148. Thus, malfunction at the time of restarting of heating after the user's intentional interruption of heating can be prevented.

Then, a second modification K3" of the apparatus K3 is described with reference to FIGS. 40 to 44. FIG. 40 shows a case in which the door 34 was not opened during heating. FIG. 41 shows a case in which the door 34 was opened during the kneading process and FIG. 42 shows a case in which the door 34 was opened during the primary fermentation process. FIG. 43 shows a case in which the door 34 was opened during the second fermentation process and FIG. 44 shows a case in which the door 34 was opened during the baking process. In the apparatus K3", the heating control device 148b and the rotational control device 148c of the control circuit 148 are arranged such that cooking period after restarting of cooking is changed in accordance with period of opening of the door 34 during cooking and the cooking processes in operation. Since other constructions of the apparatus K3" are similar to those of the apparatus K3', description thereof is abbreviated for the sake of brevity. In FIGS. 40 to 44, characters P1, P2, P3, P4 and P5 denote periods of the kneading process, the primary fermentation process, the secondary fermentation process, the baking process and the temperature holding process, respectively, while characters T, T1, T2, T3 and T4 denote total cooking periods of FIGS. 40, 41, 42, 43 and 44, respectively. Character p denotes a period during which the door 34 was opened. Furthermore, in the case where door 34 has been opened during a cooking process, prime (') denotes a first period of one cooking process before opening of the door 34 and double prime (") denotes a second period of the cooking process after opening of the door 34.

In the case where the door 34 has been opened during the kneading process as shown in FIG. 41, a sum of a first period A' and a second period A" of the kneading process is so set as to be equal to the period A of the kneading process such that occurrence of insufficient kneading is prevented. Therefore, the total cooking period T1 of FIG. 41 is expressed by (T+p).

In FIG. 42, the door 34 is opened during the primary fermentation process. Since primary fermentation take place continuously even when the door 34 is open, a sum of the periods P2', p and P2" can be equal to the period P2 and thus, the total cooking period T2 is equal to the total cooking period T of FIG. 40.

In FIG. 43, the door 34 is opened during the secondary fermentation process. Since temperature of dough during the secondary fermentation process is slightly higher than that of the primary fermentation process, it is considered that temperature of dough drops when the door 34 is open during the secondary fermentation process. Therefore, a sum of the periods P3' and P3" is so set as to be equal to (P3−α), namely, P3'+P3"=P3−α where α is a value smaller than the period p. Accordingly, the total cooking period T3 is expressed by (T+p−α).

In FIG. 44, the door 34 is opened during the baking process. Since heating is performed at about 150° C. during the baking process, a sum of the periods P4' and P4" is so set as to be equal to (P4+β), namely, P4'+P4"=P4+β where β is a value larger than 0. Thus, the total cooking period T4 is expressed by (T+p+β).

Accordingly, in the apparatus K3", even if period during which the door 34 is open is relatively long, finished bread has uniform quality.

Figure 45:
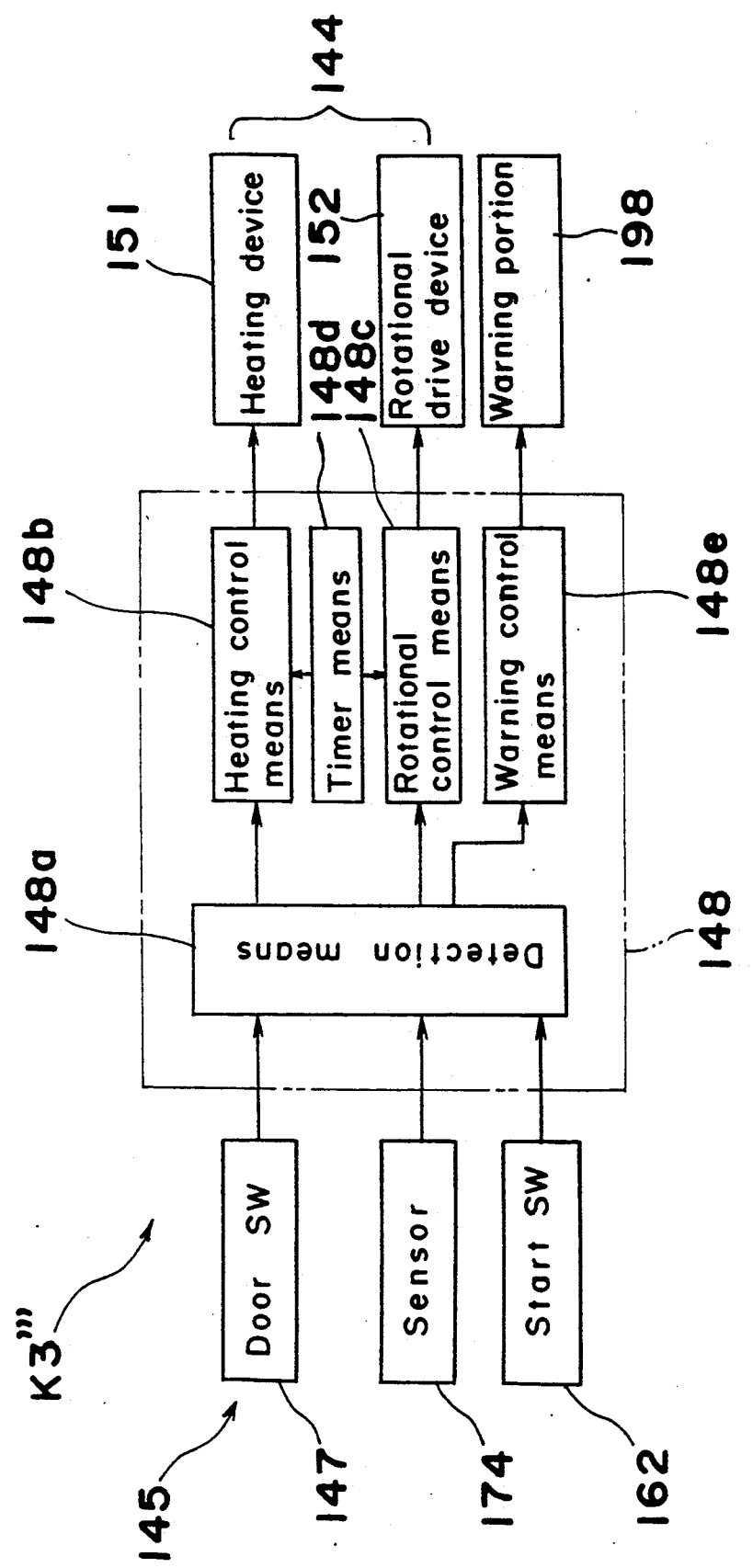
FIG. 45 is a block diagram of a control device employed in a third modification of the apparatus of FIG. 30.

Hereinbelow, a third modification K3''', of the apparatus K3 is described with reference to FIGS. 45 to 47. As shown in FIG. 45, the control unit 145 includes the door switch 147 for detecting opening and absence of the door 34 of the heating chamber 33, a warning portion 198 for issuing a warning of abnormal operation of the apparatus K3''' to the user and the control circuit 148. In response to a signal of the door switch 147 indicative of opening of the door 34 or a signal of the sensor 174 indicative of absence of the heating vessel 44, the control circuit 148 outputs to the warning portion 198, a signal for commanding the warning portion 198 to issue the warning to the user. Namely, the control circuit 148 of the apparatus K3", includes a warning control device 148e in addition to the elements 148a to 148d of the control circuit 148 of the apparatus K3'.

Figure 46:
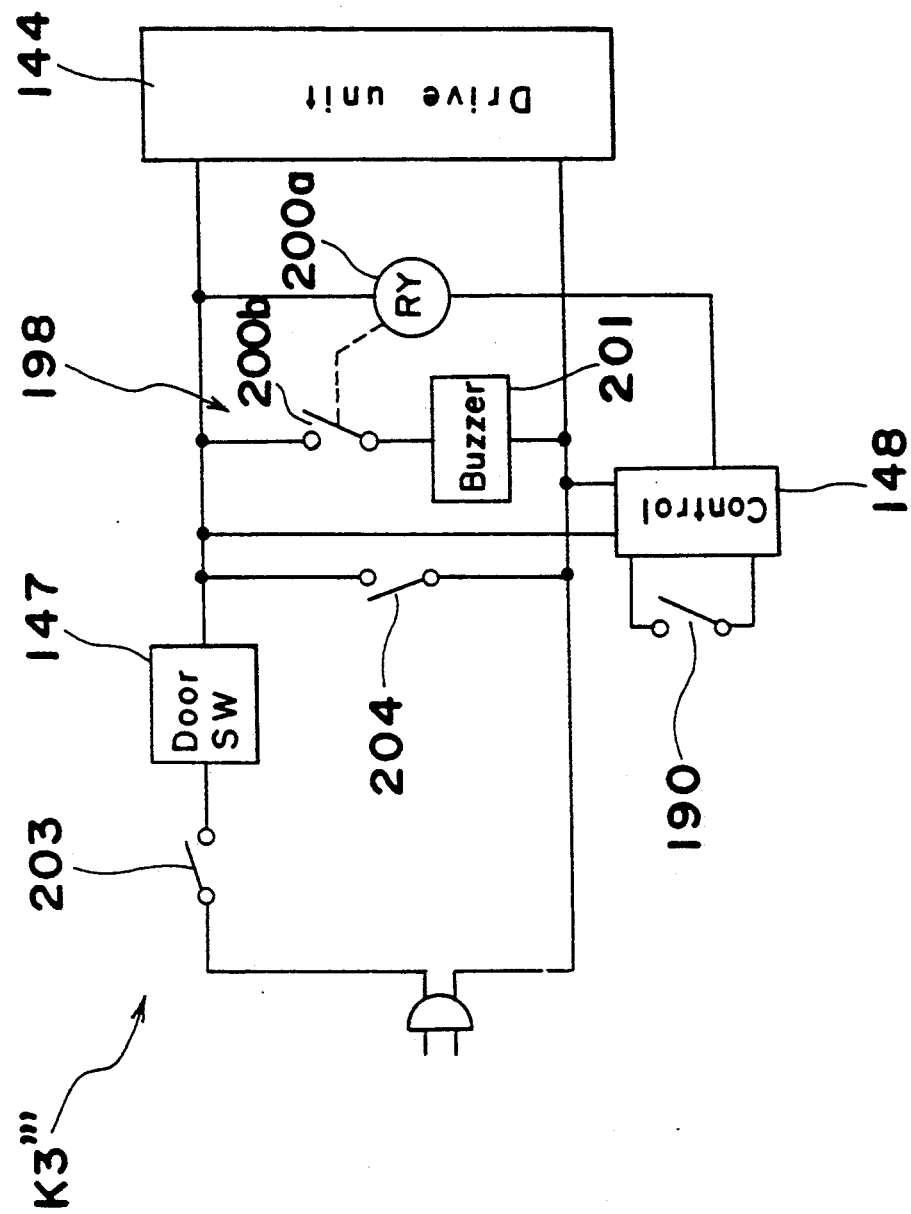
FIG. 46 is a diagram of a control circuit of the apparatus of FIG. 45.
Figure 47:
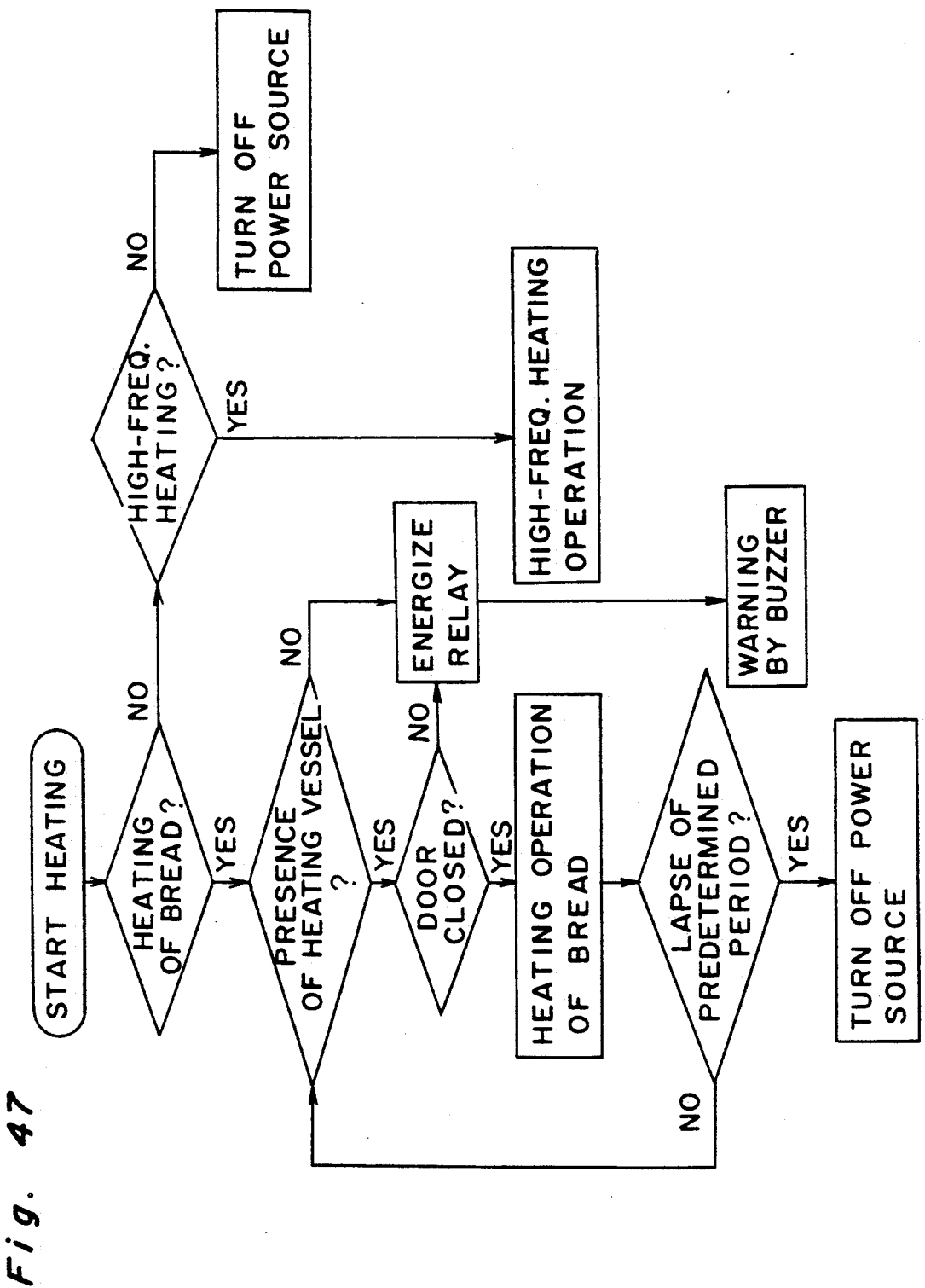
FIG. 47 is a flow chart showing processing sequence of the apparatus of FIG. 45.

As shown in FIG. 46, the warning portion 198 includes by a relay coil 200a connected to an output terminal of the control circuit 148, a relay contact 200b to be turned on and off by the relay coil 200a and a warning buzzer 201 connected in series to the relay contact 200b. Reference numerals 203 and 204 denote a latch switch and a monitor switch, respectively. Since other constructions of the apparatus K3''' are similar to those of the apparatus K3', description thereof is abbreviated for the sake of brevity.

In the apparatus K3''' of the above described arrangement, when the heating vessel 44 for kneading and heating bread, etc. has been loaded in the heating chamber 33, the detection switch 180 is turned on. If the door 34 is open at this time, the door switch 147 is in the OFF state. Thus, a signal is transmitted from the control circuit 148 to the relay coil 200a so as to energize the relay coil 200a such that the warning buzzer 201 emits the warning sound. Not only during heating but before heating, this function is also performed in the case where the door 34 has been closed without loading the heating vessel 44 in the heating chamber 33. However, this function is not performed during high-frequency heating.

Therefore, when bread is made by using the apparatus K3''', such a phenomenon is eliminated that the user fails to load the heating vessel 44 in the heating chamber 33. Accordingly, in the case of making of bread, excessive fermentation or insufficient baking can be prevented which occurs when heating has been interrupted by opening the door 34 during cooking processes whose periods affect quality of finished bread, for example, during the fermentation process and the baking process.

Meanwhile, issuing the warning to the user is not limited, needless to say, to the above mentioned buzzer changed over by the relay but can be modified variously.

As will be seen from the foregoing, in the third embodiment of the present invention, even if heating is interrupted by opening the door during heating in the case where automatic cooking is performed by using the heating vessel, heating is automatically restarted by merely closing the door again. Therefore, since heating can be continued without depressing the start switch, defective cooking due to improper operation or children's mischief can be eliminated.

Furthermore, in the third embodiment of the present invention, if the door is closed again in a state where the heating vessel has been taken out of the heating chamber by opening the door, heating is not restarted automatically. Hence, heating without loading the heating vessel in the heating chamber can be obviated and erroneous operation at the time of restarting of heating after the user's intentional interruption of heating can be prevented.

Moreover, in the third embodiment of the present invention, if the door is opened during heating or after setting of reserved heating, the apparatus informs the user that the door is open. Hence, when bread is made, the user does not fail to load the heating vessel in the heating chamber. Therefore, excessive fermentation or insufficient baking can be prevented which occurs when heating has been interrupted by opening the door during cooking processes whose periods affect quality of finished bread, for example, during the fermentation process and the baking process. Accordingly, such an excellent effect is obtained that restarting of heating after interruption of heating can be performed easily.

Figure 48:
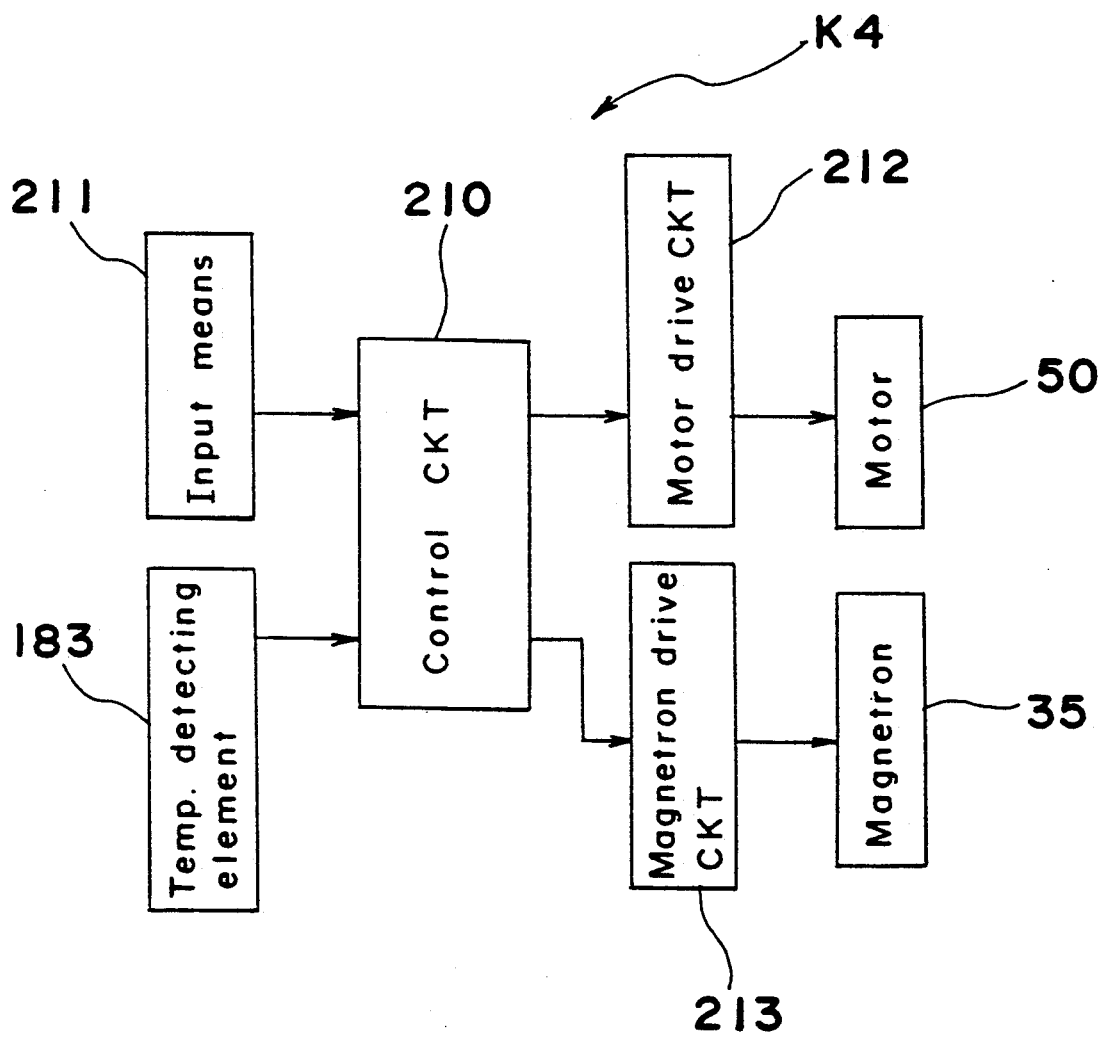
FIG. 48 is a block circuit diagram of a high-frequency heating apparatus according to a fourth embodiment of the present invention.

Hereinbelow, a high-frequency heating apparatus K4 according to a fourth embodiment of the present invention is described with reference to FIGS. 48 to 53. Since main constructions of the apparatus K4 are similar to those of the apparatus K3' of FIG. 38, description thereof is abbreviated for the sake of brevity. The fourth embodiment of the present invention is characterized in that when dough of bread is kneaded, dough of bread is heated to a predetermined temperature of about 28° C. Referring to FIG. 48, a control circuit 210 controls whole operations of the apparatus K4 and stores a control program of FIG. 49 for making bread. Bread is made in the cooking processes of FIG. 49.

Figure 49:
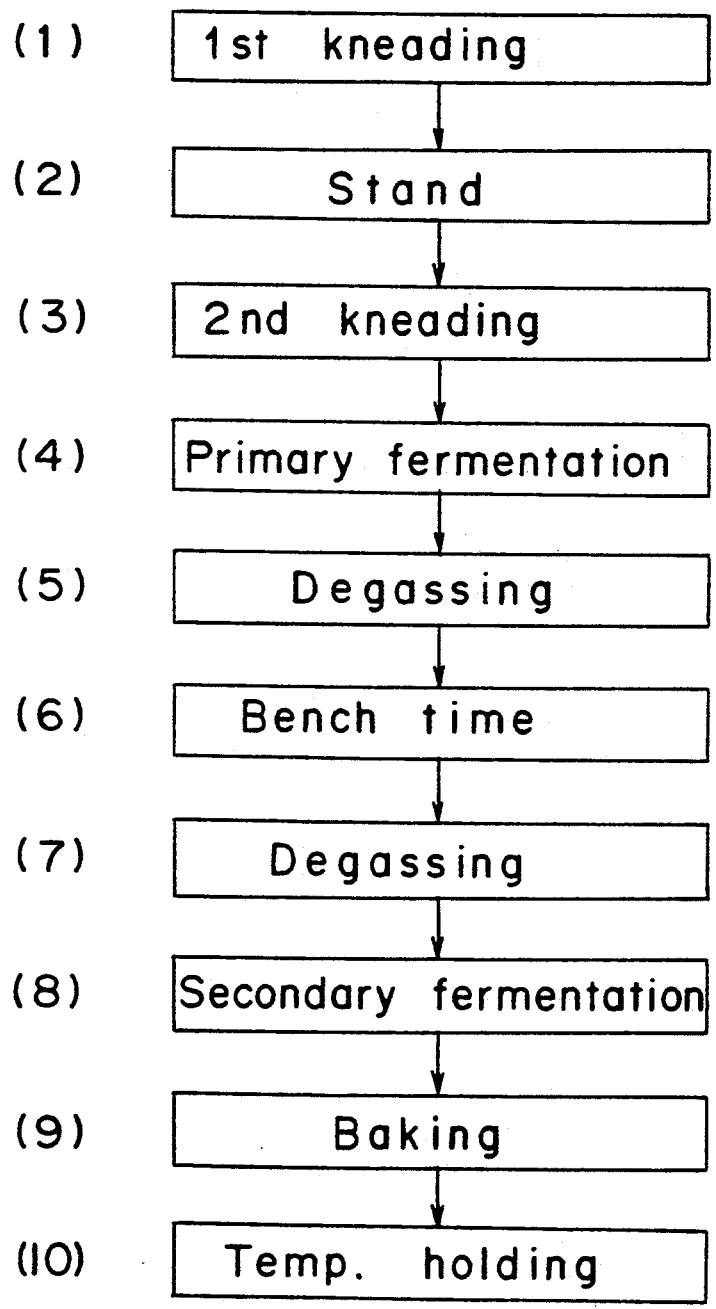
FIG. 49 is a diagram showing cooking processes of bread in the apparatus of FIG. 48.
Figure 50:
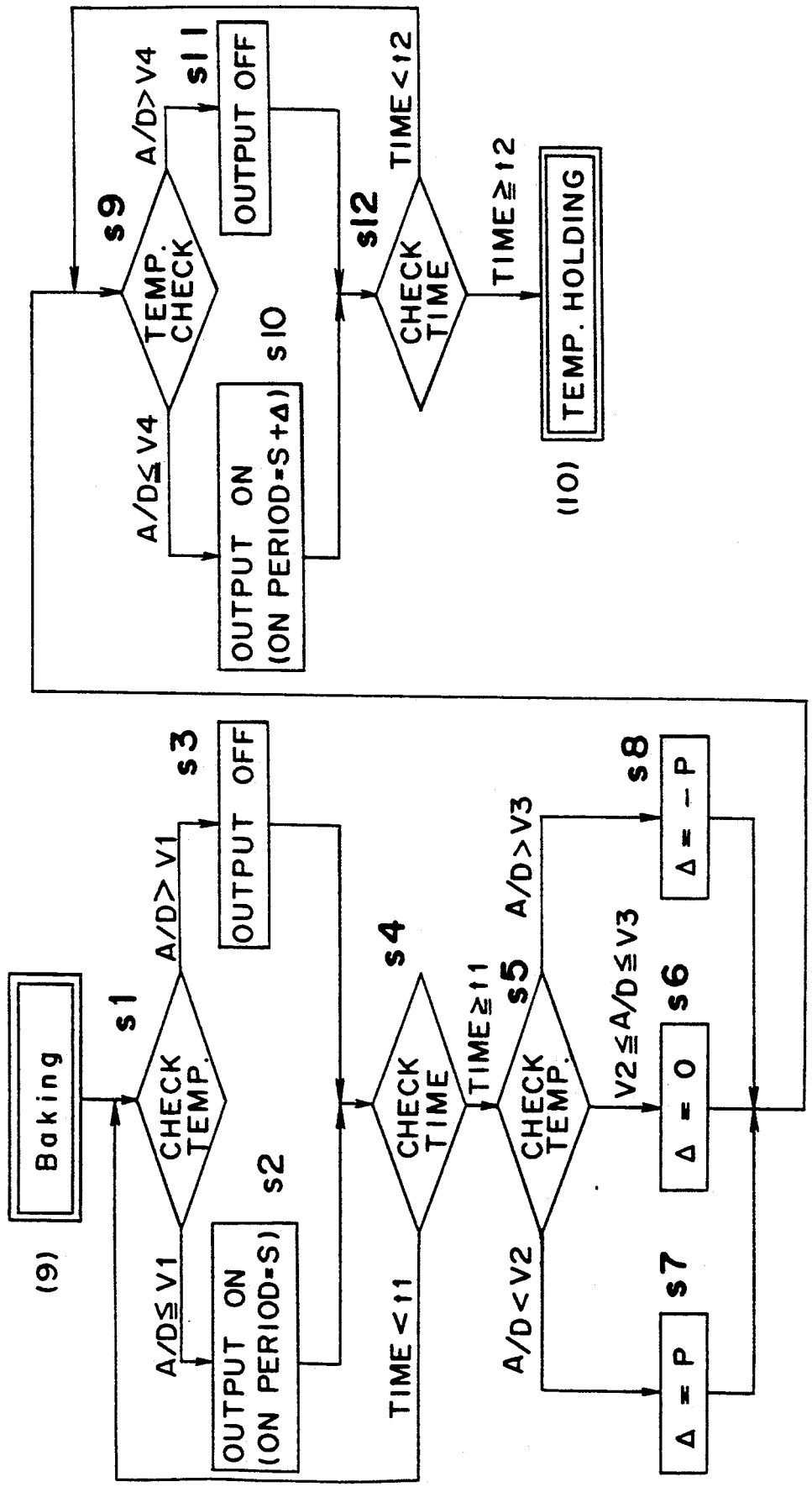
FIG. 50 is a flow chart showing processing the sequence of the apparatus of FIG. 48.

FIG. 50 is a flow chart showing the baking process of the ninth order in FIG. 49 in detail. Until a predetermined period t1 elapses, steps s1 to s4 are repeated.

Upon detection of lapse of the predetermined period t1, temperature comparison is made at step s5. Namely, if a value A/D which is inputted to the control circuit (LSI) 210 as temperature information from the temperature detecting element 183 is smaller than a preset value V2, a factor a is set to a value P at step s7 and ON period of S of microwave output is increased by P to (S+P) at step s10 such that microwave output is increased. On the other hand, if the value A/D is larger than another preset value V3, the factor Δ is set to (−P) and the ON period of S of microwave output is reduced by P to (S−P) at step s10 such that microwave output is reduced. Meanwhile, if the value A/D falls between the preset values V2 and V3 at step s5, the factor Δ is set to 0 and the ON period of S is not changed, namely, neither increased nor reduced so as to turn on microwave output for the period S at step s10.

Figure 51:
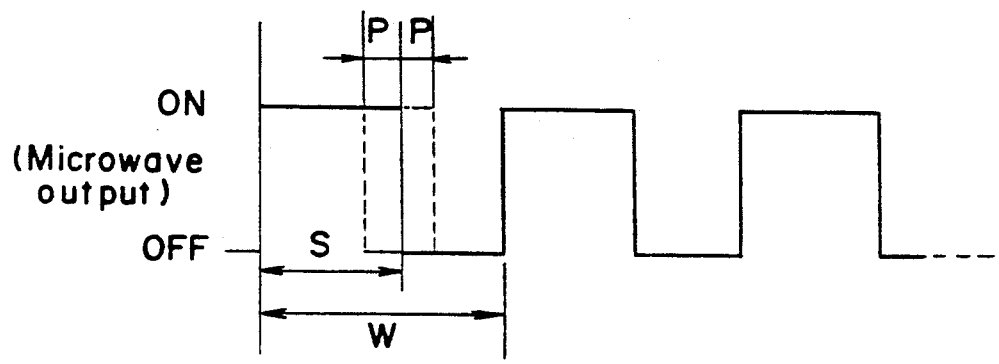
FIG. 51 is a diagram showing on-off characteristics of microwave output of the apparatus of FIG. 48.

FIG. 51 shows on-off characteristics of microwave output in the apparatus K4 in the case where an intermittent method is employed for changing microwave output. In a predetermined period W, microwave output is usually turned on during the period of S and is turned off during the remaining period of (W-S). This intermittent microwave output assumes S/W of a rated microwave output in which microwave output is held in the ON state continuously. Meanwhile, in the case where microwave output is increased, the ON period of microwave output is set to (S+P). On the contrary, in the case where microwave output is reduced, the ON period of microwave output is set to (S−P). Thus, is becomes possible to change microwave output.

Figure 52:
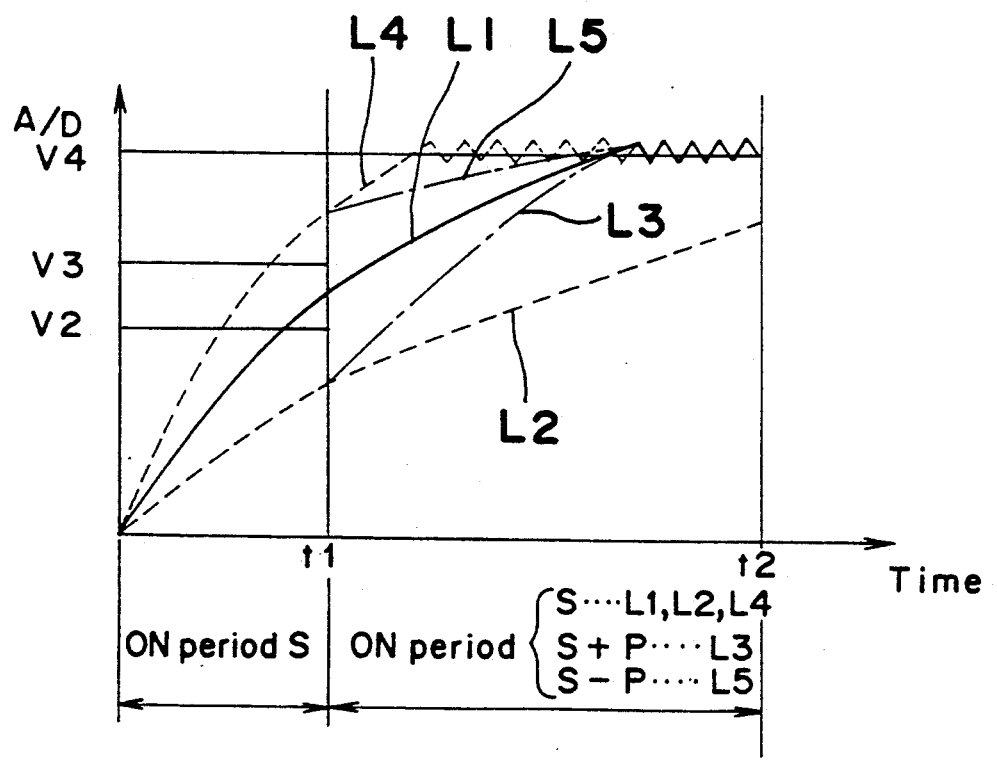
FIG. 52 is a graph showing characteristics in the control of FIG. 50.

FIG. 52 shows the relation between time and the value A/D inputted to the control circuit 210 in the case of control of FIG. 50. In FIG. 52, the lines L2 and L4 represent the prior art relation while the lines L3 and L5 represent the relation of the present invention. In the solid line L1, since the value A/D is disposed between the values V2 and V3 at the time of lapse of the period t1, heating is continued by setting the ON period of microwave output to S. In the broken line L2, the value A/D is smaller than the value V2 at the time of lapse of the period t1. Thus, if heating is performed by setting the ON period of microwave output to S in this case, the value A/D becomes smaller than the value V4 at the time of lapse of the period t2 and therefore, temperature of the heating vessel 44 becomes low.

In the one-dot chain line L3, the ON period of microwave output is set to (S+P) after lapse of the period t1. Hence, the value A/D at the time of lapse of the prior t2 teaches the value V4 and thus, the same quality of finished bread as that of the line L1 can be obtained.

In the lines L4 and L5, the value A/D is larger than the value V3 at the time of lapse of the period t2. In the line L4, heating is subsequently performed by employing the ON period of S. Meanwhile, in the line L5, heating is subsequently performed by setting the ON period of microwave output to (S−P).

Figure 53:
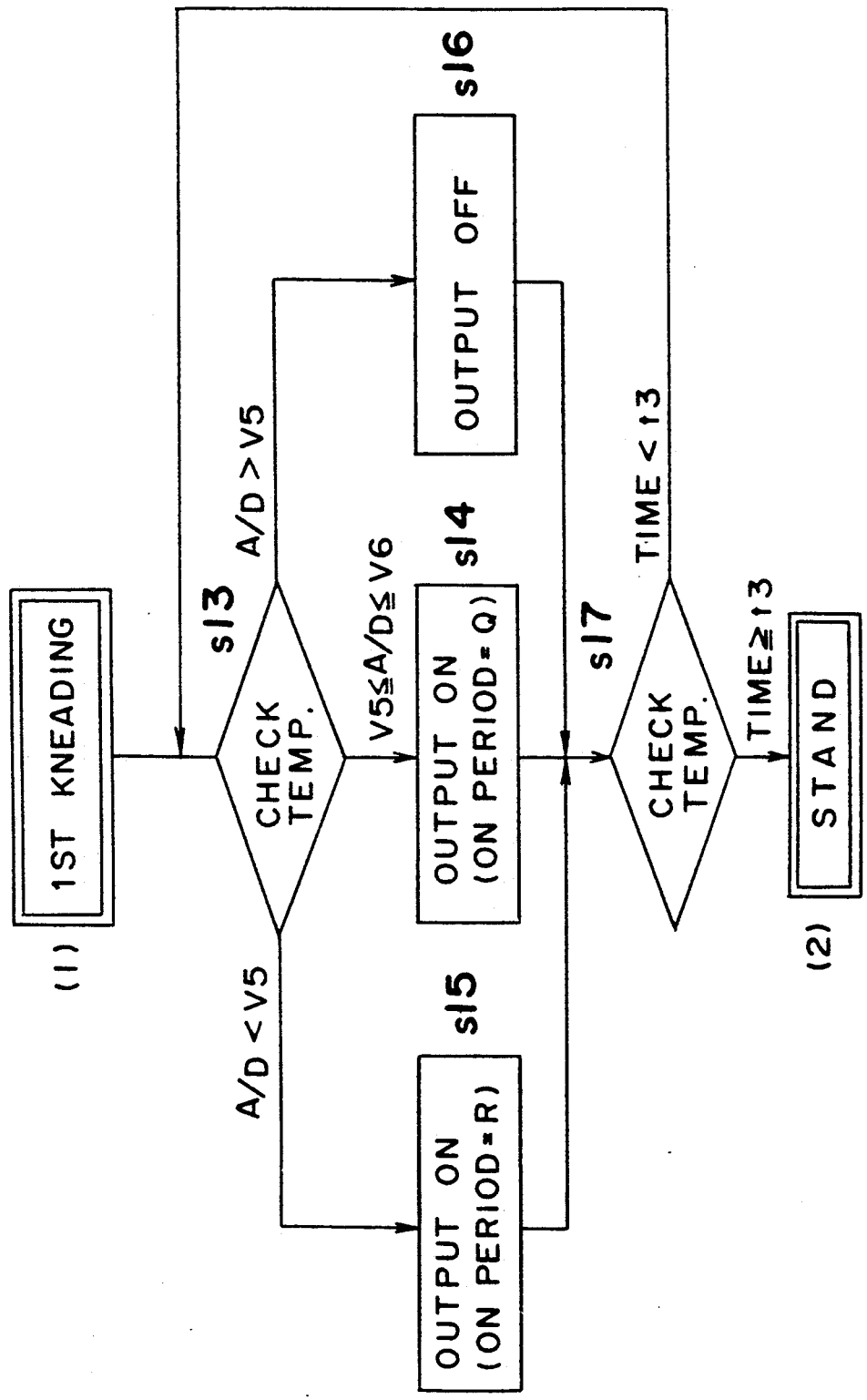
FIG. 53 is a flow chart of the processing sequence of the apparatus of FIG. 48.

FIG. 53 shows the processing sequence of the apparatus K4 and is directed to the first kneading process of FIG. 49. If it is found at step s13 that the value A/D is smaller than a value V5, the program flow proceeds to step s15 at which the ON time of microwave output is set to R. If the value A/D falls between values V5 and V6, the ON period of microwave output is set to Q at step s14. If R>Q, the rise in temperature at step s15 becomes faster than that of step s14. On the other hand, if the value A/D is larger than the value V5, the microwave output is turned off at step s16.

Figure 54:
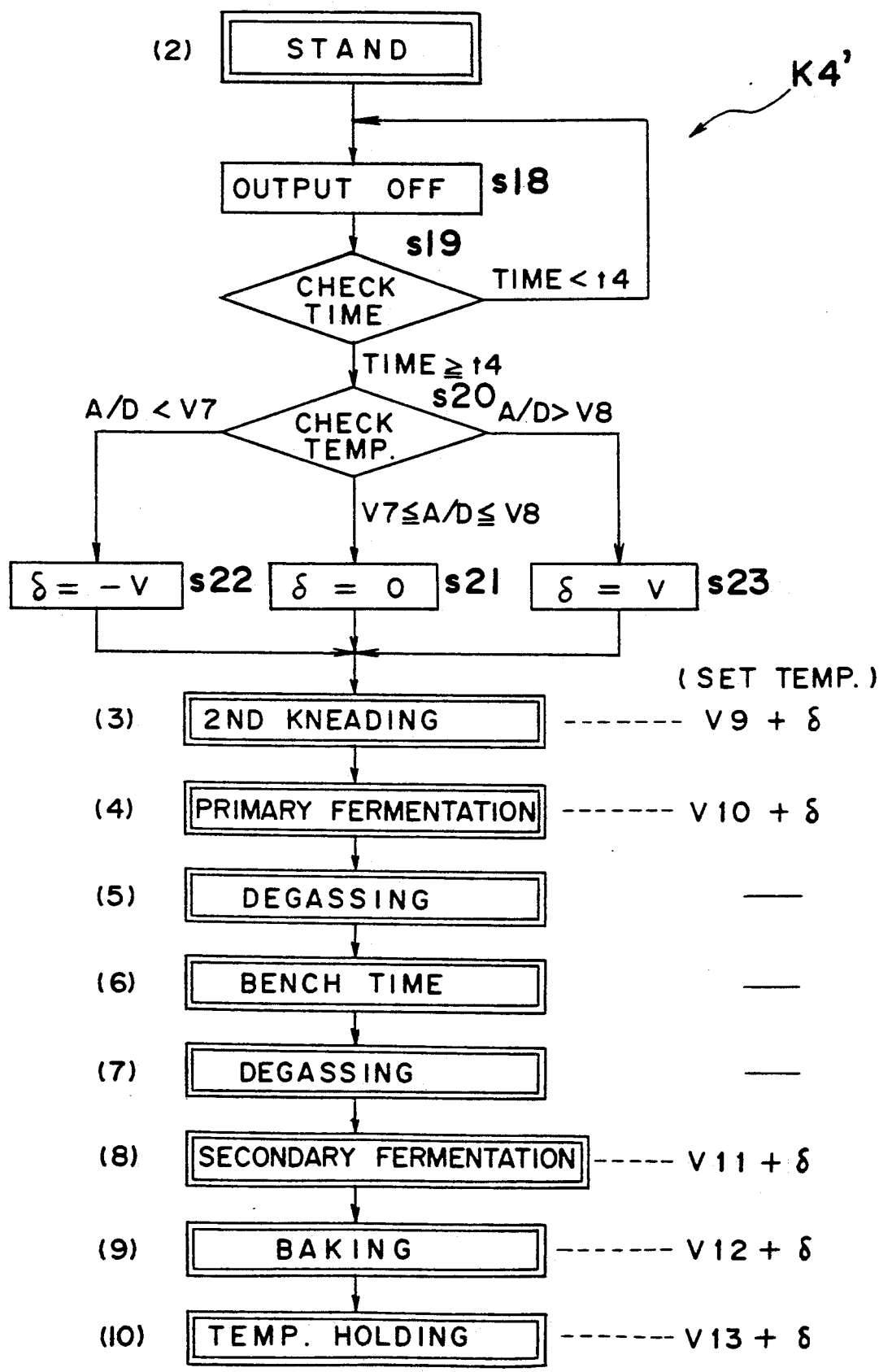
FIG. 54 is a flow chart showing the processing sequence of a modification of the apparatus of FIG. 48.

FIG. 54 shows the processing sequence of a modification K4' of the apparatus K4 and is directed to the stand process of the second order in FIG. 49 in which dough is allowed to stand. In FIG. 54, microwave output is turned off at step s18. Therefore, during repetition of execution of steps s18 and s19, if ambient temperature is low, the heating vessel 44 is also cooled such that temperature of the heating vessel 44 drops, so that the value A/D is reduced. On the other hand, if ambient temperature is high, the temperature of the heating vessel 44 is also raised and thus, the value A/D is increased. Thus, if it is found at step s20 that the value A/D is smaller than a preset value V7, a factor δ is set to (−V) at step s22. On the other hand, if is found at step s20 that the value A/D is larger than another preset value V8, the factor δ is set to V at step s23. Meanwhile, in the case where the value A/D falls between the values V7 and V8 at step s20, the factor δ is set to 0 at step s21. Thus, preset temperatures of the subsequent coking processes from the second kneading to the temperature holding process are corrected.

Figure 55:
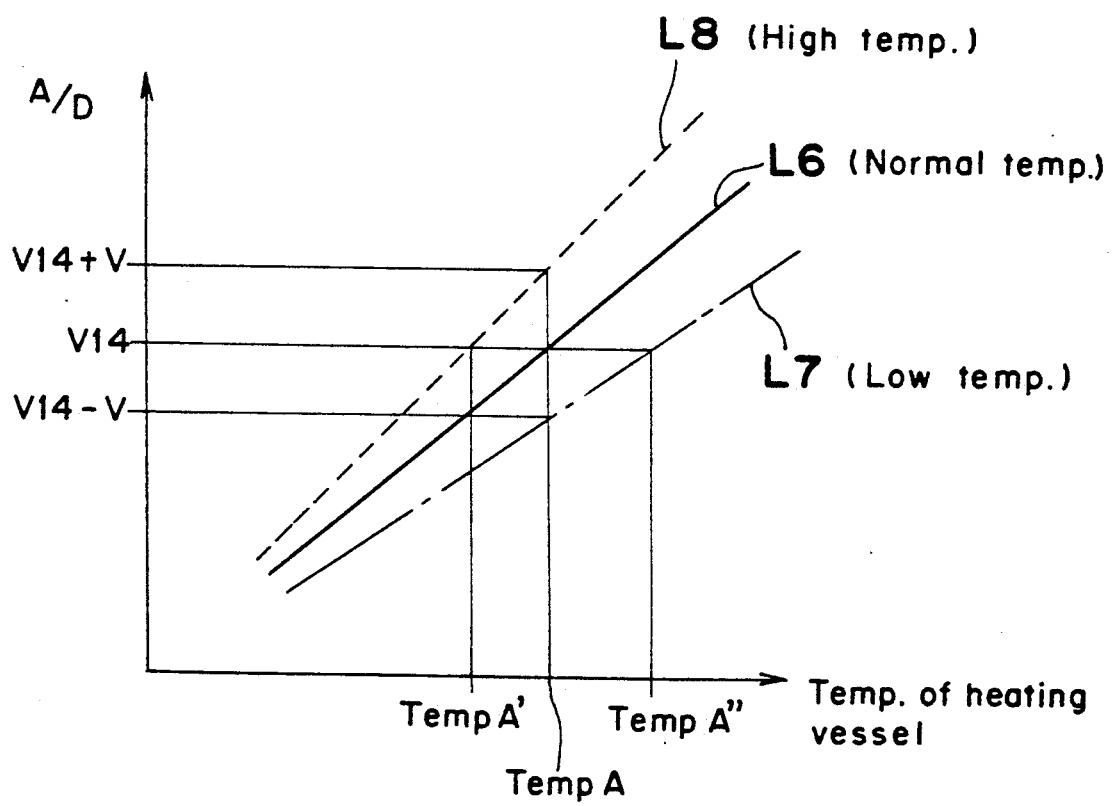
FIG. 55 is a graph showing characteristics in the control of the apparatus of FIG. 54.

FIG. 55 shows the relation between the temperature of the heating vessel 44 and the value A/D in cooking of FIG. 54. In FIG. 55, the lines L6, L7 and L8 represent cases of normal temperature, low temperature and high temperature, respectively. In FIG. 55, if control is performed at a preset value V14, the temperature of the heating vessel 44 assumes a value of TempA at normal temperature. However, at low temperature and high temperature, the temperature of the heating vessel 44 assumes values of TempA' and TempA", respectively. Thus, it becomes difficult to obtain uniform quality of finished bread. However, in the apparatus K4', correction is made in accordance with the flow chart in FIG. 54 such that the preset value is set to (V14−V) and (V14+V) at low temperature and at high temperature, respectively. As a result, control can be performed at the constant temperature of TempA.

In accordance with the fourth embodiment of the present invention, since output of the motor for driving the stirring blade 58 can be reduced at low ambient temperature, production cost of the apparatus can be reduced by employing a motor having a small output.

Figure 56:
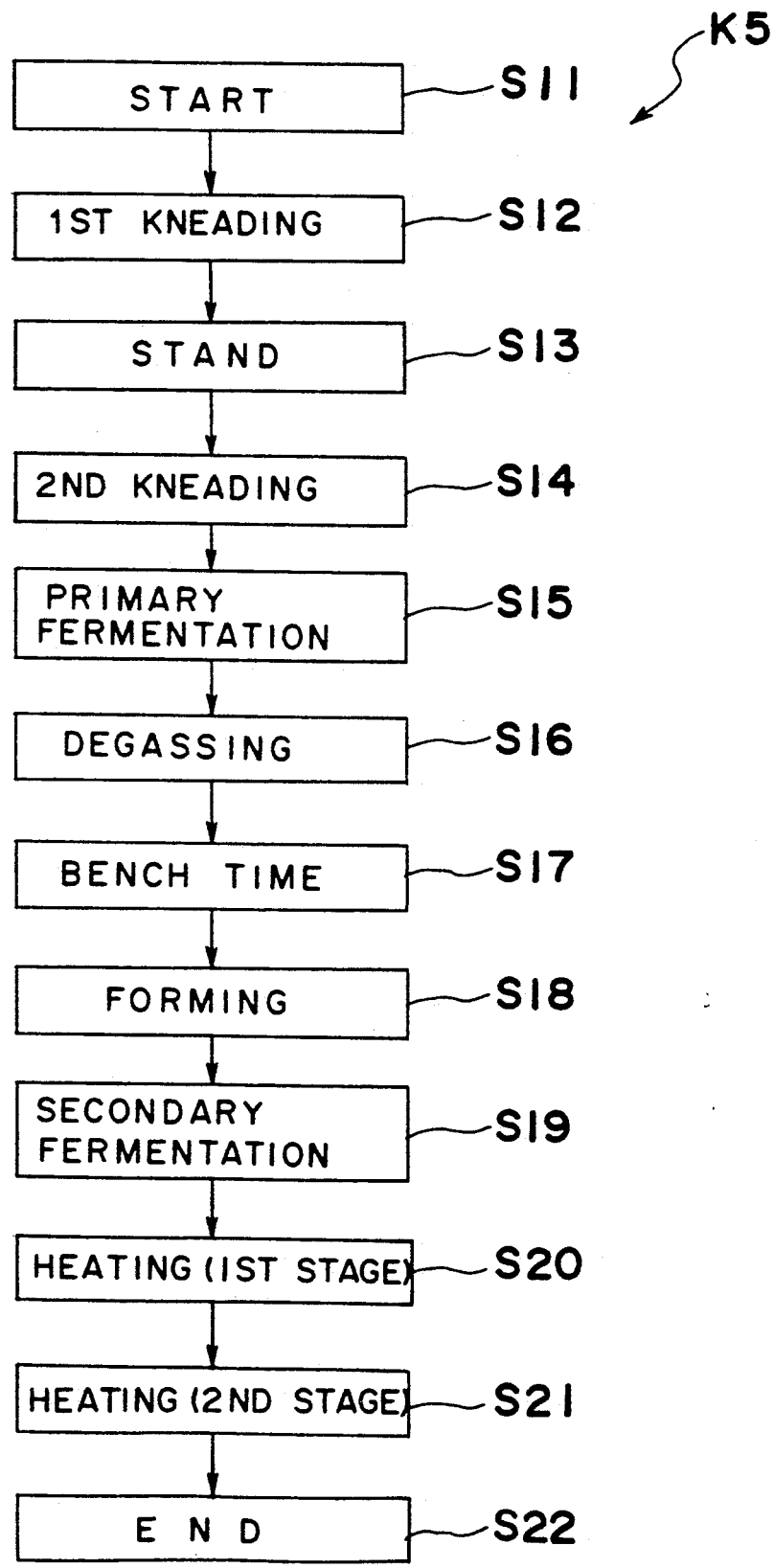
FIG. 56 is a flow chart showing the sequence of cooking of bread in a high-frequency heating apparatus according to a fifth embodiment of the present invention.

Hereinbelow, a high-frequency heating apparatus K5 according to a fifth embodiment of the present invention is described with reference to FIGS. 56 to 59. FIG. 56 shows cooking processes of bread in the apparatus K5. Initially, at step s11, materials of bread such as flour, butter, sugar, salt, yeast, water, etc. are put into the heating vessel 44 formed by material which generates heat upon absorption of microwave and the heating vessel 44 is loaded in the heating chamber 33 so as to start cooking by depressing a cooking button, etc. Then, the first kneading process is performed at step S12, the stand process for allowing dough to stand is performed at step S13 and the second kneading process is performed at step S14. Subsequently, the primary fermentation process is performed at step S15, the degassing process is performed at step S16, the bench time is provided at step 17, the forming process for forming dough into shape of bread is performed at step S18 and the second fermentation process is performed at step S19.

Figure 57:
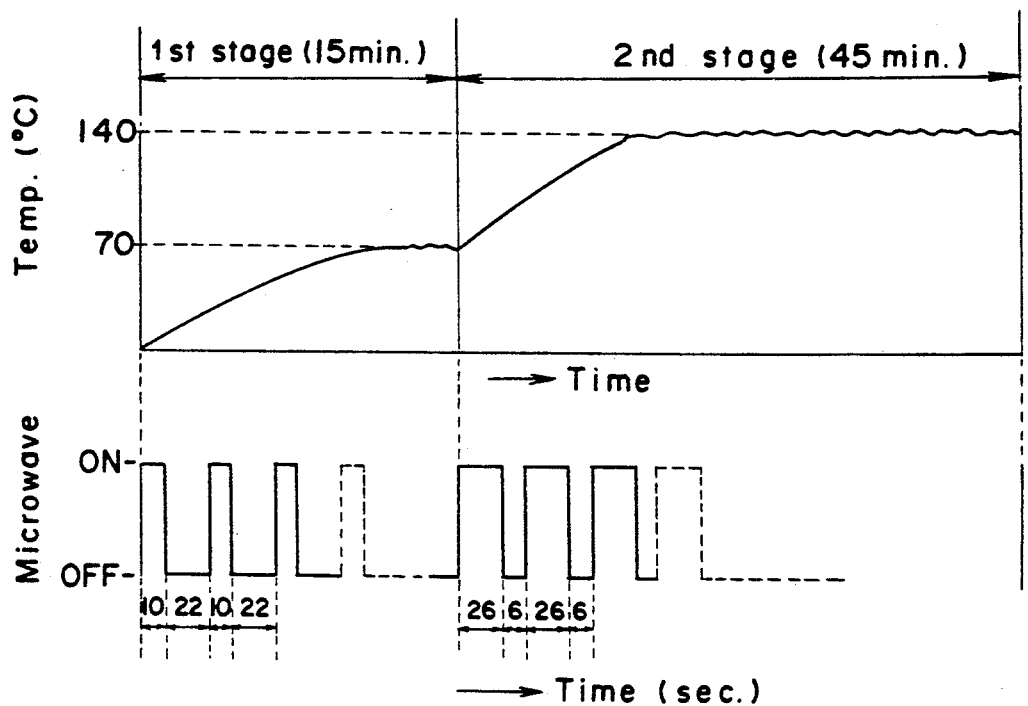
FIG. 57 is a graph showing the relation between the period of irradiation of the microwave and the heating temperature in a heating stage of the apparatus of FIG. 56.
Figure 58:
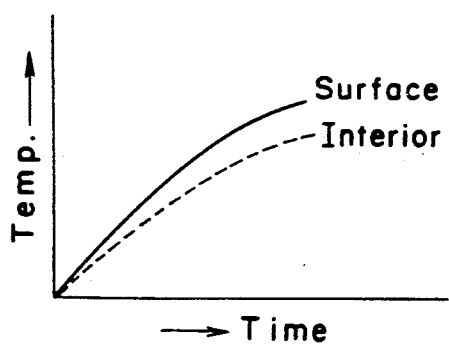
FIGS. 58 and 59 are graphs showing the difference in temperature between a surface and an interior of dough in the apparatus of FIG. 56 and a prior art apparatus, respectively.
Figure 59:
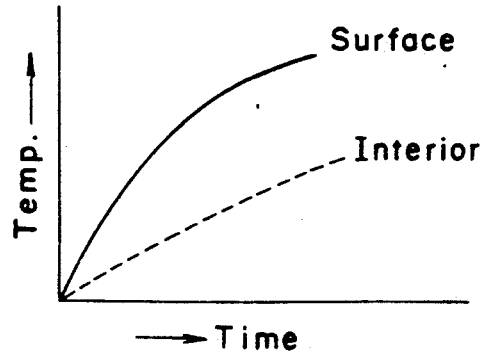

Thereafter, heating by irradiation of microwave is performed in two stages. As the first stage, turning on of irradiation of microwave for, e.g., 10 sec. and subsequent turning off of irradiation of microwave for 22 sec. are repeated intermittently at step S20 such that heating temperature reaches about 70° C. after 15 min. as shown in FIG. 57. By increasing the degree of heating gradually as described above, dough is heated gradually by minimizing the difference in temperature between a surface and an interior of the dough as shown in FIG. 58. Finally, as the second stage, heating is performed at step S21 more powerfully than in the first stage. For example, as shown in FIG. 57, turning on of irradiation of microwave for 26 sec. and turning off of irradiation of microwave for 6 sec. are repeated intermittently at step S21 such that heating is performed for about 45 min. at a temperature of 140° C. suitable for baking of bread. By the above described steps, making of bread is completed at step S22. As a comparative example, FIG. 59 shows the difference in temperature between a surface and an interior of dough in a prior art high-frequency heating apparatus. In the prior art apparatus of FIG. 59, the difference in temperature between the surface and the interior of dough is large and thus, there is a great difference in degree of baking between a surface and an interior of baked bread.

In accordance with the fifth embodiment of the present invention, since the difference in temperature between a surface and an interior of dough during baking can be reduced, it becomes possible to prevent rapid rise of only temperature of the surface of dough. Therefore, such a phenomenon can be obviated that the surface of dough is scorched before the interior of dough is heated.

Furthermore, in the fifth embodiment of the present invention, bread having splendid quality can be obtained by gradual heating.

Figure 61:
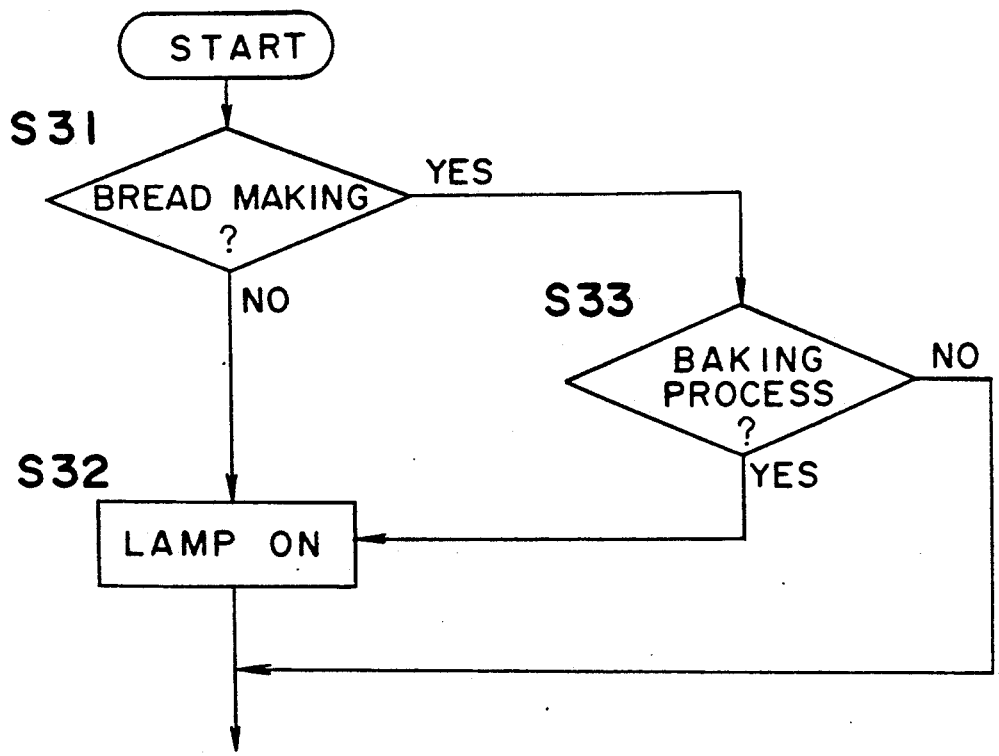
FIG. 61 is a flow chart showing processing the sequence of the apparatus of FIG. 60.
Figure 62:
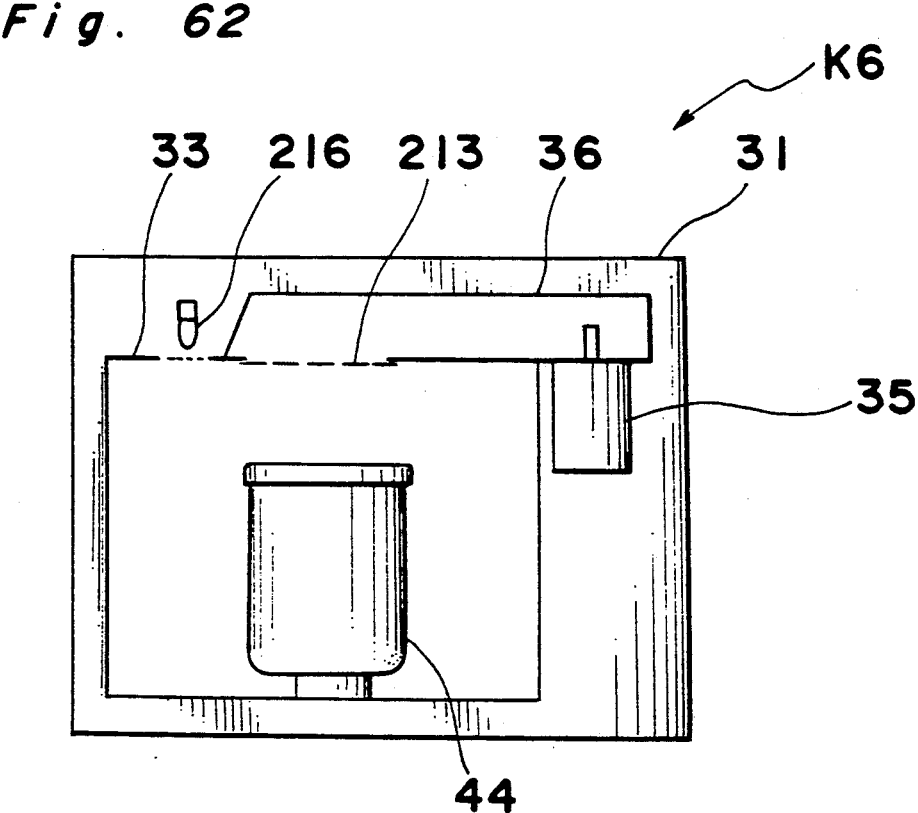
FIG. 62 is a schematic view of the apparatus of FIG. 60.

Hereinbelow, a high-frequency heating apparatus K6 according to a sixth embodiment of the present invention is described with reference to FIGS. 60 to 62. FIG. 62 shows the apparatus K6 having a bread making function. The apparatus K6 includes a cover 213 for covering an opening of the waveguide 36 and a lamp 216 for illuminating the interior of the heating chamber 33.

Figure 60:
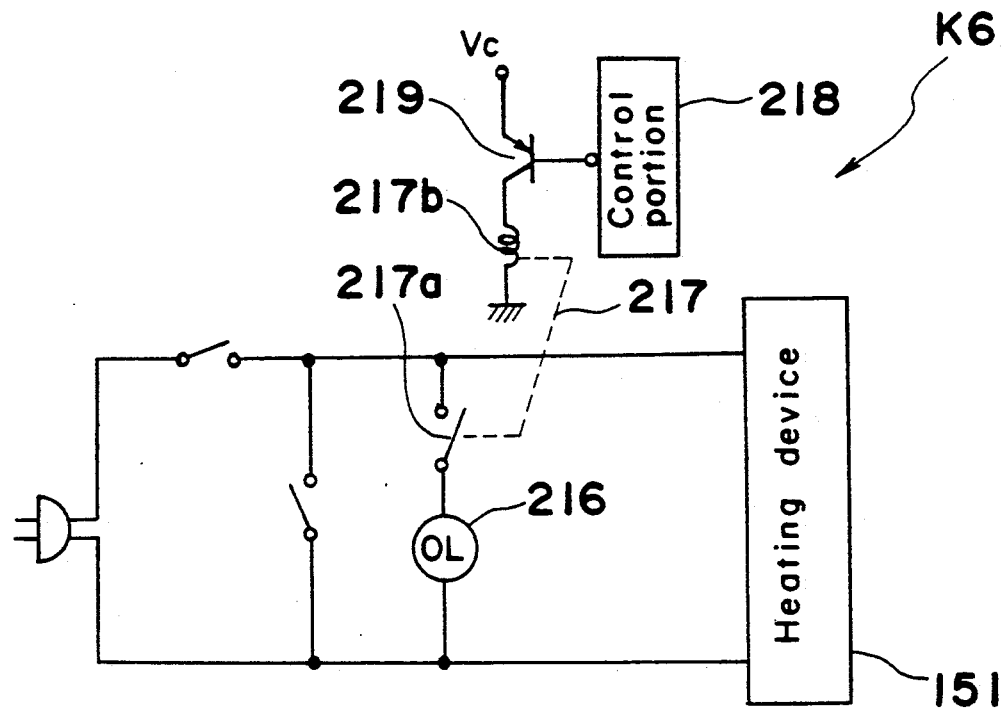
FIG. 60 is a circuit diagram of a high-frequency heating apparatus according to a sixth embodiment of the present invention.

Meanwhile, FIG. 60 shows an electric circuit of the apparatus K6. In FIG. 60, a relay contact 217a is connected in series to the lamp 216 and a relay coil 217b for driving the relay contact 217a is connected in series to a transistor 219 which is controlled by output of a control portion (microcomputer) 218 for controlling the apparatus K6.

Based on a control program stored in the control portion 218, the control portion 218 decides at step S31 whether or not cooking in operation is bread making. In the case of "NO" at step S31, a signal for driving the relay 217 is outputted so as to turn on the lamp 216 at step S32. On the other hand, in the case of "YES" at step S31, a decision is made at step 33 as to whether or not the baking process is being performed. In the case of "YES" at step S33, the signal for driving the relay 217 is outputted so as to turn on the lamp 216 only during the baking process. Hence, during the kneading process or the fermentation process of bread dough the lamp 216 is not turned on.

Therefore, in baking of bread, by turning on the lamp 216 only during the baking process, it becomes possible to inform the user that the baking process is being performed. As a result, the lamp 216 can have longer service life with less power consumption as compared with a case in which the lamp 216 is turned on throughout the cooking processes of bread making. Furthermore, by turning on the lamp 216 during the baking process, the baking degree can be easily inspected visually.

In accordance with the sixth embodiment of the present invention, by turning on the lamp, it becomes possible not only to inform the user that the baking process of bread making operation is being performed but to prevent the user from being scorched inadvertently.

Figure 63:
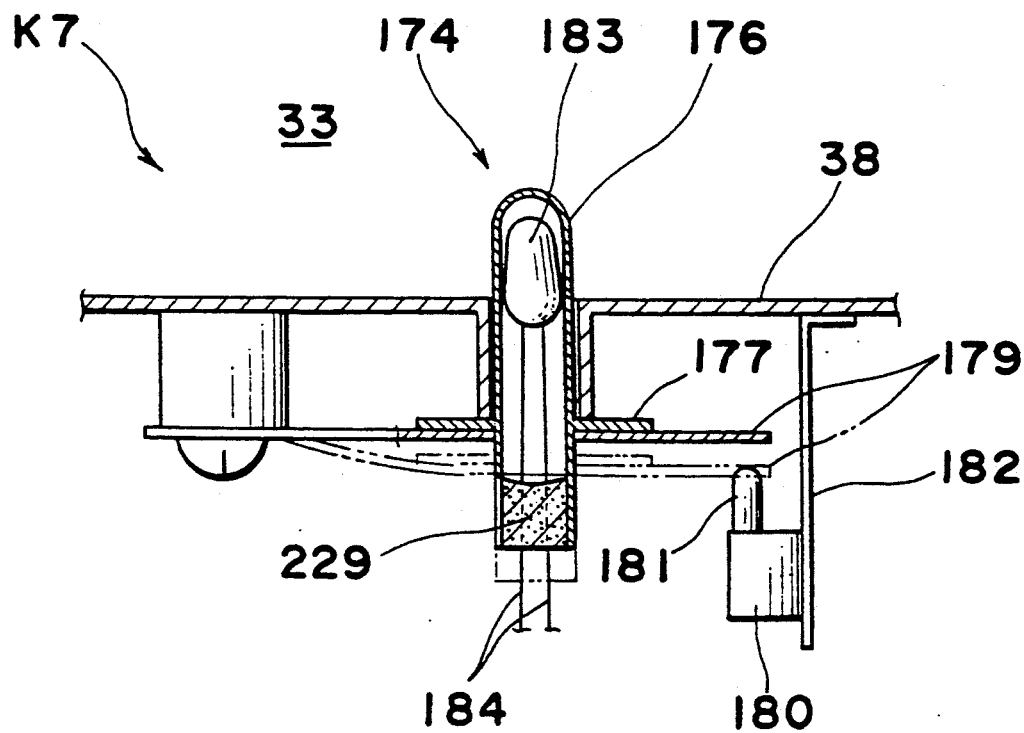
FIG. 63 is an enlarged sectional view of a high-frequency heating apparatus according to a seventh embodiment of the present invention.
Figure 64:
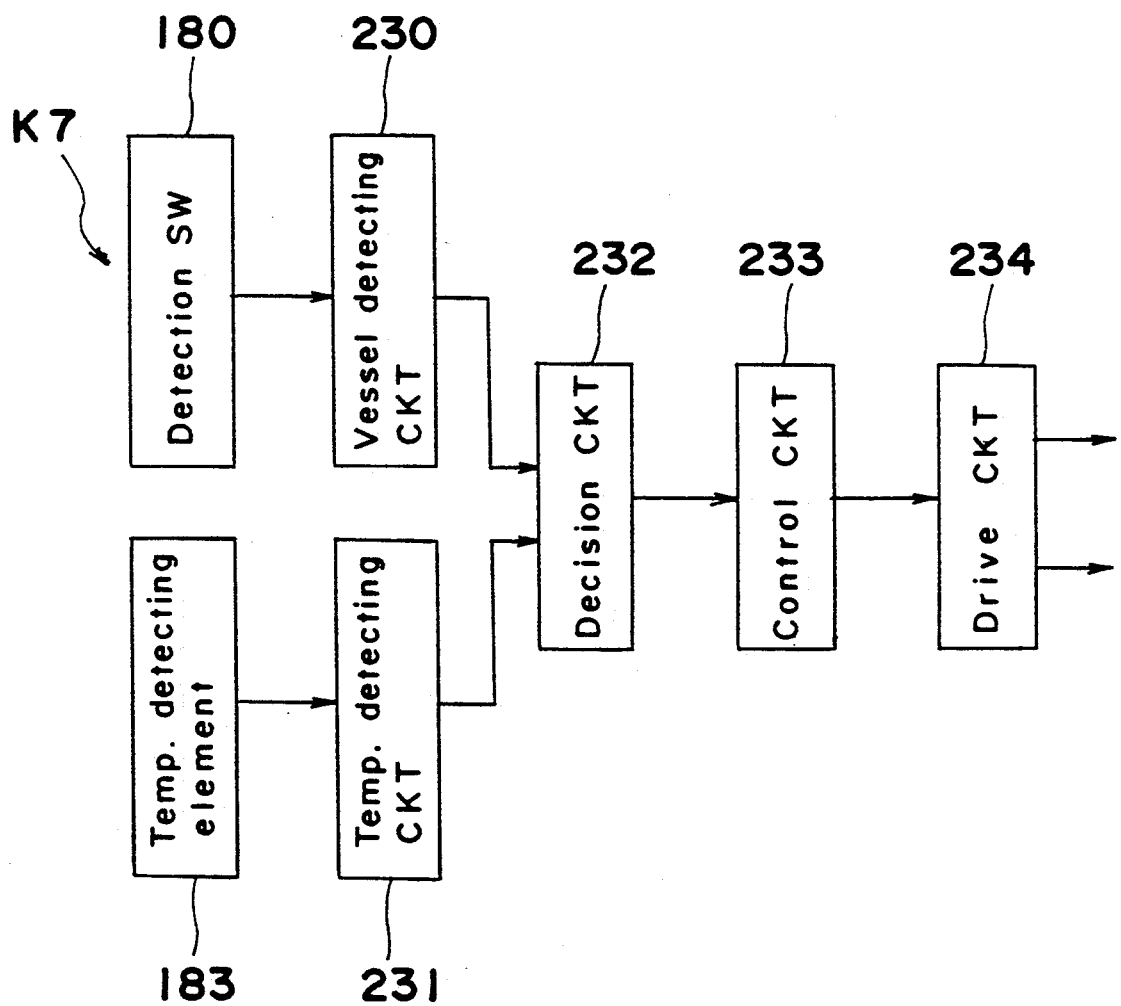
FIG. 64 is a block circuit diagram of the apparatus of FIG. 63.

Referring further to FIGS. 63 and 64, there is shown a high-frequency heating apparatus K7 according to a seventh embodiment of the present invention. Since main constructions of the apparatus K7 are similar to those of the apparatus K3' of FIG. 38, description thereof is abbreviated for the sake of brevity. FIG. 63 shows the sensor 174 for detecting presence and absence of the heating vessel 44. Namely, the temperature detecting element 183 such as a thermistor is inserted into the tube 176 so as to be secured in the tube 176 by resin 229. Since other constructions of the sensor 174 are similar to those of the apparatus K3' of FIG. 39, description thereof is abbreviated for the sake of brevity.

FIG. 64 shows an electric circuit of the apparatus K7. In FIG. 64, detection signals of the detection switch 180 and the temperature detecting element 183 are inputted, through a vessel detecting circuit 230 and a temperature detecting circuit 231, respectively, to a decision circuit 232 including single LSI, in which contents of the detection signals are decided. The decision signal of the decision circuit 232 is inputted to a control circuit 233. In accordance with a coking mode selected by an operating switch (not shown), the control circuit 233 controls operation of the magnetron 35, the electric motor 50, etc. through a drive circuit 234.

Hereinbelow, operation of the apparatus K7 of the above described arrangement is described. Initially, when the heating vessel 44 containing materials of bread such as flour, butter, sugar, salt, yeast, water, etc. is placed at a predetermined position in the heating chamber 33, the lower face of the heating vessel 44 depresses the tube 176 downwardly, so that the elastic plate 179 is bent downwardly and thus, the contact 181 of the detection switch 180 is depressed by the free end portion of the elastic plate 179 so as to turn on the detection switch 180. When setting of the heating vessel 44 has been completed as described above, the electric motor 50 is started by command of the control circuit 233 so as to rotate the stirring blade 58 of the heating vessel 44. Thus, the above described materials of bread are kneaded so as to produce dough. After kneading, this dough is heated by microwave of the magnetron 35 or heat produced by a heater (not shown) provided in the heating chamber 33 so as to be fermented and baked.

At this time, heating performed by the magnetron 35 or the heater is required to be controlled accurately in accordance with temperature of dough to be heated. Since the temperature detecting element 183 is accommodated in the tube 176 held in contact with the bottom of the heating vessel 44, the temperature detecting element 183 detects temperature of dough through the bottom wall of the heating vessel 44. Hence, the dough temperature detecting element 183 can detect the actual dough temperature accurately without being affected by ambient temperature of the heating chamber 33. Therefore, accurate temperature control is performed on the basis of the dough temperature.

Figure 65:
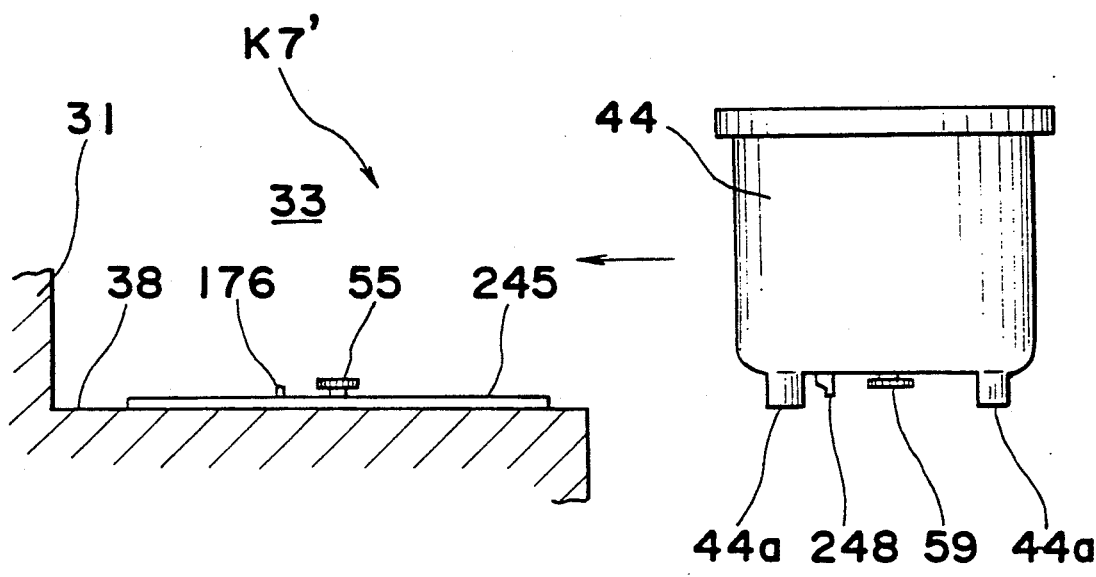
FIG. 65 is a side elevational view showing a modification of the apparatus of FIG. 63.
Figure 66:
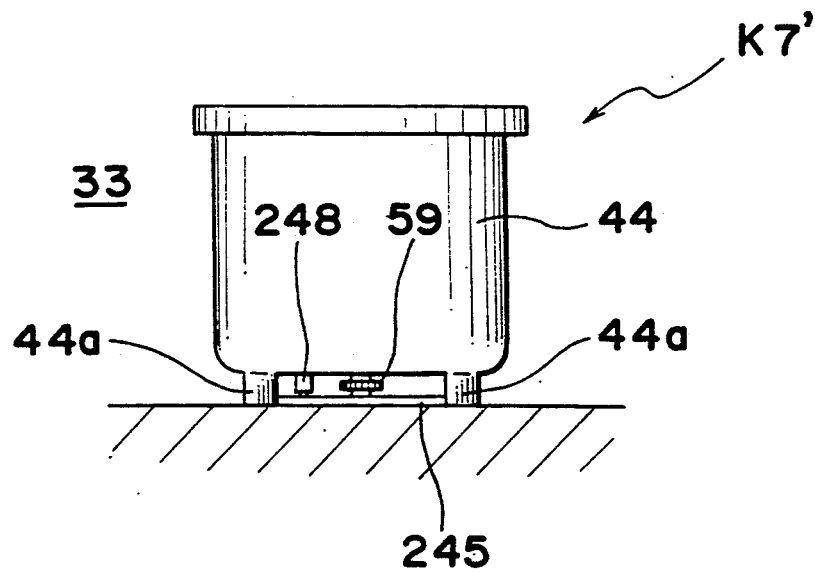
FIG. 66 is a front elevational view of the apparatus of FIG. 65.

Referring to FIGS. 65 to 68, there is shown a modification K7' of the apparatus K7. In the apparatus K7, the heating vessel 44 is placed on the bottom of the heating chamber 33 from above so as to depress the tube 176 downwardly. However, in the apparatus K7', the heating vessel 44 is horizontally and slidably inserted into the heating chamber 33 rearwards from the front of the heating chamber 33 so as to depress the tube 176 downwardly. As shown in FIGS. 65 and 66, a pair of legs 44a are provided on the lower face of the heating vessel 44 and a guide 245 for guiding the legs 44a in forward and rearward directions of the apparatus housing 31 is provided on an inner face of the bottom wall 38 of the heating vessel 33 such that the heating vessel 44 can be inserted into the rear of the heating chamber 33 horizontally from front of the heating chamber 33.

Meanwhile, the transmission gear 59 is provided on the heating vessel 44 and the gear 44 engageable with the transmission gear 59 is provided at the bottom of the heating chamber 33. When the heating vessel 44 has been loaded at a predetermined position in the heating chamber 33, the heating vessel 44 is engaged with the guide 245 and thus, it becomes possible to prevent vibrations of the heating vessel 44 during dough kneading.

Figure 67:
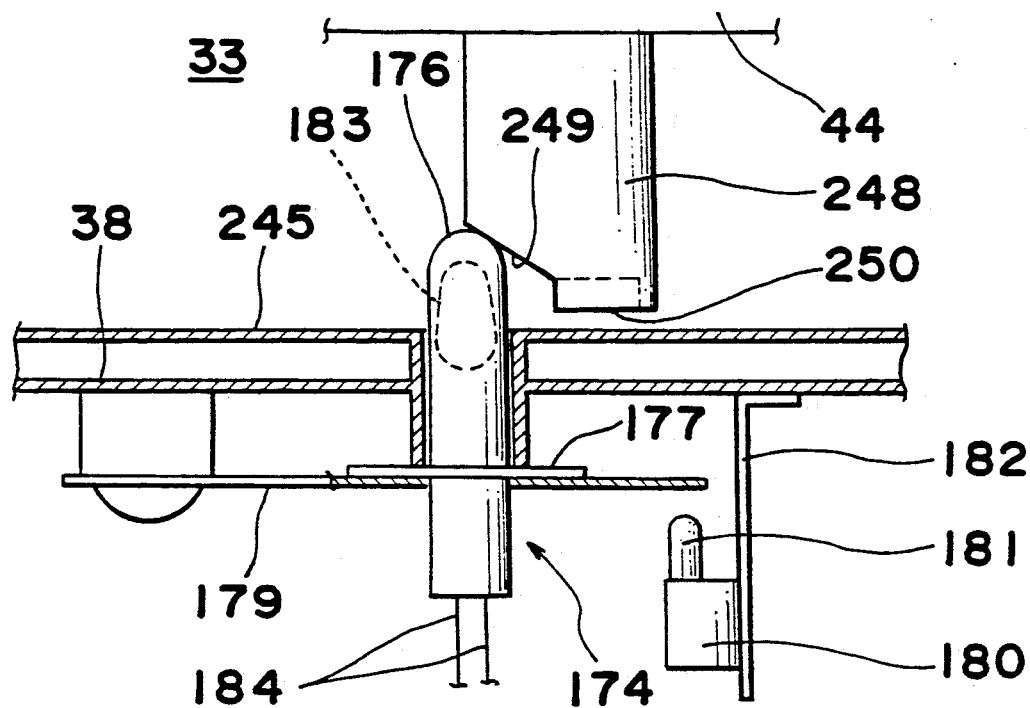
FIG. 67 is an enlarged sectional view of the apparatus of FIG. 65.
Figure 68:
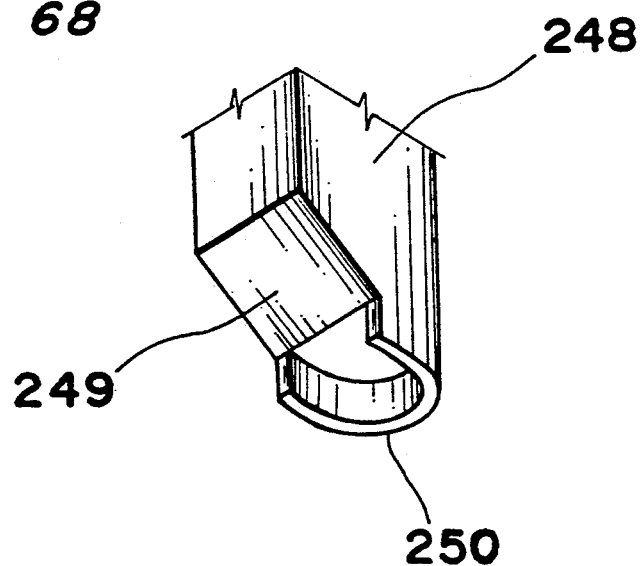
FIG. 68 is a perspective view of a projection of the apparatus of FIG. 65.
Figure 69:
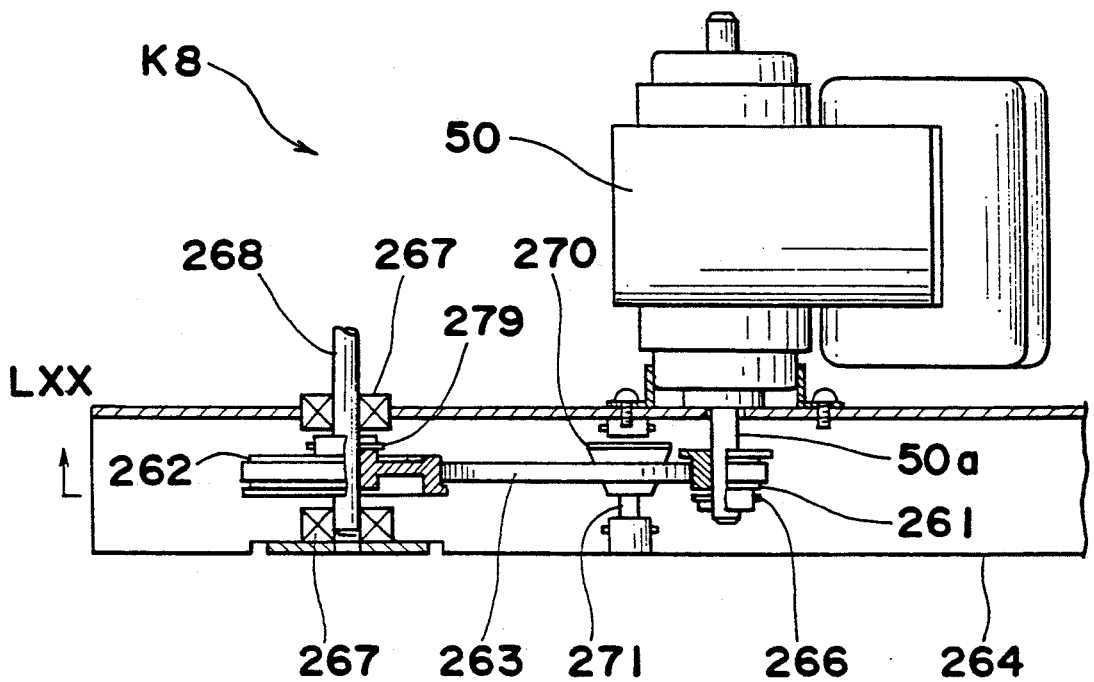
FIG. 69 is a sectional view of a timing belt mechanism employed in a high-frequency heating apparatus according to an eighth embodiment of the present invention.
Figure 70:
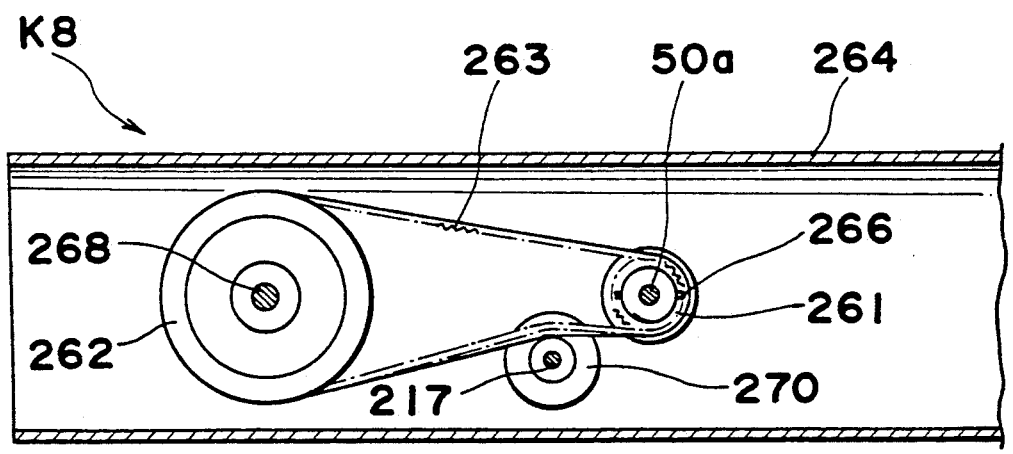
FIG. 70 is a bottom view observed in the direction of the arrow LXX in FIG. 69.

As is clearly shown in FIGS. 67 and 68, a projection 248 for depressing the tube 176 downwardly is provided on the lower face of the heating vessel 44. The projection 248 is formed, at its side confronting the tube 176, with an oblique face 249. At a lower end of the oblique face 249, a skirt 250 having an opening confronting the tube 176 is provided.

In the apparatus K7' of the above described arrangement, when the heating vessel 44 has been slid into the heating chamber 33 through engagement of the legs 44a with the guide 245, the oblique face 249 of the projection 248 is initially brought into contact with the tube 176. Hence, the tube 176 is smoothly depressed downwardly by the oblique face 249 so as to be fitted into the skirt 250 such that the heating vessel 44 is positioned in the direction of insertion of the heating vessel 44 through contact of the skirt 250 with the tube 176. At this time, the transmission gear 59 of the heating vessel 44 is brought into engagement with the gear 55 of the apparatus housing 31 such that the stirring blade 58 in the heating vessel 44 can be driven for its rotation.

When the tube 176 has been depressed downwardly by the projection 248, the detection switch 180 is turned on through the elastic plate 179, so that presence of the heating vessel 44 is detected by the detection switch 180 and the dough temperature is detected through the bottom wall of the heating vessel 44 by the temperature detecting element 183 in the same manner as in the apparatus K7. In the apparatus K7', since the distal end portion of the tube 176 is enclosed by the skirt 250, the temperature detecting element 183 accommodated in the tube 176 is not affected by ambient heat and therefore, can detect the dough temperature accurately.

Meanwhile, in the apparatus K7 and K7', although the temperature detecting element 183 is inserted into the tube 17, the temperature detecting element 183 is not necessarily required to be wholly covered by the tube 176 but may be partially exposed out of the tube 176. Furthermore, in the apparatuses K7 and K7', although the heating vessel 44 provided with the stirring blade 58 and having bread making function has been described but can be replaced by any vessel for containing an article to be heated.

Accordingly, in accordance with the seventh embodiment of the present invention, since the temperature detecting element is provided in the tube held in contact with the heating vessel, temperature of the article in the heating vessel can be detected by the temperature detecting element through the bottom wall of the heating vessel. Therefore, since temperature of the article in the heating vessel can be detected accurately without being affected by ambient temperature in the heating chamber, cooking requiring accurate temperature control, for example, bread baking can be performed properly.

Furthermore, in the seventh embodiment of the present invention, since the vessel detecting portion for detection the heating vessel acts also as the temperature detecting portion, construction of the vessel detecting portion and the temperature detecting portion is simplified.

Moreover, in the seventh embodiment of the present invention, since the temperature detecting element is accommodated in the tube, the temperature detecting element is protected by the wall of the tube and thus, damage to the temperature detecting element can be prevented.

Referring finally to FIGS. 69 to 72, there is shown a timing belt mechanism employed in a high-frequency heating apparatus K8 according to an eighth embodiment of the present invention. The timing belt mechanism includes a driving pulley 261, a driven pulley 262 and a timing belt 263 which is trained over the pulleys 261 and 262 so as to act as a power transmission member. The pulleys 261 and 262 are disposed in an identical horizontal plane so as to be spaced a predetermined distance from each other. This timing belt mechanism is integrally supported by a base member 264 having a predetermined length. At the right side of the base member 264 in FIG. 69, the driving pulley 261 is mounted on the output shaft 50a of the electric motor 50 and is secured to the output shaft 50a by a support pin 266. Meanwhile, at the left side of the base member 264 in FIG. 69, the driven pulley 262 is mounted on a shaft 268 so as to be secured to the shaft 268 by a pin 279. The shaft 268 is rotatably supported by a pair of bearings 267 which are disposed at upper and lower portions of the base member 264, respectively. The shaft 268 is arranged to be coupled with a kneading member (not shown).

Figure 71:
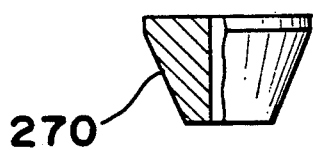
FIG. 71 is a partially sectional front elevational view of an idler pulley employed in the timing belt mechanism of FIG. 69.

Furthermore, an idler pulley 270 acting as an auxiliary rotary member is provided outside an intermediate portion of the timing belt 273 in a running direction of the timing belt 273 and depresses the timing belt 273 so as to strain the timing belt 273. The idler pulley 270 is rotatably supported by a shaft 271 fixed to the base member 264. This idler pulley 270 is made of elastic material such as foam of silicone rubber or chloropene and is so formed as to have a cylindrical outer periphery or a tapered outer periphery as shown in FIG. 71. Therefore, abnormal noises produced during engagement of the timing belt 263 with the pulleys 261 and 262 are transmitted to the idler pulley 270 through the timing belt 263 and therefore, are absorbed by the idler pulley 270. Furthermore, vibrations of the timing belt 263, which are generated together with the abnormal noises, are also absorbed by the idler pulley 270. Thus, noises produced by vibrations of the timing belt 263 are also absorbed by the idler pulley 270.

Meanwhile, in the case where the idler pulley 270 has the tapered outer periphery as shown in FIG. 71, the timing belt 263 is also inclined along the tapered outer periphery of the idler pulley 270. Therefore, the teeth of the timing belt 263 are obliquely brought into engagement with the teeth of the pulleys 261 and 262. Therefore, engagement of the teeth of the timing belt 263 with the teeth of the pulleys 261 and 262 progresses gradually further from partial engagement to full engagement. The present inventors have found that an effect similar to engagement between helical gears is achieved as a result and abnormal noises produced at the time of engagement and disengagement between the timing belt 263 and the pulleys 261 and 262 are reduced more than in known arrangements. Furthermore, if the idler pulley 270 has the tapered outer periphery, the area of contact of the timing belt 263 with the idler pulley 270 becomes larger than that for the idler pulley 270 having the cylindrical outer periphery. Therefore, even if the timing belt 263 is vibrated through variations of load, the timing belt 263 is less likely to be disengaged from the idler pulley 270 and thus, vibratory noises of the timing belt 263 due to disengagement of the timing belt 263 from the idler pulley 270 are reduced.

Figure 72:
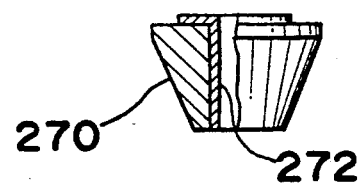
FIG. 72 is a view similar to FIG. 71, particularly showing its modification.

Meanwhile, when the idler pulley 270 is rotated at high speed, it is considered that friction between the idler pulley 270 and the shaft 271 for supporting the idler pulley 270 is increased with the result that noises of friction therebetween are produced. However, as shown in FIG. 72, if a bushing 272 made of material having excellent sliding property, for example, polyacetal and carbon is press fitted into an inner periphery of the idler pulley 270, which is brought into sliding contact with the shaft 271, production of the above mentioned noises of friction can be effectively avoided.

In the above description of the eighth embodiment of the present invention, the idler pulley 270 is disposed outside the timing belt 263 but is not limited to this arrangement. Therefore, even if the idler pulley 270 is disposed inside the timing belt 263, the same effects referred to above can be achieved apparently. Meanwhile, in the above embodiment, the present invention is applied to the timing belt mechanism but can also be applied to other power transmission mechanisms having ropes, chains, etc.

As is clear from the foregoing, in the power transmission mechanism of the high-frequency heating apparatus, the power transmission member trained over the two rotary members spaced away from each other is depressed by the auxiliary rotary member made of elastic material. Therefore, abnormal noises, which are produced at the time of engagement between the power transmission member and the rotary members and are transmitted to the auxiliary rotary member through the power transmission member, are absorbed by the auxiliary rotary member. Meanwhile, since vibrations of the power transmission member, which are produced together with the above described abnormal noises, are also absorbed by the auxiliary rotary member, vibratory noises, which are caused by vibrations of the power transmission member, are also absorbed by the auxiliary rotary member.

As a result, in the power transmission mechanism, abnormal noises or vibratory noises produced at the time of engagement between the power transmission member and the rotary members can be reduced, so that the cooking apparatus can be operated more silently.

Meanwhile, if the auxiliary rotary member is formed into a tapered shape, abnormal noises can be reduced more effectively.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A high-frequency heating apparatus having heating means including a magnetron and a waveguide comprising:
    a heating vessel for accommodating an article to be heated, which is detachably loaded in a heating chamber;
    a stirring mechanism provided in said heating vessel for stirring cooing materials of said article to be heated;
    a guide mechanism provided on a bottom surface of said heating chamber for guiding said heating vessel so as to horizontally displace said heating vessel into said heating chamber from an opening formed on a side face adjacent to said bottom surface of said heating chamber;
    a rotational drive mechanism connected to said stirring mechanism for driving said stirring mechanism so as to rotate said stirring mechanisms; and
    a coupling mechanism coupled between said stirring mechanism and said rotational drive mechanism for transmitting a driving force from said rotational drive mechanism to said stirring mechanism;
    said stirring mechanism including a transmission gear which is mounted on a lower end of a stirring shaft extending through a bottom wall of said heating vessel;
    said coupling mechanism including an engaging gear which is mounted on an upper end of a central shaft extending from said heating chamber to said rotational drive mechanism and is engageable with said transmission gear.

2. A high-frequency heating apparatus as claimed in claim 1, wherein the direction of a line extending from the center of said transmission gear and the center of said engaging gear is different from the direction of displacement of said heating vessel.

3. A high-frequency heating apparatus as claimed in claim 1, further comprising:
    a locking mechanism disposed on said heating vessel for locking said heating vessel in position in a state where said stirring mechanism and said coupling mechanism are coupled with each other.

4. A high-frequency heating apparatus as claimed in claim 1, further comprising:
    a turntable for placing the article thereon, which is detachably mounted on a bottom wall of said heating chamber; and
    a rotational support member for rotating said turntable about said central shaft such that either said heating vessel or said turntable and said rotational support member are selectively loaded in said heating chamber;
    wherein said rotational drive mechanism and said coupling mechanism for said heating vessel transmit said driving force from said rotational drive mechanism to said turntable and drive and rotate said turntable;
    said rotational support member being forced, at its central portion, with a ring which is vertically engageable with said gear of said coupling mechanism.

5. A high-frequency heating apparatus having heating means including a magnetron and a waveguide in which a heating vessel and a turntable for placing thereon an article to be heated are selectively loaded in a heating chamber, with a stirring blade for kneading cooking materials being rotatably provided in said heating vessel, said turntable being detachably mounted on a bottom wall of said heating chamber, said high-frequency heating apparatus comprising:
    a drive motor connected to said heating vessel for driving said heating vessel and said turntable loaded in said heating chamber so as to rotate said heating vessel and said turntable;
    heating chamber detection means connected to said heating chamber for detecting whether said heating vessel or said turntable is loaded in said heating chamber; and
    rotational speed change over means connected between said drive motor and said heating chamber, said detection means for changing over a rotational speed of said drive motor on the basis of a result of detection of said heating chamber detection means.

6. A high-frequency heating apparatus as claimed in claim 5, wherein said drive motor has a rated rotational speed corresponding to a specific rotational speed required for said stirring blade, said high-frequency heating apparatus further comprising:
    rotational speed detecting means connected between said drive motor and said rotational speed changeover means for detecting the rotational speed of said drive motor;
    said rotational speed changeover means including rotational speed control means which performs feedback control of said drive motor so as to set said drive motor to a predetermined rotational speed of said turntable on the basis of the rotational speed of said drive motor detected by said rotational speed detecting means, when said heating chamber detection means has detected said turntable to be loaded in said heating chamber.

7. A high-frequency heating apparatus having heating means including a magnetron and a waveguide in which a heating vessel and a turntable for placing thereon an article to be heated are selectively loaded in a heating chamber, with a stirring blade for kneading cooking materials being rotatably provided in said heating vessel, said turntable being detachably mounted on a bottom wall of said heating chamber, said high-frequency heating apparatus comprising:
    a drive motor connected to said heating vessel for driving said heating vessel and said turntable loaded in said heating chamber so as to rotate said heating vessel and said turntable;
    heating chamber detection means connected to said heating chamber for detecting whether said heating vessel or said turntable is loaded in said heating chamber;
    rotational speed changeover means connected between said drive motor and said heating chamber, detection means for changing over a rotational speed of said drive motor on the basis of a result of detection of said heating chamber detection means; and
    rotational speed detecting means connected between said drive motor and said rotational speed changeover means for detecting the rotational speed of said drive motor;
    said rotational speed changeover means including rotational speed control means which decides whether the rotational speed of said drive motor detected by said rotational speed detecting means is normal or abnormal so as to stop said drive motor when the rotational speed of said drive motor detected by said rotational speed detecting means is abnormal.

* * * * *